US009043927B2

(12) United States Patent
Hu et al.

(10) Patent No.: US 9,043,927 B2
(45) Date of Patent: May 26, 2015

(54) METHOD AND APPARATUS FOR AUTHENTICATING LOCATION-BASED SERVICES WITHOUT COMPROMISING LOCATION PRIVACY

(71) Applicant: Hong Kong Baptist University, Hong Kong (HK)

(72) Inventors: Haibo Hu, Hong Kong (HK); Jianliang Xu, Hong Kong (HK); Qian Chen, Hong Kong (HK)

(73) Assignee: Neo Mechanic Limited, Hong Kong (HK)

( * ) Notice: Subject to any disclaimer, the term of this patent is extended or adjusted under 35 U.S.C. 154(b) by 40 days.

(21) Appl. No.: 13/769,846

(22) Filed: Feb. 19, 2013

(65) Prior Publication Data

US 2014/0090023 A1 Mar. 27, 2014

Related U.S. Application Data

(60) Provisional application No. 61/706,134, filed on Sep. 27, 2012.

(51) Int. Cl.
*H04L 29/06* (2006.01)
*H04W 12/06* (2009.01)

(52) U.S. Cl.
CPC ............ *H04L 63/08* (2013.01); *H04L 63/0407* (2013.01); *H04L 63/0421* (2013.01); *H04W 12/06* (2013.01)

(58) Field of Classification Search
CPC ... H04L 63/08; H04L 63/107; H04L 63/0407; H04L 63/0421; G06F 21/31; G06F 21/52
USPC .................................. 726/2, 4, 21, 26, 27, 30
See application file for complete search history.

(56) References Cited

U.S. PATENT DOCUMENTS

| 7,343,623 | B2 | 3/2008 | Ross | |
|---|---|---|---|---|
| 7,610,265 | B2 | 10/2009 | Zurek | |
| 7,748,029 | B2 | 6/2010 | Ross | |
| 7,979,711 | B2 | 7/2011 | Chen et al. | |
| 8,087,073 | B2 | 12/2011 | Olson et al. | |
| 2005/0255853 | A1* | 11/2005 | Ewert et al. | 455/456.1 |
| 2008/0268871 | A1* | 10/2008 | Kim et al. | 455/456.2 |
| 2009/0254975 | A1 | 10/2009 | Turnbull et al. | |
| 2012/0209822 | A1* | 8/2012 | Prabhakar et al. | 707/703 |

OTHER PUBLICATIONS

Hu Haibo et al., "Non-Exposure Location Anonymity", Data Engineering, 2009, ICDE, 13 pages.*

(Continued)

*Primary Examiner* — Hadi Armouche
*Assistant Examiner* — Sher Khan
(74) *Attorney, Agent, or Firm* — Ella Cheong Hong Kong; Sam T. Yip

(57) ABSTRACT

A method and an apparatus for authenticating location-based services without compromising location privacy, which comprises a comprehensive solution that preserves unconditional location privacy when authenticating either range queries using three authentication schemes for R-tree and grid-file index, together with two optimization techniques, or k-nearest neighbor queries using two authentication schemes for R-tree and Voronoi Diagram index.

17 Claims, 38 Drawing Sheets

(56) References Cited

OTHER PUBLICATIONS

Hu Haibo et al., "Range Nearest—Neighbor Query", IEEE transaction on knowledge and data engineering, vol. 18, No. 1, Jan. 2006, 12 pages.*
Hu Haibo et al., "Authenticating Location Based Services without Compromising Location Privacy", SIGMOD'12, 2012, pp. 301-312.*
Beresford. A., Stajano. F., "Location privacy in pervasive computing", IEEE Perv. Computing, vol. 2, No. 1, (2003), pp. 46-55.
Bamba. B. et al., "Supporting anonymous location queries in mobile environments with privacy grid", In Proc. WWW, (2008), pp. 237-246.
Gedik. B., "Protecting location privacy with personalized k-anonymity: Architecture and algorithms", IEEE Transactions on Mobile Computing, vol. 7, No. 1, (2008), pp. 1-18.
Chow. C. Y. et al., "Casper: Query processing for location services without compromising privacy". ACM Transactions on Database Systems, (2009), vol. 10, No. 10, pp. 1-45.
Boneh. D. et al., "Aggregate and verifiably encrypted signatures from bilinear maps", EUROCRPYT, (2003), pp. 416-432.
Li. F. et al., "Authenticated index structures for aggregation queries". ACM TISSEC, (2010), 13(32), pp. 1-35.
Li. F. et al., "Dynamic authenticated index structures for outsourced databases", In Proc. SIGMOD, (2006), pp. 121-132.
Ghinita. G. et al., "Private Queries in location based services: anonymizers are not necessary", In Proc. SIGMOD, (2008), pp. 1-12.
Hu. H. et al., "Privacy-aware location data publishing", ACM TODS, (2001), vol. 2, No. 3.
Hu. H. et al., "Processing private queries over untrusted data cloud through privacy homomorphism", In Proc. ICDE, (2011).
Pang. H. H., Mouratidis. K., "Authenticating the query results of text search engines", (2008), VLDB.
Pang. H. H., Tan K. L., "Authenticating query results in edge computing", In Proc. ICDE, (2004).
Pang. H. H. et al., "Verifying completeness of relational query results in data publishing", SIGMOD, (2005), pp. 407-418.
Li. F. et al., "Proof-infused streams: Enabling authentication of sliding window queries on streams", ACM, VLDB, (2007).
Yiu. M. L. et al., "Authentication of moving knn queries", In Proc. ICDE, (2011), pp. 565-576.
Kalnis. P. et al., "Preventing location-based identity inference in anonymous spatial queries", TKDE, (2007), vol. 19, No. 12, pp. 1719-1733.
Paillier. P., "Public-key cryptosystems based on composite degree residuosity classes", In Proc. EUROCRYPT, (1999), pp. 223-238.
Merkle. R. C., "A certified digital signature", In Proc. CRYPTO, (1989), pp. 218-238.
Papadopoulos. S. et al., "Nearest neighbor search with strong location privacy", In VLDB, (2010), vol. 3, No. 1.
Wong. W. K. et al., "Secure knn computation on encrypted databases", In Proc. SIGMOD, (2009).
Yang. Y. et al., "Authenticated indexing for outsourced spatial databases", The VLDB Journal, (2008), vol. 18, No. 3, pp. 631-648.
Yang. Y. et al., "Spatial outsourcing for location-based services", In Proc. ICDE, (2008), pp. 1082-1091.
Cheng W. W., Tan K. L., "Query assurance verification for outsourced multi-dimensional databases", Journal of Computer Security, (2009), pp. 101-126.
Cheng W. W., Tan K. L., "Authenticating knn query results in data publishing", In SDM, (2007), pp. 47-63.
Xu T., Cai Y., Location cloaking for safety protection of ad hoc networks. In IEEE Infocom, (2009).
Xu. T., Cai. T., "Exploring historical location data for anonymity preservation in location-based services". In IEEE Infocom, (2008).
Goldreich. O., "Foundations of cryptography ii basic applications", vol. 2, (2004), pp. 620-622, Cambridge University Press, New York.
Theodoridis. Y., et al, "Efficient cost models for spatial queries using r-trees", IEEE TKDE, (2000), vol. 12, No. 1 pp. 19-32.

* cited by examiner (a) Signature Chaining (b) Merkle Hash Tree

METHOD AND APPARATUS FOR AUTHENTICATING LOCATION-BASED SERVICES WITHOUT COMPROMISING LOCATION PRIVACY

CROSS-REFERENCE TO RELATED APPLICATIONS

The present application claims priority of U.S. provisional application No. 61/706,134 filed Sep. 27, 2012, and which the disclosure is hereby incorporated by reference in its entirety.

FIELD OF INVENTION

The present invention relates to a method and an apparatus for authenticating location-based services without compromising location privacy, which comprises a comprehensive solution that preserves unconditional location privacy when authenticating range queries using three authentication schemes, together with two optimization techniques and two cryptographic constructs, and when authenticating k-nearest neighbor queries using two authentication schemes, together with two cryptographic constructs. This invention addresses privacy-preserving query authentication for location-based services. The present invention addresses a critical problem for both mobile value-added service market and database research community.

BACKGROUND OF INVENTION

Location-based services (LBSs) have been gaining tremendous popularity over the recent years, in particular since the emergence of mobile social networking services (mSNSs). Social networking giants such as Facebook and Twitter are all turning their services into mobile, along with specialized vendors like Foursquare, Gowalla and Loopt. Besides, major mobile carriers also strive to provide more value-added services to their subscribers, among which the most thrilling applications are LBSs such as location-aware advertisement ("check-in deals") and nearby-friend reminders.

A typical LBS business model consists of a location registry (typically a social network or a mobile carrier who accepts user location updates or "check-ins"), a service provider (SP, typically a third party application developed on the social network) that offers LBS applications based on user locations, and a client (typically a mobile user) who requests the service. In this model, the third-party application is authorized to access user locations but it is not trustworthy regarding its service returned to the client. For example in FIG. 1, an SP offers location-based restaurant browsing which tells the client not only the nearby restaurants, but also the numbers of diners as an indication of their popularity. Each of these numbers can be retrieved by the SP through a spatial range query on a user location dataset specified by the client. However, the client may not trust these numbers as the SP has the motive to manipulate them in favor of "sponsored restaurants". As another example in public services, the government may outsource the online traffic monitoring service to third-party vendors. For market profits, however, they may prioritize the services by sending updated and accurate congestion reports to paid users while sending delayed or inaccurate ones to free users. These trustworthy issues are extremely important as more day-to-day businesses and public services are turning mobile and location-based. It would be soon indispensable for service providers to deliver their services in an authenticable manner, in which the correctness of service results—whether each result is genuine (soundness) and whether any result is missing (completeness)—can be verified by the client.

In the literature, such as reported in F. Li, G. Kollios, and L Reyzin. *Dynamic authenticated index structures for outsourced databases*. In *Proc. SIGMOD*, pages 121-132, 2006, H. Pang, A. Jain, K. Ramamritham, and K.-L Tan. *Verifying completeness of relational query results in data publishing*. In *SIGMOD*, pages 407-418, 2005, H. Pang and K.-L Tan. *Authenticating query results in edge computing*. In *Proc. ICDE*, 2004, Y. Yang, S. Papadopoulos, D. Papadias, and G. Kollios. *Spatial outsourcing for location-based services*. In *Proc. ICDE*, pages 1082-1091, 2008 and Y. Yang, S. Papadopoulos, D. Papadias, and G. Kollios. *Authenticated indexing for outsourced spatial databases*. The *VLDB Journal*, 18(3):631-648, 2009, there are a lot of works on the authentication of query results. In these works, the data owner (i.e., the location registry) publishes not only data (i.e., user locations) to the third-party SP, but also the endorsements of the data being published. These endorsements are signed by the data owner against tampering by the SP. Given a query, the SP returns both the query results and a proof, called verification object (VO), which can be used by the client to reconstruct the endorsements and thus verify the correctness of the results. As a location-based service usually concerns a spatial query, the authentication of such services can adopt the same paradigm as in query authentication. As FIG. 1 illustrates, after receiving a request, the SP evaluates the query based on the user locations obtained from the location registry, and delivers the result to the client. A VO, which includes endorsed values derived from user locations and ids, is also sent to the client to verify the correctness of the result.

However, while prior works address the query authentication issue, they fail to preserve the privacy of the data. In fact, they assume that during the verification process, the client can always be trusted and entitled to receive data values on the querying attribute(s). This assumption no longer holds in LBSs where the locations of mobile users are sensitive and should be protected against the clients. Therefore, the challenge of this work is how to design privacy-preserving query authentication schemes without disclosing any user location information to the client.

Unfortunately, the hiding of user locations from the client compounds the difficulty of authentication, and in fact, it brings out a new aspect of authentication. Traditional authentication verifies the soundness of a query by only checking whether the returned results are genuine because the compliance of the results, i.e., whether they comply with the query statement and are thus true results, is already implied by their returned values. However, without knowing these values, verifying the compliance is no longer trivial, which is indeed the challenge of privacy-preserving query authentication.

There is a large body of research works on query authentication for indexed data. These works originate from either digital signature chaining or Merkle hash tree. Digital signature is a mathematical scheme for demonstrating the authenticity of a digital message. It is based on asymmetric cryptography. Given a message, the signer produces a signature with its private key. Then the verifier verifies the authenticity of the message by the message itself, the signer's public key and the signature. Based on this scheme, early works on query authentication impose a signature for every data value. The VB-tree reported in H. Pang and K.-L Tan. *Authenticating query results in edge computing*. In *Proc. ICDE*, 2004 augments a conventional $B^+$-tree with a signature in each leaf entry. By verifying the signatures of all returned values, the client can guarantee the soundness of these results. To further reduce the number of signatures returned to the client, they can be aggregated into one signature of the same size as each individual signature such as that reported in D. Boneh, C. Gentry, H. Shacham, and B. Lynn. *Aggregate and verifiably encrypted signatures from bilinear maps*. In *EUROCRPYT*, pages 416-432, 2003. However, the simple signature-based approach cannot guarantee the completeness, as the server can deliberately miss some results without being noticed. Therefore, Pang et al. proposed signature chaining in H. Pang, A. Jain, K. Ramamritham, and K.-L Tan. *Verifying completeness of relational query results in data publishing*. In *SIGMOD*, pages 407-418, 2005, which connects a signature with adjacent data values to guarantee no result can be left out. FIG. 2(*a*) illustrates signature chaining for four sorted values $d_1, d_2, d_3, d_4$. The signature of each value depends not only on its own value but also on the immediate left and right values. For the first and the last values $d_1$ and $d_4$, two special objects $d_0 = -\infty$ and $d_5 = +\infty$ are appended. If the server returns $d_2$ and $d_3$ to the client, it will also send a verification object (VO) that contains: (1) the signatures of $d_2$ and $d_3$, and (2) the boundary values $d_1$ and $d_4$. Given the VO, the client can verify the results through the facts that: (1) the two boundary values fall outside the query range, and (2) all signatures are valid. The first condition ensures that no results are missing and the second guarantees no values are tampered with. Signature aggregation and chaining were adapted to multi-dimensional indexes by Cheng and Tan in W. Cheng and K. Tan. *Query assurance verification for outsourced multi-dimensional databases*. Journal of Computer Security, 2009.

The Merkle hash tree (MHT) was introduced to authenticate a large set of data values as reported in R. C. Merkle. *A certified digital signature*. In *Proc. Crypto*, pages 218-238, 1989. FIG. 2(*b*) shows an MHT for the four data values in FIG. 2(*a*). It is a binary tree. Each leaf node with data value $d_i$ is assigned a digest $h(d_i)$, where $h(\ )$ is a one-way hash function. Each internal node $N_i$ is assigned a digest which is derived from its child nodes, e.g., $N_1 = h(H_{11}|N_2)$, where "|" denotes concatenation. In MHT, only the digest value of the root is signed by the data owner, and therefore it is more efficient than signature chaining schemes. An MHT can be used to authenticate any subset of data values. For example in FIG. 2(*b*), the server sends $d_1$ and $d_2$ to the client; and to prove their authenticity, the server also sends a VO to the client, which includes the digest of $N_2$ and the signed root digest N. The client computes $h(d_1)$ and $h(d_2)$, then $N_1 = h(h(d_1)|h(d_2))$, and finally $N = h(N_1|N_2)$. This computed root digest is then compared with the signed root digest in the VO. If they are the same, the client can verify that $d_1$ and $d_2$ are not tampered with by the server.

The notion of MHT has been generalized to an f-way tree and widely adapted to various index structures. Typical examples include Merkle B-tree and its variant Embedded Merkle B-tree (EMB-tree) such as that reported in F. Li, G. Kollios, and L Reyzin. *Dynamic authenticated index structures for outsourced databases*. In *Proc. SIGMOD*, pages 121-132, 2006. The latter reduces the VO size by embedding a tiny EMB-tree in each node. For multi-dimensional datasets and queries, similar techniques were proposed by Yang et al., who integrated an R-tree with the MHT (which is called Merkle R-tree or MR-tree) for authenticating multi-dimensional range queries as reported in Y. Yang, S. Papadopoulos, D. Papadias, and G. Kollios. *Spatial outsourcing for location-based services*. In *Proc. ICDE*, pages 1082-1091, 2008 and Y. Yang, S. Papadopoulos, D. Papadias, and G. Kollios. *Authenticated indexing for outsourced spatial databases*. The *VLDB Journal*, 18(3):631-648, 2009.

Besides selection and range queries, recent studies focus on the authentication of more complex query types, including kNN queries such as those reported in W. Cheng and K. Tan. *Authenticating knn query results in data publishing*. In *SDM*, 2007 and M. L Yiu, E. Lo, and D. Yung. *Authentication of moving knn queries*. In *Proc. ICDE*, pages 565-576, 2011, join queries such as reported in Y. Yang, S. Papadopoulos, D. Papadias, and G. Kollios. *Authenticated indexing for outsourced spatial databases*. The *VLDB Journal*, 18(3):631-648, 2009, and aggregation queries as reported in F. Li, M. Hadjieleftheriou, G. Kollios, and L Reyzin. *Authenticated index structures for aggregation queries*. *ACM TISSEC*, 13(32):1-35, 2010. Besides relational and spatial datasets, authentication of semi-structured and non-structured datasets was studied for streaming data in F. Li, K. Yi, M. Hadjieleftheriou, and G. Kollios. *Proof-infused streams: Enabling authentication of sliding window queries on streams*. In *VLDB*, 2007 and S. Papadopoulos, Y. Yang, and D. Papadias. *Continuous authentication on relational streams*. *Very Large Data Bases Journal (VLDBJ)*, 19:161-180, 2010 and text data as reported in H. Pang and K. Mouratidis. *Authenticating the query results of text search engines*. In *VLDB*, 2008.

Our invention differs from all these works by being the first work on privacy-preserving query authentication, which also addresses the privacy-preserving kNN authentication for location-based services. The lack of querying attribute values from the client makes the authentication problem significantly harder. This calls for a new design of the authentication data structures and procedures, together with optimization techniques and cryptographic constructs, without which the authentication would be less practical.

As for location privacy, the literature of mobile computing and spatial databases extensively investigates this problem in various research domains, including query processing such as those reported in B. Bamba, L Liu, P. Pesti, and T. Wang. *Supporting anonymous location queries in mobile environments with privacy grid*. In *Proc. WWW*, 2008, C. Chow, M. Mokbel, and W Aref Casper\*: *Query processing for location services without compromising privacy*. *ACM TODS*, 2009, G. Ghinita, P. Kalnis, A. Khoshgozaran, C. Shahabi, and K. Tan. *Private queries in location based services: Anonymizers are not necessary*. In *SIGMOD*, 2008, H. Hu, J. Xu, C. Ren, and B. Choi. *Processing private queries over untrusted data cloud through privacy homomorphism*. In *Proc. of ICDE*, 2011, P. Kalnis, G. Ghinita, K. Mouratidis, and D. Papadias. *Preventing location-based identity inference in anonymous spatial queries*. *TKDE*, 19(12):1719-1733, 2007, S. Papadopoulos, S. Bakiras, and D. Papadias. *Nearest neighbor search with strong location privacy*. In *VLDB*, 2010 and W. Wong, W. Cheung, B. Kao, and N. Mamoulis. *Secure knn computation on encrypted databases*. In *Proc. SIGMOD*, 2009, message communication as reported in B. Gedik and L Liu. *Protecting location privacy with personalized k-anonymity: Architecture and algorithms*. *IEEE TMC*, 7(1):1-18, 2008 and T. Xu and Y. Cai. *Location cloaking for safety protection of ad hoc networks*. In *IEEE Infocom*, 2009, and location data publishing as reported in H. Hu, J. Xu, S. T. On, J. Du, and K. Ng. *Privacy-aware location data publishing*. *TODS*, 35(3), 2010 and T. Xu and Y. Cai. *Exploring historical location data for anonymity preservation in location-based services*. In *IEEE Infocom*, Phoenix Ariz., 2008. In most works, location cloaking has been the predominant technique of privacy protection. However, it only protects privacy conditionally against certain privacy metrics, such as k-anonymity. Except for very few works such as G. Ghinita, P. Kalnis, A. Khoshgozaran, C. Shahabi, and K. Tan. *Private queries in location based services: Anonymizers are not necessary*. In SIGMOD, 2008, H. Hu, J. Xu, C. Ren, and B. Choi. *Processing private queries over untrusted data cloud through privacy homomorphism*. In *Proc. of ICDE*, 2011, S. Papadopoulos, S. Bakiras, and D. Papadias. *Nearest neighbor search with strong location privacy*. In *VLDB*, 2010 and W. Wong, W. Cheung, B. Kao, and N. Mamoulis. *Secure knn computation on encrypted databases*. In *Proc. SIGMOD*, 2009, unconditionally protecting user locations by disclosing nothing about them is an unprecedented task. Our invention is the first of this kind on query authentication and the first that addresses privacy-preserving kNN query authentication for location-based services.

Other patent prior arts exist for query and authentication but our invention is novel in view of these prior arts for the following reasons. U.S. Pat. Nos. 7,343,623 and 7,748,029 disclosed inventions that integrate the confidences of query results from different data sources and present them to the user as an overall composite result. Our invention does not involve any sort of confidence or probability or any multiple data sources.

U.S. Pat. No. 8,087,073 discloses an invention of an authentication architecture that identifies the subject itself to the web server so that the latter can verify that the request for a Uniform Resource Locator (URL) is from the genuine subject. Our invention concerns "authentication" as the semantics to "be able to verify that the results returned from the server is genuine".

U.S. Pat. No. 7,979,711 discloses an invention that preserves query verification privacy by not disclosing the values of non-result objects. Our invention preserves "full" privacy by not disclosing any values, whether it belongs to a result or non-result object. Furthermore, our invention can handle both range and k-nearest neighbor queries while this prior art can only handle range query.

U.S. Pat. No. 7,610,265 discloses a data query invention that verifies whether two result tables are the same using aggregation. This is different from our invention, which verifies whether a returned query result is genuine and complete.

United States Patent Application Publication No. 2009/0254975 discloses a location based authentication system that uses a conventional identity authentication approach, which proves the identity of a mobile device is someone who can be trusted. This is different from our invention, which is based on an on privacy-preserving query authentication.

The present inventors have endeavored to develop a novel privacy-preserving query authentication invention that is a comprehensive solution that preserves unconditional location privacy when authenticating both range and k-nearest neighbor queries.

Citation or identification of any reference in this section or any other section of this application shall not be construed as an admission that such reference is available as prior art for the present application.

SUMMARY OF INVENTION

Accordingly, it is an object of the present invention to provide a method and an apparatus for privacy-preserving query authentication that is a comprehensive solution that preserves unconditional location privacy when authenticating both range and k-nearest neighbor queries.

Accordingly, it is a primary object of the present invention to provide a method and an apparatus for privacy-preserving query authentication that addresses privacy-preserving query authentication for location-based services. This invention solves a critical problem for both mobile value-added service market and database research community.

In accordance with one aspect of the present invention, there is provided three authentication schemes for R-tree and grid-file index, which are good for large queries, small queries, and queries on static datasets, respectively.

In accordance with another aspect of the present invention, there is provided two optimization techniques that are orthogonal to the underlying authentication schemes.

In accordance to a further aspect of the present invention, there is provided a privacy-preserving kNN query authentication for location-based services. This invention solves a critical problem in both trustworthy mobile computing and spatial database research community.

In accordance to another aspect of the present invention, there is provided two cryptographic constructs that can prove to the client the distance relation from two private location points to one public point (i.e., the query point).

In accordance to one other aspect of the present invention, there is provided a complete set of authentication schemes for both the R-tree and Voronoi Diagram based indexes.

In yet another aspect of the present invention there is provided strategies for both the data owner and the SP to optimize the pre-signed line based (PLB) distance comparison method.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which:

FIG. 4A shows the nodes and objects, while FIG. 4B shows the R-tree index and Verification Object;

FIG. 5A shows the grid and object placement, while FIG. 5B shows the grid and Verification Object;

FIGS. 15A-15D show the query authentication process on a MR-tree wherein FIG. 15A shows the nodes, objects and query involved; FIG. 15B shows the MR-tree index and VO (without privacy-preserving requirement); FIG. 15C shows the MR-tree index and VO (when applied only PPB method), and FIG. 15D shows the MR-tree index and VO (with accelerated PLB method);

FIGS. 17A-17D show the query authentication process on Voronoi Diagram (VD) wherein FIG. 17A shows an illustration of a Voronoi Diagram (VD), FIG. 17B shows the query on VD, FIG. 17C shows the VD index and VO and FIG. 17D shows the accelerated VD index and VO;

FIGS. 19A-19D show the online Strategy on Pre-signed Lines wherein FIG. 19A illustrates the 3NN query running example; FIG. 19B and FIG. 19C show the basic strategy and optimized strategy for the SP, respectively, and FIG. 19D shows the spanning tree structures for the both strategies;

DETAILED DESCRIPTION OF INVENTION

Figure 1:
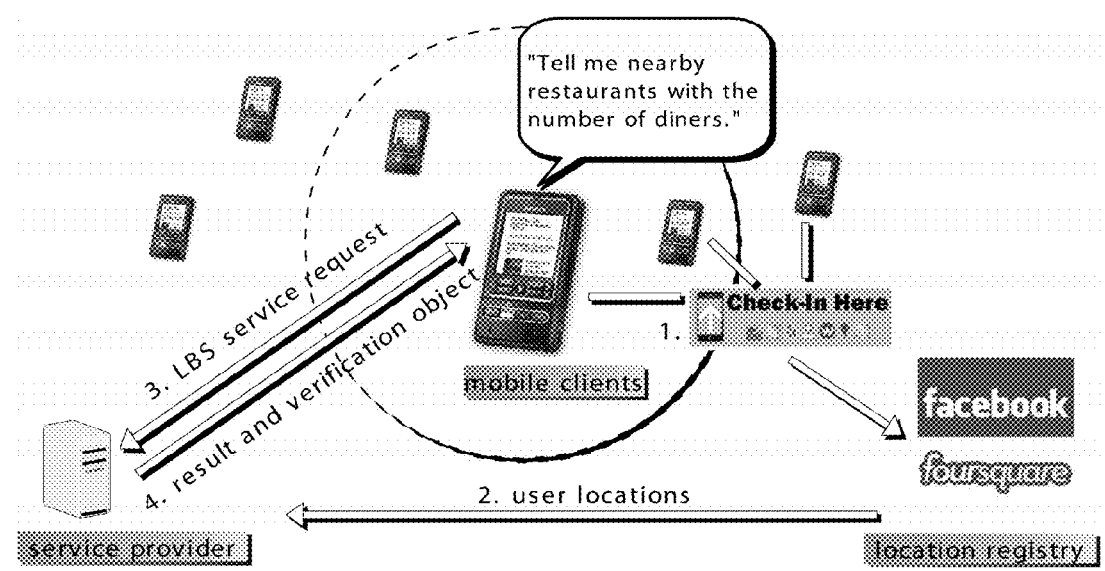
FIG. 1 shows an illustration of an authenticatable location-based service.

The present invention is not to be limited in scope by any of the specific embodiments described herein. The following embodiments are presented for exemplification only.

In one embodiment of this invention, we start with one-dimensional range queries on a B⁻-tree and adopt a cryptographic construct that was originally proposed by Pang et al. in H. Pang, A. Jain, K. Ramamritham, and K.-L Tan. *Verifying completeness of relational query results in data publishing*. In *SIGMOD*, pages 407-418, 2005 (the content of which is incorporated herein by reference in its entirety) for the value hiding of non-result objects. It is based on a proof for verifying x≥α (α is the query bound) without disclosing x. The idea is to let the client and SP jointly compute a digest function g( ) of value x. However, generalizing the one-dimensional solution to multi-dimensional indexes such as R-tree leads to significant performance overhead as the linearity in one-dimensional space no longer exists. As such, the authentication may involve more tree nodes so that the size of the VO outweighs the result itself, especially when the query is small.

In another embodiment of the present invention, to cater for small queries, we propose to use grid-file as an alternative index and design the complete authentication scheme.

In yet another embodiment of the present invention, we propose a third authentication scheme based on accumulative digests for static datasets to further reduce the authentication cost.

In a further embodiment of the present invention, for the purpose of performance optimizations, we propose two directions, both of which are orthogonal to the underlying authentication schemes.

In another first embodiment of this invention, we propose linear ordering and embedding as the internal organization of each node (or cell). This optimization regains the linearity for multi-dimensional data and enables effective pruning techniques.

In another second embodiment of the present invention, we develop three authentication schemes for R-tree and grid-file index, which are good for large queries, small queries, and queries on static datasets, respectively. Analytical models of computation and bandwidth costs are developed to justify these schemes. Security analysis shows they are secure by not disclosing any individual location information.

In another third embodiment of the present invention, we propose two optimization techniques that are orthogonal to the underlying authentication schemes.

In another fourth embodiment of the present invention, we propose a privacy-preserving kNN query authentication for location-based services. This invention solves a critical problem in both trustworthy mobile computing and spatial database research community.

In another fifth embodiment of the present invention, we propose two cryptographic constructs that can prove to the client the distance relation from two private location points to one public point (i.e., the query point).

In another sixth embodiment of the present invention, we propose a complete set of authentication schemes for both the R-tree and Voronoi Diagram based indexes.

In another seventh embodiment of the present invention, we propose strategies for both the data owner and the SP to optimize the pre-signed line based (PLB) distance comparison method.

Problem Formulation for Range Query Authentication Scheme

Let us formally model the user locations as a spatial dataset D in an integer-domain d-dimensional space, and the location-based service as a range query Q in this space. Q can be represented by a hypercube $[\alpha, \beta]$ where $\alpha=(\alpha_1, \alpha_2, \ldots, \alpha_d)$ and $\beta=(\beta_1, \beta_2, \ldots, \beta_d)$, denoting the lower bound and upper bound of Q respectively. Without loss of generality, we assume the query results are the identifiers of users (denoted as ids) whose locations fall into the hypercube. In a real location-based service, Q may return specific contents to the querying client, such as the users' Facebook pages or the total number of matching users as in the motivating example. These contents can be derived faithfully from the identifiers. In the "total number" case, the identifiers are not needed as results—those endorsed values derived from them will suffice in the verification process. The query Q is executed by the service provider (SP, or simply "server") on the dataset D that is authorized and signed by the location registry. The client needs to verify that the SP executes Q faithfully. As such, together with the query results, the SP also returns the authentication data structure (i.e., the verification object or VO) to the client. The challenge is to authenticate the range query results while preserving users' location privacy, or as stated in A. Beresford and F. Stajano. *Location privacy in pervasive computing. IEEE Perv. Computing,* 2(1), 2003, "to prevent other parties from learning one's current or past locations" (the content of which is incorporated herein by reference in its entirety). Obviously, cloaking user locations cannot fulfill this requirement completely, while simply pseudo-anonymizing user identifiers cannot work either as these ids are often needed by the client in many location-based services (e.g., in the Facebook page example above or, if the client is a business, for billing and service delivery to these users). Even if these ids are not needed, pseudo-identifiers are still vulnerable to association attacks that join the locations with background knowledge such as those reported in B. Gedik and L Liu. *Protecting location privacy with personalized k-anonymity: Architecture and algorithms. IEEE TMC,* 7(1): 1-18, 2008 (the content of which is incorporated herein by reference in its entirety), G. Ghinita, P. Kalnis, A. Khoshgozaran, C. Shahabi, and K. Tan. *Private queries in location based services: Anonymizers are not necessary.* In *SIGMOD,* 2008 (the content of which is incorporated herein by reference in its entirety), and P. Kalnis, G. Ghinita, K. Mouratidis, and D. Papadias. *Preventing location-based identity inference in anonymous spatial queries. TKDE,* 19(12):1719-1733, 2007 (the content of which is incorporated herein by reference in its entirety). Therefore, we shall design new VO and associated authentication protocols, which protect locations unconditionally. That is, when the client verifies the query results, it cannot infer any information about the locations of returned users, beyond what is implied from the results. Our problem is to prevent the client from knowing beyond what the query tells. A malicious client may attempt to narrow down or pinpoint the user locations by exhaustively sending range queries with extremely small extents. Depending on the business model, such threats can be prevented by access control, query parameters screening, or imposing penalties on heavy users.

Security Model for Range Query Authentication Scheme

We assume that: (1) the location registry is trusted by the querying client and SP; (2) the SP has read access to the user locations; and (3) the location registry does not collude with the client or the SP. Therefore, the two security threats in this problem are: (1) the client may attempt to infer location information of returned users from the VO; and (2) the SP may dishonestly return wrong results of the query in favor of its own benefits.

For ease of presentation, we also assume all parties (the client, SP and location registry) follow a semi-honest model. That is, they follow the designated protocol properly except that they may record intermediate results and try everything they can to deduce about the private information of other parties. It has been shown in *Oded Goldreich. The Foundations of Cryptography—Volume 2. Cambridge University Press,* 2004 (the content of which is incorporated herein by reference in its entirety) that any protocol that is proven secure in the semi-honest model can be adapted to be secure in a malicious model, where the participants may not follow the protocol at all, by imposing the participants to follow the protocol.

Finally, we follow the common assumption in cryptography that any party may know the protocol and algorithms of other parties, except for the secret keys the other parties may own. Nonetheless, the capability of any adversary is bounded by its polynomial computational power and storage space.

Preliminary: Privacy-Preserving Authentication for Single-Dimensional Range Queries To start with, we first focus on the basic case where d=1. That is, the user location is a single field x and is indexed by a $B^+$-tree. Since the x values of users are sorted and threaded in the leaf level of the index, the query is equivalent to finding user $r_a$, such that $r_a x \geq \alpha$ and $r_{a-1} x < \alpha$, and user $r_b$, such that $r_b x \leq \beta$ and $r_{b+1} x > \beta$. Then the result users are $\{r_a, r_{a+1}, \ldots, r_b\}$. The authentication should verify the following three conditions:

1. compliance condition: $r_a x \geq \alpha$, $r_{a-1} x < \alpha$, $r_b x \leq \beta$ and $r_{b-1} x > \beta$;
2. genuineness condition: no id attributes of $r_a, r_{a+1}, \ldots, r_b$ are tampered with;
3. completeness condition: no other user beyond the result set has such x that $\alpha \leq x \leq \beta$.

If the disclosure of location x were not a concern, condition (1) could be trivially verified by sending the x values of users $r_{a-1}, r_a, r_b$ and $r_{b+1}$ to the client, and conditions (2)(3) could be verified by a Merkle B-tree where the digest of each user is the joint hash on its x and id fields. However, as required in privacy-preserving authentication, verifying (1) without disclosing x values to the client needs some cryptographic constructs. In H. Pang, A. Jain, K. Ramamritham, and K.-L Tan. *Verifying completeness of relational query results in data publishing.* In *SIGMOD,* pages 407-418, 2005, Pang et al. designed a proof for verifying $x \geq \alpha$ without disclosing x (according to our problem definition, both x and $\alpha$ are integers). The idea is to let the client and server jointly compute the digest g of value x−L, where L is the lower bound of domain x. The server first computes $g(x-\alpha)$ and sends it to the client, who then computes $g(x-L)=g(x-\alpha) \otimes g(\alpha-L)$, where % is a well-defined operation on the digest. Note this equation is guaranteed by the homomorphic property of the digest function g( ), and g( ) has another property that accepts only non-negative numbers. As such, by sending $g(x-\alpha)$, the server proves $x \geq \alpha$. The client verifies $x \geq a$ by comparing the computed $g(x-L)$ value with the $g(x-L)$ value signed by the data owner (i.e., the location registry in this application). Similarly, by jointly computing $g(U-x)$, where U is the upper bound of domain x, the client can verify $x \leq \beta$ without disclosing x.

With the digest function g( ), we design the verification for single-dimensional range queries on a Merkle B-tree as follows. The digest of each leaf entry (i.e., user) e in a leaf node is defined as:

$$\mathrm{dig}(e)=h(g(e.x-L)|g(U-e.x)|h(e.\mathrm{id})), \qquad (1)$$

where "|" is concatenation and h( ) is a one-way hash function. The digest has three components—the first can be used to verify $e.x \geq$ some value $\alpha$ as e.x has a positive sign, the second component can be used to verify if $e.x \leq$ some value $\beta$ as e.x has a negative sign, and the last component can be used to verify if the id attribute is tampered with.

Figure 2:
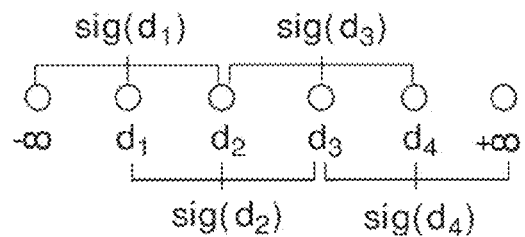
FIG. 2 shows the semantics of two basic authentication tools, namely (a) Signature Chaining; (b) Merkle Hash Tree.
Figure 2:
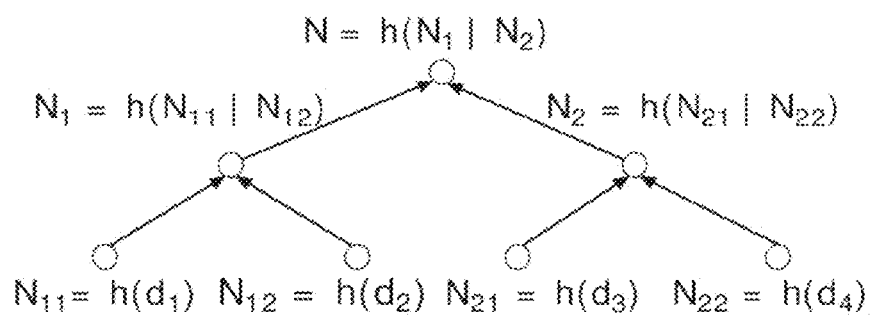

Recursively, the digest of a leaf node is computed from the digests of all its leaf entries; the digest of a non-leaf node N (including the root node) is computed from the digests of all its child nodes $N_1, N_2, \ldots, N_m$. It is noteworthy that, by convention MHT uses a concatenation-based recursive digest definition (as shown in FIG. 2(b)), which may disclose the order of child nodes. To avoid this, we propose an order-insensitive recursive definition as below:

$$\text{dig}(N) = h^2(\text{dig}(N_1)) \cdot h^2(\text{dig}(N_2)) \ldots h^2(\text{dig}(N_m)) \bmod n$$

where n=pq and p, q are two large primes. Obviously, this definition is order-insensitive as modular multiplication is a commutative operator. Further, this definition guarantees the authenticity of dig(N) in a stronger fashion than the concatenation-based definition. In fact, if the server attempts to accommodate a modified $\text{dig}(N_i)$, to retain the same dig(N) value, it has to forge some dig(N) such that $h^2(\text{dig}(N_i)) \cdot h^2(\text{dig}(N_j))$ mod n is intact. The hardness of this task is guaranteed by two levels of security constructs. The outer level is the modular square—due to the computational hardness of the quadratic residuosity problem as detailed in *Oded Goldreich. The Foundations of Cryptography—Volume 2. Cambridge University Press*, 2004 (the content of which is incorporated herein by reference in its entirety), given $h^2(\text{dig}(N_j))$ mod n, to find its modular square root $h(\text{dig}(N_j))$ is asymptotically as hard as to factorize n. The inner level is the one-way hash function h( )—even if $h(\text{dig}(N_j))$ could be found, the server would yet have to find $\text{dig}(N_j)$ and send it to the client. This is referred to as the "first preimage attack" on h( ), which alone is as difficult as (if not more difficult than) forging in the original concatenation-based definition, which is a constrained "second preimage attack", as detailed in *Oded Goldreich. The Foundations of Cryptography—Volume 2. Cambridge University Press*, 2004 (the content of which is incorporated herein by reference in its entirety).

Now that the digests are defined, for query $Q=[\alpha,\beta]$ whose result user set $Q=\{r_a, r_{a+1}, \ldots, r_b\}$, the VO should include the following digests or components of digests:

1. $g(\alpha - r_{a-1}x - 1)$ to verify $r_{a-1}x < \alpha$;
2. $g(r_a x - \alpha)$ to verify $r_a x \geq \alpha$;
3. $g(\beta - r_b x)$ to verify $r_b x \leq \beta$;
4. $g(r_{b+1}x - \beta - 1)$ to verify $r_{b+1}x > \beta$;
5. all digests or digest components that are necessary for the client to compute the digest of the root node;
6. the signed digest of the root node.

Figure 3:
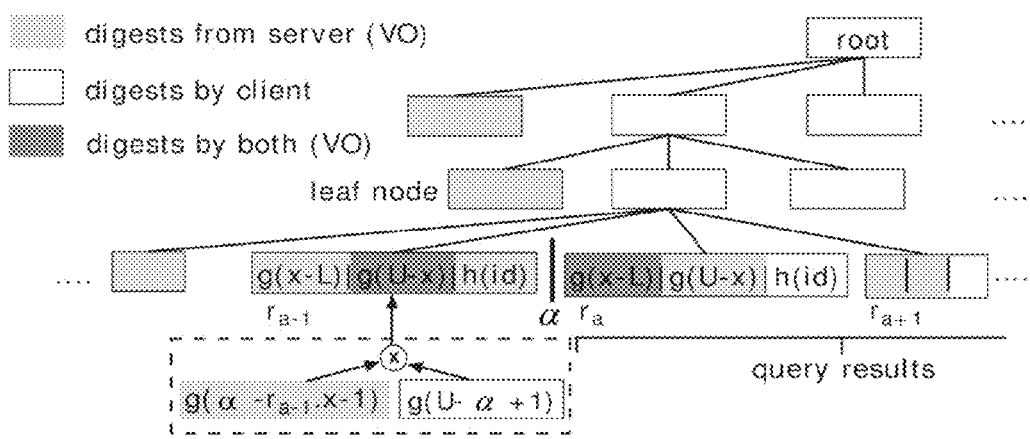
FIG. 3 shows the Verification Object for 1D range query.

FIG. 3 illustrates the VO and protocol, where only the "$\alpha$" side is depicted for simplicity. The client uses item (1) $g(\alpha - r_{a-1}x - 1)$ to compute one of the components of digest $r_{a-1}$, $g(U - r_{a-1}x) = g(\alpha - r_{a-1}x - 1) \otimes g(U - \alpha + 1)$. A similar approach applies to items (2)(3)(4). These digest components, illustrated by dark-grey boxes in FIG. 3, are computed collaboratively by the client and the server. The digest components in item (5), illustrated by light-grey boxes, are directly returned by the server. These digest components are used for the client to compute the digests of (i) boundary non-result object $r_{a-1}$ (using digest components $g(r_{a-1}x - L)$ and $h(r_{a-1}.\text{id})$ from (5) and computing $g(U - r_{a-1}x)$ from (1)); (ii) boundary result object $r_a$ (using digest component $g(U - r_a x)$ from (5), computing $g(r_a x - L)$ from (2), and computing $h(r_a.\text{id})$ from returned result $r_a.\text{id}$); (iii) internal result objects such as $r_{a-1}$ (using digest components $g(r_{a+1}x - L)$ and $g(U - r_{a+1})$ from (5) and computing $h(r_{a-1}.\text{id})$ from return result $r_{a+1}.\text{id}$; $r_{a+1}x \geq \alpha$ is guaranteed by the Merkle B-tree and thus does not need to be verified. For aggregation queries (e.g., returning the "total number"), since ids are not returned as results, digest components $h(r_a.\text{id}), h(r_{a+1}.\text{id}), \ldots, h(r_b.\text{id})$ are returned directly from the server for the client to verify the aggregate result); and (iv) intermediate nodes that are needed to compute the root node digest. To summarize, the VO includes all dark-grey and light-grey boxes, which can be either digests or digest components. With this VO, the client authenticates the results by computing the digest of the root node in a bottom-up fashion along the tree path. In FIG. 3, all these client-computed digests are shown by white boxes.

Authentication for Multi-Dimensional Range Queries

In this section, we study the d>1 case for our problem. To support location-based services, we are particularly interested in 2D datasets and queries. In what follows, we propose three schemes for privacy-preserving authentication on two common multi-dimensional indexes, namely, the R-tree and grid-file, respectively.

Authentication on R-Tree Index

Only users at the boundaries of the result set (i.e., $r_{a-1}$, $r_a$, $r_b$, $r_{b+1}$) need to be verified with the query range $[\alpha, \beta]$ because all of them are in linear order, i.e., they are sorted by their x values at the leaf level of the B⁻-tree index. However, this trick no longer works in a multi-dimensional range query as the leaf level of the index is not sorted. To verify that the server traverses the index correctly and visits nodes no more and no less, the boundary verification in a previous section needs to be applied on every node where the query stops branching. In an R-tree index, this requires the digest of any node N to comprise the minimum bounding boxes (MBB) of its child entries. Let us start with the definition of the digest for a leaf entry (i.e., user) r as:

$$\text{dig}(e) = h(\text{dig}(e.\text{mbb}) | h(e.\text{id})), \tag{2}$$

where dig(c.mbb) is defined similarly to Eqn. 1 for privacy-preserving purposes as:

$$\text{dig}(e.\text{mbb}) = h(g(e.\text{mbb}.l - L) | g(e.\text{mbb}.u - L) | g(U - e.\text{mbb}.l) | g(U - e.\text{mbb}.u)). \tag{3}$$

Here u, l, U and L are all vectors, denoting the upper and lower bounds of the multi-dimensional MBB and the entire domain, respectively. Then dig(N), the digest of an R-tree node N is defined as:

$$h^2(\text{dig}(N.\text{mbb})) \cdot h^2(\text{dig}(N_1)) \ldots h^2(\text{dig}(N_m)) \bmod n \tag{4}$$

The definition above effectively splits dig(N) into two parts: the left part $h^2(\text{dig}(N.\text{mbb}))$ depends on the node itself and the right part $h^2(\text{dig}(N_1)) \ldots h^2(\text{dig}(N_m))$ depends on its child nodes. Conceptually, for dig(c), the left part is dig (c.mbb) while the right part is h(e.id).

Figure 4A:
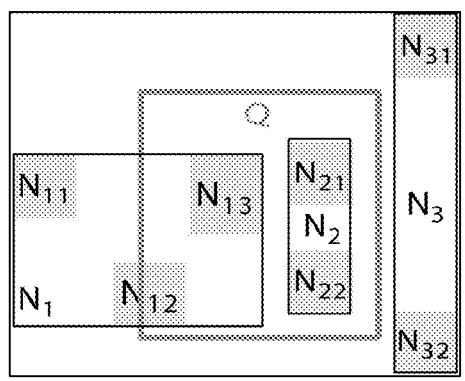
FIGS. 4A and 4B show the query authentication on R-tree index, where
Figure 4B:
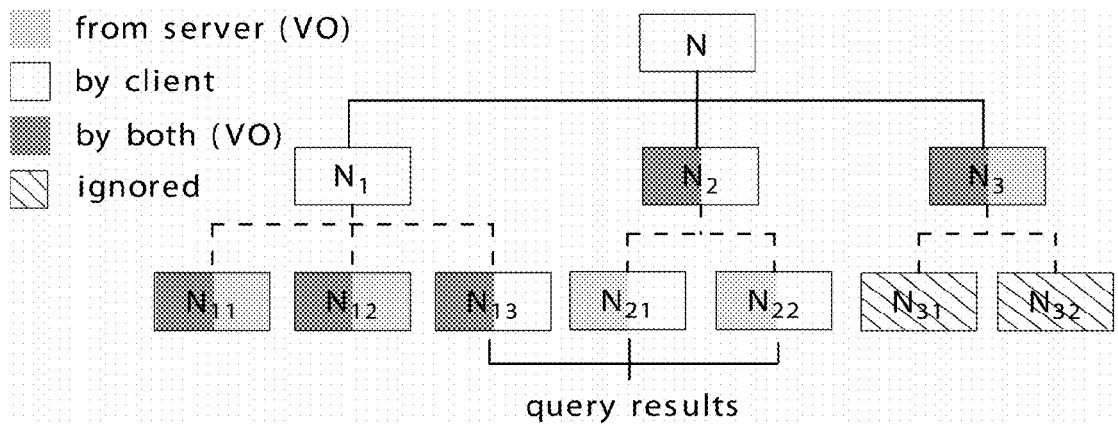

FIGS. 4A and 4B illustrate the query processing and VO construction procedure, where $N_1, N_2, \ldots$ are the leaf nodes and $N_{11}, N_{12}, \ldots$ are the leaf entries (i.e., users). The query processing starts from the root node N. Since $N_1$ intersects with query Q, it will be branched, i.e., its subtree is further explored. $N_2$ is totally inside Q, so $N_2$ will not be branched for verification; but all leaf entries in its subtree will be accessed and returned as results. $N_3$ is totally outside of Q, so it will not be branched, either; and there are no results from $N_3$. As such, among the child nodes of N, $N_2$ and $N_3$ require boundary verification as they stop branching. Then $N_1$ is branched, since it is already a leaf node, its entries $N_{11}, N_{12}$ and $N_{13}$ will stop branching anyway, which means all of them require boundary verification. The final result users are $\{N_{13}, N_{21}, N_{22}\}$ and FIG. 4B shows the VO, which includes:

1. the digest components for boundary verification, including $g(\alpha - N_{11}.\text{mbb}.u)$, $g(\alpha - N_{12}.\text{mbb}.l)$, $g(N_{12}.\text{mbb}.u - \alpha)$, $g(N_{13}.\text{mbb}.l - \alpha)$, $g(\beta - N_{13}.\text{mbb}.u)$, $g(N_2.\text{mbb}.l - \alpha)$ $g(\beta - N_2.\text{mbb}.u)$, $g(N_3.\text{mbb}.l - \beta)$, which are shown in dark-grey boxes;
2. all digests or digest components that are necessary for the client to compute the root digest, shown in light-grey boxes;
3. the signed digest of the root node.

In FIG. 4B, the right parts of the digests of result users (i.e., h(e.id)) are shown in white boxes, i.e., they are computed by the client, because these id values are sent to the client as results.

Authentication on Grid-File Index

The R-tree index may not be favorable for privacy-preserving authentication due to the following two reasons. First, it loses the linearity of leaf-level entries. Consequently, the boundary verification must be conducted on every single node that stops branching, instead of only on the four boundary leaf entries in the $B^+$-tree. This could be very costly as each boundary verification requires a computation-intensive digest function g( ). Second, the R-tree index does not favor queries with small ranges. Since only the root digest is signed, the verification of any query must go all the way up to the root, which requires a significant number of necessary digests in VO and high computational overhead. As an extreme case, even if the query is contained in only one leaf node, the total number of boundary verifications is fh, where f is the average node fanout and h is the tree's depth. To address these two issues, in this subsection we turn to an alternative index—grid-file—and force the index nodes to regain linearity by imposing an order on the grid cells.

Figures 5A, 5B:
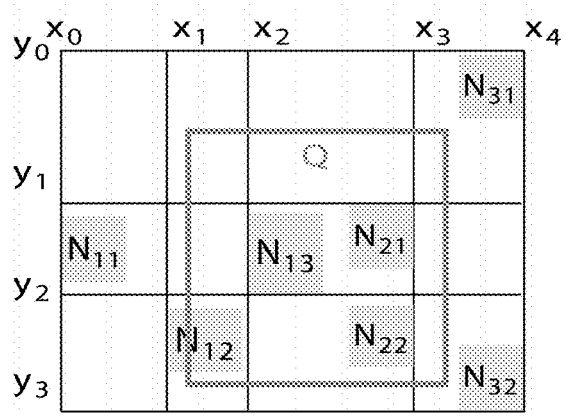
FIGS. 5A and 5B show the query authentication on grid-file index, where

FIG. 5A shows the grid partition on the same dataset in FIGS. 4A and 4B. The grid is formed by horizontal partition lines $x_0, x_1, \ldots, x_4$, and vertical partition lines $y_0, y_1, \ldots, y_3$. To protect location privacy, the numbers of these lines, i.e., 5 and 4, and their coordinates/values are unknown to the client. Given the same query Q as in FIGS. 4A and 4B, it overlaps with 9 cells in FIG. 5A. Since the cells are sorted in their x and y values, to verify $Q=[\alpha,\beta]$ the client only needs to verify the four boundary lines of Q with respect to the grid partition lines. In this example, $x_1 \leq \alpha_x < x_2$, $x_3 < \beta_x \leq x_4$, $y_0 \leq \alpha_y < y_1$ and $y_2 < \beta_y \leq y_3$. Then users who are in those cells that are completely inside the boundary lines must be result users, e.g., users $N_{13}$ and $N_{21}$ in the cell (3, 2) (i.e., the cell whose right and bottom bounds are $x_3$, and $y_2$); users who are in those cells that intersect with the boundary lines of Q need to be further verified with these bound lines, e.g., user $N_{12}$ in the cell (2, 3). To support boundary verification, the digest of each cell C that contains users $e_1, e_2, \ldots, e_m$ is defined as follows:

$$\text{dig}(C)=h(\text{dig}(C.\text{mbb})|\text{dig}(e_1)|\text{dig}(e_2)|\ldots|\text{dig}(e_m)), \quad (5)$$

where the digest of its MBB, dig(C.mbb), is defined as:

$$\text{dig}(C.\text{mbb})=h(g(C.\text{mbb}.u-L)|g(U-C.\text{mbb}.l)). \quad (6)$$

Note that the digest definition of C.mbb is simpler than that of N.mbb for an R-tree node in Equation (3) because the boundary verification is always in the form of $C_{i,j}.\text{mbb}.l<Q<C_{i,j}.\text{mbb}.u$ for some cell (i,j) and a boundary line of Q. On the other hand, the digest of user e, dig(e), has the same definition as in Equation (2).

$$\text{dig}(e)=h(\text{dig}(e.\text{mbb})|h(e.\text{id})), \quad (7)$$

where dig(e.mbb) has the same definition as in Equation (3).

$$\text{dig}(e.\text{mbb})=h(g(e.\text{mbb}.l-L)|g(e.\text{mbb}.u-L)|g(U-e.\text{mbb}.l)|g(U-e.\text{mbb}.u)). \quad (8)$$

The distinguishing difference between R-tree and grid-file index on query authentication lies in their signatures. For the R-tree index, the common practice (as in MR-tree and in a previous section) is to sign the root digest only. The advantage is to limit the number of signature computations (which are believed to be costly) to 1. The disadvantage, however, is that the computation of the root digest requires a lot of necessary digests included in the VO and hash computations. While the hierarchy in the R-tree makes such costs less significant, the grid-file, unfortunately, is not given this edge if the same single-signature strategy is applied. Furthermore, in privacy-preserving authentication, the computational cost of signature operations is less dominant than the digest function g( ). With these design factors, we argue that the digest of each cell in a grid-file should be signed. In addition to this, the lack of a hierarchy also leaves the completeness of the query result in jeopardy, as the server may omit in the result some cells together with their signatures. To remedy this, besides the digest of itself, the signature of a cell also chains up the digests of 4 neighboring cells. That is, the signature of cell (x,y) is defined as:

$$\text{sig}(C_{x,y})=\text{signature}(\text{dig}(C_{x-1,y})|\text{dig}(C_{x,y})|\text{dig}(C_{x+1,y})|\text{dig}(C_{x,y-1})|\text{dig}(C_{x,y+1})) \quad (9)$$

For completeness, for the cells on the boundary of the entire space, we define some artificial cells (e.g., $C_{0,y}$ and $C_{x,0}$) with their digests set to 0.

It is noteworthy that the above definitions of cell digests and signatures require only local information, as opposed to the digest of an R-tree node which depends recursively on its descendant nodes. Therefore, upon a simple user insertion or deletion that does not change the topology of the index, the grid-file requires up to 5 cell digest reads, 1 cell digest write and 5 cell signature writes, whereas the R-tree index requires up to fh node digest reads, h node digest writes and 1 signature write (f is the average node fanout and h is the tree's depth). With this said, the grid-file has the advantage of handling more frequent user updates than the R-tree index.

Let us reexamine the query Q in FIG. 5A. FIG. 5B illustrates the VO of this query and the client verification procedure. Since Q overlaps with 9 cells, to verify the results, the client needs the signatures of all these cells from the SP, which are included first in the VO. Note that since the signature of each cell has chained up the 4 neighboring cells, the VO should also include the digests of the cells that are immediately adjacent to these overlapping cells (i.e., the first column of cells in FIG. 5B). All rest work of the client is to compute the digests of all overlapping cells and check if they match the signatures. As with the R-tree index authentication, these digests or their components can be obtained in three ways (shown in different colors in FIG. 5B). First, if a boundary of an MBB needs to be verified with Q, then the digest component is computed collaboratively with the server and shown in dark-grey boxes. Note that the MBB may belong to a cell or a user, and therefore there are cell-level and user-level boundary verifications. In the cell level, since cells share the same and sorted partition lines, only the two corner cells (top-left and bottom-right) need to verify their boundaries with Q. As such, the digests of these two cells' MBBs (denoted by dig (mbb)) are marked in dark-grey boxes. In the user level, only those users who are in the intersecting cells need to verify their MBBs with Q. As such, the digests of the following users' MBBs are marked as dark-grey: $N_{12}, N_{22}, N_{31}, N_{32}$. Second, the query returns the id values of the result users, so the digest component $h(N_{i,j}.\text{id})$ of these users are computed by the client and are shown in white boxes. Third, all rest digests or digest components are retrieved from the server and are shown in light-grey boxes. Algorithm 1 summarizes the pseudo-code of the server query processing and VO construction procedure.

---

Algorithm 1 Query Processing and VO Construction

| | |
|---|---|
| Input: | Q: the query and $UC_{i,j}$: the grid-file |
| Output: | C: the result set and VO: the verification object |

-continued

Algorithm 1 Query Processing and VO Construction

```
Procedure:
 1:  C_{1x,1y} and C_{ux,uy} are the two corner cells;
 2:  for each C_{i,j} that overlaps Q do
 3:    if C_{i,j} is not a boundary cell then
 4:      insert all users in C_{i,j} to C;
 5:      insert digests of all user and cell MBBs to VO;
 6:    else
 7:      for each user u do
 8:        if u is contained in Q then
 9:          insert u.id to C;
10:        else
11:          insert h(u.id) to VO;
12:          insert part of dig(u.mbb) to VO;
13:      if C_{i,j} is not a corner cell then
14:        insert dig(C_{i,j}.mbb) to VO;
15:      else
16:        insert part of dig(C_{i,j}.mbb) to VO;
```

Accumulative Digest for Grid-File Index

The grid-file index overcomes two drawbacks of the R-tree index on query authentication: overhead for small queries and frequent user location updates. However, as the number of signatures to be sent and verified by the client is proportional to the number of overlapping cells, the above scheme cannot scale well to large queries. Although signature aggregation techniques reported in D. Boneh, C. Gentry, H. Shacham, and B. Lynn. *Aggregate and verifiably encrypted signatures from bilinear maps*. In *EUROCRPYT*, pages 416-432, 2003 can be applied on these signatures by the server to reduce bandwidth costs, it cannot reduce the computational costs, as verifying the aggregate signature is as computation-intensive as verifying all individual signatures. In this subsection, we propose accumulative digest as a remedy for authentication on large queries, by assuming infrequent user location updates.

Figure 6:
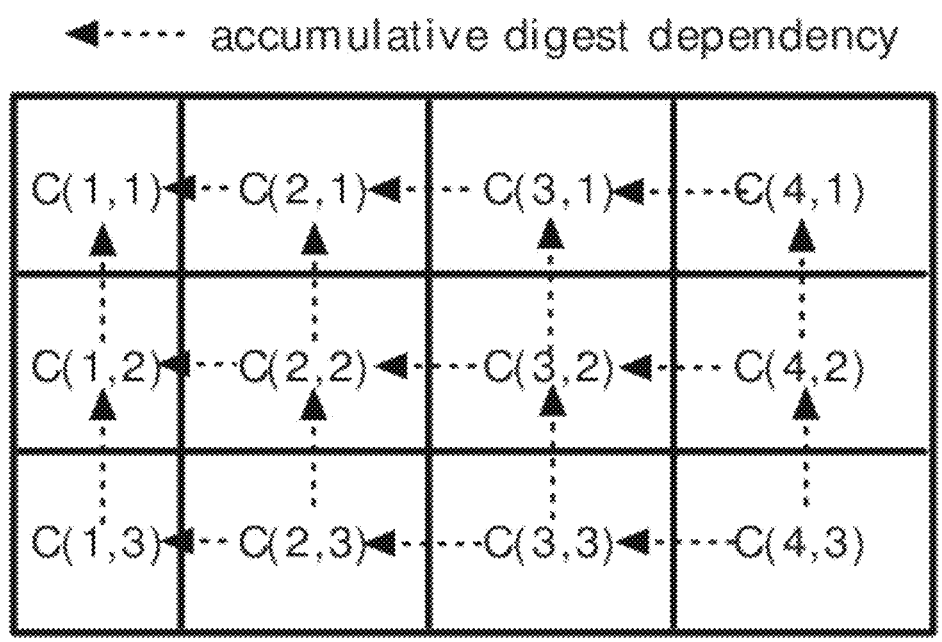
FIG. 6 shows the accumulative digest.

The basic idea of accumulative digest is to associate the digest of each cell (which is then signed by the data owner, i.e., the location registry) with the digests of all cells spanned from the origin. FIG. 6 illustrates how the accumulative digests are derived, where the origin is on the top-left corner. The accumulative digest of cell $C_{x,y}$, denoted by $DIG(C_{x,y})$, is recursively defined as the hash value of the DIG of its immediate left and top cells, concatenated with its own cell digest dig. Formally, $$DIG(C_{x,y}) = h(DIG(C_{x-1,y}) | DIG(C_{x,y-1}) | dig(C_{x,y})), \quad (10)$$

where z>1 and y>1. For the margin cases, $$DIG(C_{1,1}) = dig(C_{1,1}),$$

$$DIG(C_{x,1}) = h(DIG(C_{x-1,1}) | dig(C_{x,1})),$$

$$DIG(C_{1,y}) = h(DIG(C_{1,y-1}) | dig(C_{1,y})).$$

As the accumulative digest of a cell already chains up neighboring cells, signature chaining is no longer necessary. As such, the signature of this cell is simply defined on its own accumulative digest: $sig(C_{x,y}) = signature(DIG(C_{x,y}))$.

Given these definitions, the VO of query Q in FIG. 5B will be revised as follows. Instead of sending the signatures of all overlapping cells, only the signature of the bottom-right cell among them (i.e., cell $C_{4,3}$) needs to be included in the VO. In addition, the client also needs some accumulative digests to start with when computing the accumulative digest of this bottom-right cell. Therefore, the DIG values of the two cells that are immediate left and top to the top-left overlapping cell (i.e., cell $C_{2,1}$) need to be included in the VO. In this example, since there is no immediate-top cell to $C_{2,1}$, only $DIG(C_{1,1})$ is included in the VO.

Security Analysis for Range Query Authentication Scheme

In this subsection, we analyze the security of the proposed schemes. Recall the two threats in this invention disclosure are: (1) the client inferring the locations of returned users from the VO, and (2) the SP dishonestly returning wrong results. As our schemes follow the general Merkle hash tree or signature chaining paradigm for query authentication, the second threat is resolved as long as the digest function g( ) holds the designed properties as discussed in a previous section. Therefore, in what follows we focus on the analysis of the first threat.

To demonstrate that the SP does not leak location information of any returned user to the client, we adopt security proof by simulation originated from zero-knowledge proof as reported in *Oded Goldreich. The Foundations of Cryptography—Volume* 2. *Cambridge University Press,* 2004 (the content of which is incorporated herein by reference in its entirety). This is achieved by "simulating the view" of the client, i.e., while the client has a-priori knowledge of any user u being at position a with P(u=a) probability, after receiving the VO, its posterior probability P(u=a|VO) is the same as P(u=a). In what follows, we assume a is a point for ease of presentation.

Thanks to the one-way property of the digest function g( ), the only information disclosed by the VO to the client in all our schemes can be summarized by the following three types: (1) an MBB A is fully contained in Q (denoted by $A \subseteq Q$); (2) an MBB A (of a node or a cell) overlaps with but is not fully contained in the query range Q (denoted by $A \cap Q \neq \emptyset$); (3) an MBB A is to the left (right, top, bottom) of another MBB B. In the following lemmas, we show types (1) and (2) have the posterior probability equal to the a-priori probability.

LEMMA 5.1. Let $u \in Q$ and $u \in A$, $\forall a \in A$, $P(u = a) = P(u = a | A \subseteq Q)$.

PROOF.

$$P(u = a | A \subseteq Q) = \frac{P(A \subseteq Q | u = a) \cdot P(u = a)}{P(A \subseteq Q)} \quad (11)$$

$$= \frac{P(A \subseteq Q \wedge u = a)}{P(A \subseteq Q)}$$

$$= P(u = a)$$

The first equality is due to Bayes' Theorem and the third equality is due to the fact that $A \subseteq Q$ is independent of u=a in our privacy-preserving boundary verification. In fact, knowing u=a does not limit the size or placement of the uncertain A because as a known point a, $a \in A$ and $u \in Q$ are known conditions.

LEMMA 5.2. Let $u \in Q$ and $a \in A$, $\forall a \in A$, P(u=a)=P(u=a|$A \cap Q \neq \emptyset$).

PROOF. Proof follows that of Lemma 5.1. □

As the R-tree based scheme only discloses types (1) and (2) information, the following theorem shows its security.

THEOREM 5.3. The R-tree based scheme does not leak the location of any user u, given any VO.

Proof.

Equivalently, we show there is a polynomial-time simulator SIM that can simulate the view of the client without knowing the data of SP. Specifically, it reproduces the VO of the client with the same probability distribution as if it were sent from the real SP. According to Lemmas 5.1 and 5.2, without changing the distribution P(u=a), SIM is allowed to know (1) if $A \subseteq Q$ and (2) if $A \cap Q \neq \emptyset$, for any MBB A. As such, SIM can reproduce the VO according to Section 5.1 as follows. If A⊆Q, SIM adds A's digest components for boundary verification to VO; else if A∩Q≠∅, SIM adds to VO only necessary digest components of A to compute the root digest; otherwise, SIM adds only A's digest itself to VO. This VO has the same probability distribution as generated by the real SP. Also SIM runs in polynomial time.

Unfortunately, it is hard to show type (3) information holds the same property as types (1) and (2). Since the two grid-based schemes disclose this type of information, we cannot reach a similar theorem for them as above directly. In fact, type (3) information adds complexity by possibly disclosing the relative positions of users. For example, from the VO in FIG. 5B, the client can infer that user $N_{22}$ is to the south of users $N_{13}$ and $N_{21}$ because the cell of the former is to the south of the cell of the latter two. Fortunately, there is an immediate remedy for grid-based schemes—instead of a strict grid where the upper bound of a cell, e.g., $x_i^u$, must coincide with $x_{i+1}^l$, the lower bound of the cell next to it, we adopt a loose grid where this requirement is eliminated. For example, in the x-axis in FIG. 5A, instead of cell (2,1) having its lower bound coincide with the upper bound of cell (1,1) at line $x_1$, it can use another line $x'_1$ as its lower bound; and $x_1^l$ can be either to the left or right of $x_1$. The former leads to overlapping cells while the latter leads to gaps between cells, both of which are valid as long as each object is assigned to one and only one cell. In a loose grid, while all lower bounds or upper bounds are still sorted, i.e., $x_i^l < x_j^l$ and $x_i^u < x_j^u$ if i<j, there is no direct relation between a lower bound $x_i^l$ and an upper bound $x_j^l$ anymore. As such, we effectively replace type (3) information with "next (or prior) to" information for grid-based schemes. The following lemma shows the latter has the posterior probability equal to the a-priori probability.

LEMMA 5.4. In a loose grid, let u∈Q and u∈A, ∀a∈A, P(u=a)=P(u=a|A→B), where →stands for "neat (or prior) to" in dimension x (or y).

PROOF. Proof follows that of Lemmas 5.1 and 5.2. □

Now we reach the following theorem on the security of grid-based scheme

THEOREM 5.3. The R-tree based scheme does not leak the location of any user u, given any VO.

The loose grid does not change much to the VO construction and authentication. In fact, the only major change is that, during the cell-level boundary verification on the two corner (top-left and bottom-right) cells, there are possibly a set of "top-left" and "bottom-right" cells for verification. Nonetheless, since a strict grid is also a loose grid, we consistently use strict grid for crisp presentation, unless strict security is required.

Performance Analysis and Optimizations for Range Query Authentication Scheme

In this section, we analyze the performance of the proposed authentication schemes and propose optimizations that are orthogonal to the underlying schemes used.

Cost Models of Authentication Schemes

In this subsection, we derive the cost models of client verification computation (CPU) and VO size for the proposed authentication schemes on R-tree and grid-file index. For simplicity, CPU is in terms of the total number of 90 digest function calls and signature verifications, while VO is in terms of the number of digests, digest components and signatures. We also assume a 2D unit space and query Q is a square with length q. Table 1 summarizes the symbols used in this subsection.

TABLE 1

List of Symbols

| Sym. | Definition | Sym. | Definition |
| --- | --- | --- | --- |
| N | # of users | u | user rectangle size |
| $N_A$ | # of node accesses | q | query length |
| $N_l$ | # of nodes in level l | f | avg. node fanout |
| $N_A^l$ | # of level-l node accesses | h | R-tree height |
| $s_l$ | extent of level-l node MBB | R | result cardinality |
| $D_l$ | density of level-l nodes | c | avg. cell length |

In the R-tree, boundary verifications occur on all accessed nodes or entries that stop branching, and they can be categorized into three cases (1) the leaf entries (results and non-results); or (2) the nodes that do not overlap with Q; or (3) the nodes that are totally contained in Q. Let $K_1$, $K_2$ and $K_3$ respectively denote their numbers. For the nodes in (3) and result entries in (1) (whose number is denoted by R), all 4 boundary lines need to be verified with both Q's lower and upper bounds, so each boundary verification requires 8 g( ) calls. For the nodes in (2) and non-result entries in (1) (i.e., $K_1$−R), only one of the boundary lines needs to be verified with either Q's lower or upper bound, so the boundary verification only needs one g( ) call. In addition, only the root signature needs to be verified. Therefore, the client verification computation is:

$$CPU_{rtree} = 8(R+K_3)+(K_1-R)+K_2+1. \quad (12)$$

By definition, $K_2 = fN_A^1$, where $N_A^1$ is the number of level-1 node (i.e., leaf node) accesses for Q. $K_2 = \sum_{l=1}^{h-1} fN_A^{l+1} - N_A^l$. And $K_3 = \sum_{l=1}^{h-1} fN_A^{l+1} \cdot (q-s_l)^2$, where $s_l$ is the average extent of node rectangles in level l, and $q \geq s_l$. Substituting these equations in Equation (12), we have:

$$CPU_{rtree} = 7R + (f-1)N_A + 8\sum_{l=1}^{h-1} fN_A^{l+1}(q-s_l)^2 + 1, \quad (13)$$

where $N_A$ is the total number of node accesses. This equation shows that when q is small, the computation cost is dominated by $(f-1)N_A$, which coincides with our earlier discussion. As q becomes larger, the third item will increase quadratically and dominates the others. To get the numeric value of CPU, Theodoridis et al. in Y. Theodoridis, E. Stefanakis, and T. Sellis. *Efficient cost models for spatial queries using r-trees*. TKDE, 12(1):19-32, 2000 (the content of which is incorporated herein by reference in its entirety) developed a cost model of $N_l^A$, $s_l$ and $N_A$ for uniformly distributed objects as follows.

$$s_l = \sqrt{D_l \cdot \frac{f^l}{N_l}}, \quad (14)$$

$$N_A^l = N_l \cdot (s_l + q)^2, \quad (15)$$

$$N_A = \sum_{l=1}^{h} N_A^l,$$

where $N_l$ is the number of nodes in level l, i.e., $N_l = N/f^l$, and $D_l$ is the density of level-l nodes, i.e., the number of nodes that cover an average point.

$$D_l = \left(1 + \frac{\sqrt{D_{l-1}} - 1}{\sqrt{f}}\right)^2,$$

and $D_0 = N \cdot u$.

As for the VO, new items will be included in three cases: (1) when a node N is accessed, f+1 digests will replace the node digest in VO according to Equation (4); (2) when a result entry is found, 2 digests will replace the entry digest in VO according to Equation (2); (3) when a boundary verification is required, 4 digests will replace the digest of MBB in VO according to Equation (3). Adding 1 for the root signature, the total VO size is:

$$VO_{rtree} = fN_A + R + 3(K_1 + K_2 + K_3) + 1 \qquad (16)$$

$$= (4f - 3)N_A + R + 3\sum_{l=1}^{h-1} fN_A^{l+1} \cdot (q - s_l)^2 + 1.$$

Similar to COMP, the VO size is dominated by $(4f-3)N_A$ when q is small and by the third item when q is large.

In the grid-file index, let c denote the average cell length, then each cell has $Nc^2$ users. Cell-level boundary verification only occurs on two corner cells, each of which requires 4 calls of g( ). User-level boundary verification occurs on the 4q/c boundary cells, each of which needs only one g( ) call. As for the signature verification, there are $(q/c)^2$ overlapping cells, each of which has a signature to verify. So the client verification computation is:

$$CPU_{grid} = 8 + 4Ncq + \left(\frac{q}{c}\right)^2. \qquad (17)$$

The accumulative digest scheme reduces the number of signature verifications to 1, and therefore $$CPU_{accu\_grid} = 9 + 4Ncq. \qquad (18)$$

The above two equations show that the accumulative digest scheme reduces the computation from quadratic to q to linear to q.

As for the VO, by default the digest of each overlapping cell is included in VO. It is then replaced with digests of its MBB and users according to Equation (5) in three cases: (1) the two corner cells whose MBB's digest is further replaced according to Equation (6); (2) the non-empty boundary cells whose user's digest is further replaced according to Equations (7) and (8); (3) any other non-empty cells whose user's digest is further replaced according to Equation (7). In addition, the signatures of overlapping cells, together with the digests of their immediate-adjacent cells, are also included in VO. Therefore, $$VO_{grid} = 2\left(\frac{q}{c}\right)^2 + 12Ncq + 2q^2N + 4\frac{q}{c} + 2. \qquad (19)$$

The accumulative digest scheme reduces the number of signatures in VO to 1, but adds two accumulative digests. Therefore, $$VO_{accu\_grid} = \left(\frac{q}{c}\right)^2 + 12Ncq + 2q^2N + 4\frac{q}{c} + 5. \qquad (20)$$

While the accumulative scheme has a smaller VO size, both schemes have their VO sizes dominated by $2q^2N$.

Linear Ordering and Embedding

In this subsection, we propose an optimization technique that addresses the non-linearity issue in multi-dimensional space. Whatever indexes we use for privacy-preserving authentication, R-tree or grid-file, at certain point we have to conduct boundary verification with almost every child entry. For R-tree, this occurs every time a node is branched; for grid-file, this occurs in the cells that partially overlap with (but is not totally contained in) the query range.

Figure 7:
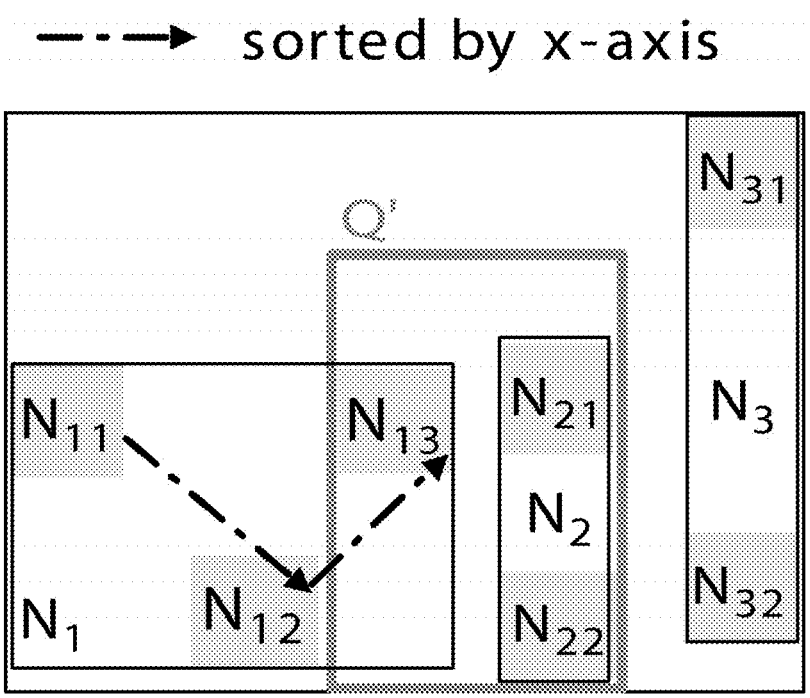
FIG. 7 shows the linear ordering process.

To filter out those entries that are faraway and hence reduce the number of entries for boundary verification, a baseline approach is to impose a linear order on these entries. It has the advantage of incurring no change on digest definition and no additional cost—the entries require an ordering anyway when they are serialized to external storage. FIG. 7 illustrates a linear order on their x values. Specifically, every entry is sorted by the x values of their rightmost boundaries. For example, in node $N_1$, users (i.e., child entries) are sorted as $N_{11}$, $N_{12}$ and $N_{13}$. Given query Q', when $N_1$ is branched, since its leftmost boundary already exceeds the rightmost boundary of $N_{12}$, there is no need to verify the boundary with $N_{11}$. Nonetheless, this optimization is not at no cost: during new entry insertion, rather than appending in the end, it requires the new entry to respect the order, and therefore this insertion could cause rearrangement of the entries in the node.

The disadvantage above inspires us to use global ordering instead of local ordering within an index node. Specifically, each entry e can be embedded (i.e., mapped) to a value range according to its MBB, and thus denoted by map(c.mbb). This mapping is public, which means it can be calculated on-the-fly by the data owner, the SP and the client, and therefore does not need to be stored in the node. The mapped value map (e.mbb) is then included in the entry c's digest, in the same way as e.mbb in Equation (2). That is, dig'(e)=h(dig(e)|dig(map(e.mbb)))

Figure 8:
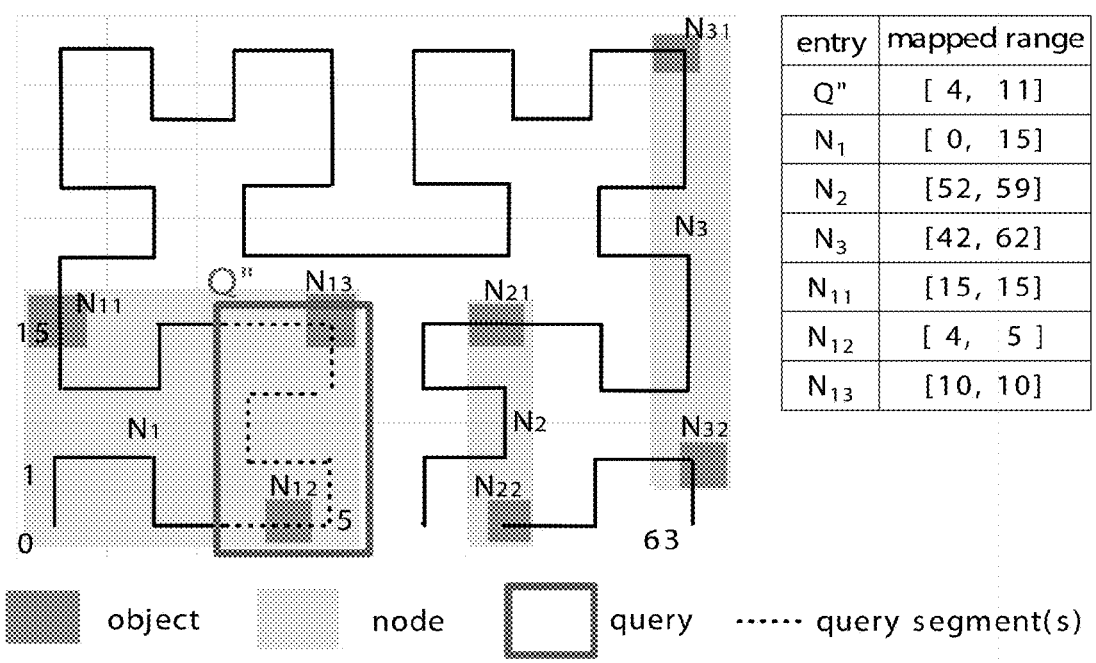
FIG. 8 shows the linear embedding process.

To enable the same filtering mechanism as in linear ordering, this mapping should preserve most of the locality. There are a lot of mature techniques on dimension-reduction mapping, most famous of which are space filling curves. FIG. 8 shows a Hilbert curve of order 3 that partitions the space of FIG. 4A into $2^3$ by $2^3$ grid cells. The curve labels each cell with a Hilbert value from 0 to 63. The mapped value range of an MBB is the lower and upper bound of the cell values with which this MBB overlaps. For example, $N_1$'s MBB overlaps the lower-left 16 cells, so map($N_1$.mbb)=[0, 15]. The query Q' is also mapped to a value range, which is [4, 11] in this example. With these ranges, the boundary verifications of $N_2$ and $N_3$ can be carried out on their 1D mapped values, instead of their 2D MBBs. Specifically, the client only needs to verify (in privacy-preserving manner) that the upper bound of Q'', 11, is larger than the lower bounds of $N_2$ and $N_3$, which are 52 and 12, respectively, and unknown to the client. Note that linear ordering can be applied on top of linear embedding. Instead of sorting entries by the x values of their rightmost boundaries, the entries are sorted by the lower bounds of their mapped ranges. In this example, entries are sorted as $N_1$, $N_2$ and $N_3$. Then since $N_2$'s lower bound already exceeds the upper bound of Q'', there is no need to verify $N_3$.

It is noteworthy that both linear ordering and linear embedding are orthogonal to the index. As such, they can be applied to both R-tree and grid-file index.

Empirical Results for Range Query Authentication Scheme

In this section, we evaluate the experimental results of the proposed three authentication schemes, namely, R-tree based, grid-file based (grid for short) and accumulative digest for grid-file (accu_grid or a.grid for short). To simulate a real-life and yet sufficiently large location registry, we assume users are distributed on a road network and thus use the California Roads dataset from Census Bureau's MAF/TIGER database. The dataset contains 2,249,727 streets of California, from which all user location coordinates in our experiment are extracted and converted to their closest integers. Both an R-tree index and a grid-file index are built on user locations, with the page size set to 4 KB. As such, the fanout of an R-tree node f and the capacity of a cell cap are both 200.

The client is set up on a desktop computer with Intel Core 2 Quad processor and 4 GB RAM, running Windows XP SP3, and the server is set up on an IBM server xSeries 335, with Dual 4-core Intel Xeon X5570 2.93 GHz CPU and 32 GB RAM, running GNU/Linux. The code of our experiments is implemented and executed in OpenJDK 1.6 64-bit. The hash function h( ) is 160-bit SHA-1, accordingly to which we set the length of n in the commutative digest definition. The signature function is 1024-bit RSA. We use the same digest function g( ) as in H. Pang, A. Jain, K. Ramamritham, and K.-L Tan. *Verifying completeness of relational query results in data publishing*. In *SIGMOD*, pages 407-418, 2005 with the base of the canonical representation set to 16. For performance evaluation, we measure the computational cost (in terms of the server and client CPU time, for query processing and verification, respectively), the communication overhead (in terms of the size of the VO) and the query response time (as the total CPU time plus the communication time over a typical 3G network at 2 Mbps download rate and 1 Mbps upload rate). The query ranges are squares whose centroids are randomly generated and whose side lengths are from $6.25 \times 10^{-1}$ to $4 \times 10^{-2}$ of the total space length, as controlled by parameter q. For each measurement, 1,000 queries are executed and their average value is reported. Table 2 summarizes the parameter settings used in the experiments.

TABLE 2

Parameter Settings for Experiments

| Parameter | Symbol | Value |
| --- | --- | --- |
| dataset size | N | 2,249,727 |
| page size | — | 4 KB |
| query length | q | $[6.25 \times 10^{-4}, 4 \times 10^{-2}]$ |
| R-tree node capacity | f | 200 |
| grid cell capacity | cap | 200 |

Basic Query Authentication Performance

Figure 9A:
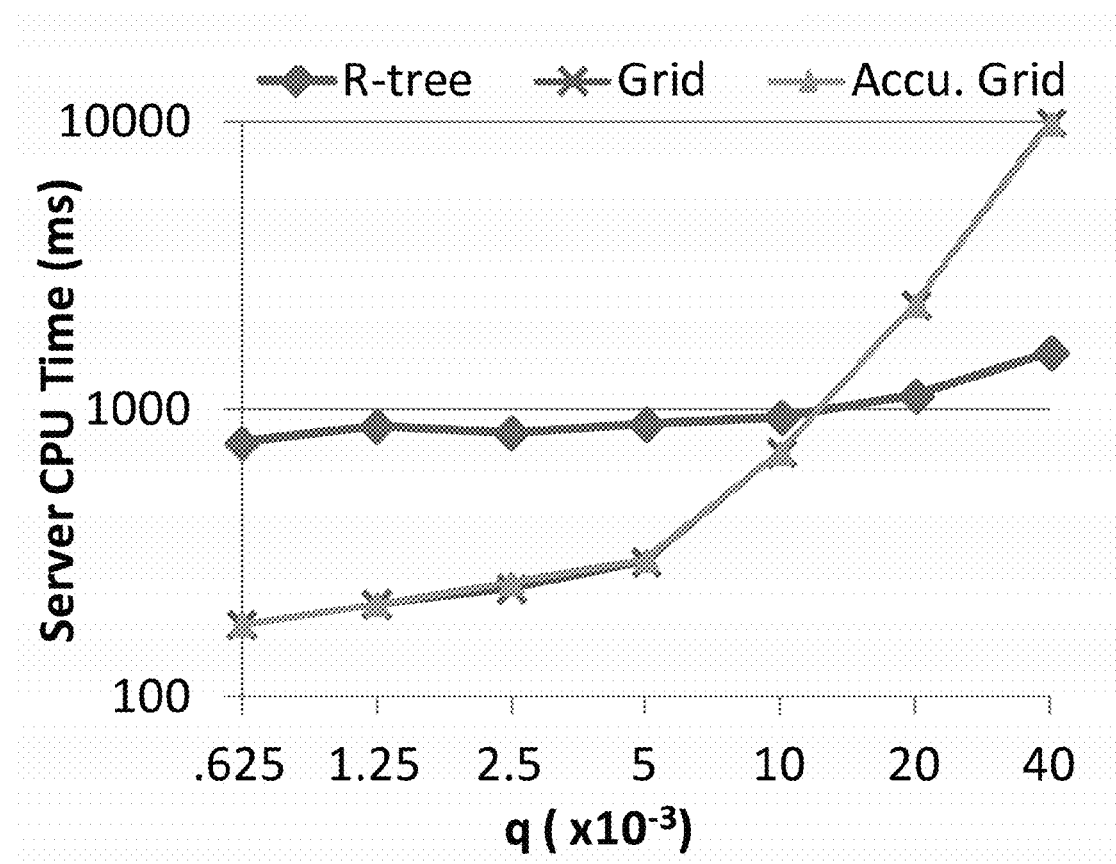
FIGS. 9A-9D show the performance (server CPU time, client CPU time, VO size, and query response time respectively) of the basic query authentication approach.
Figure 9B:
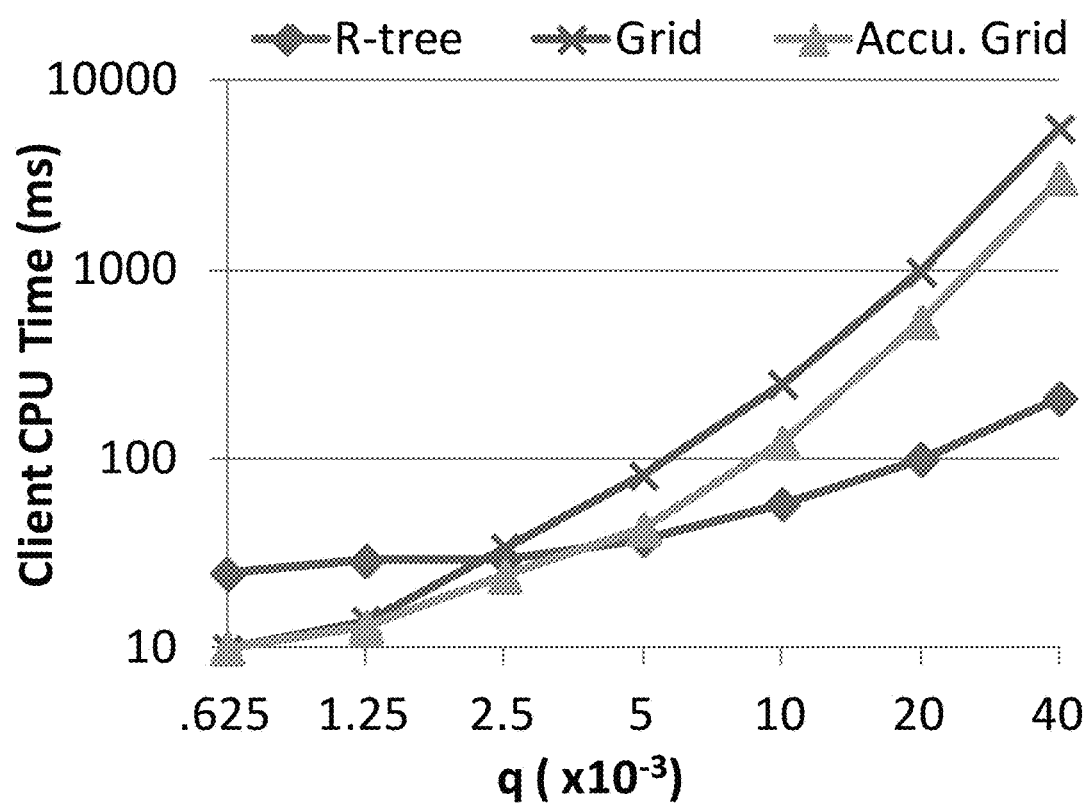
Figure 9C:
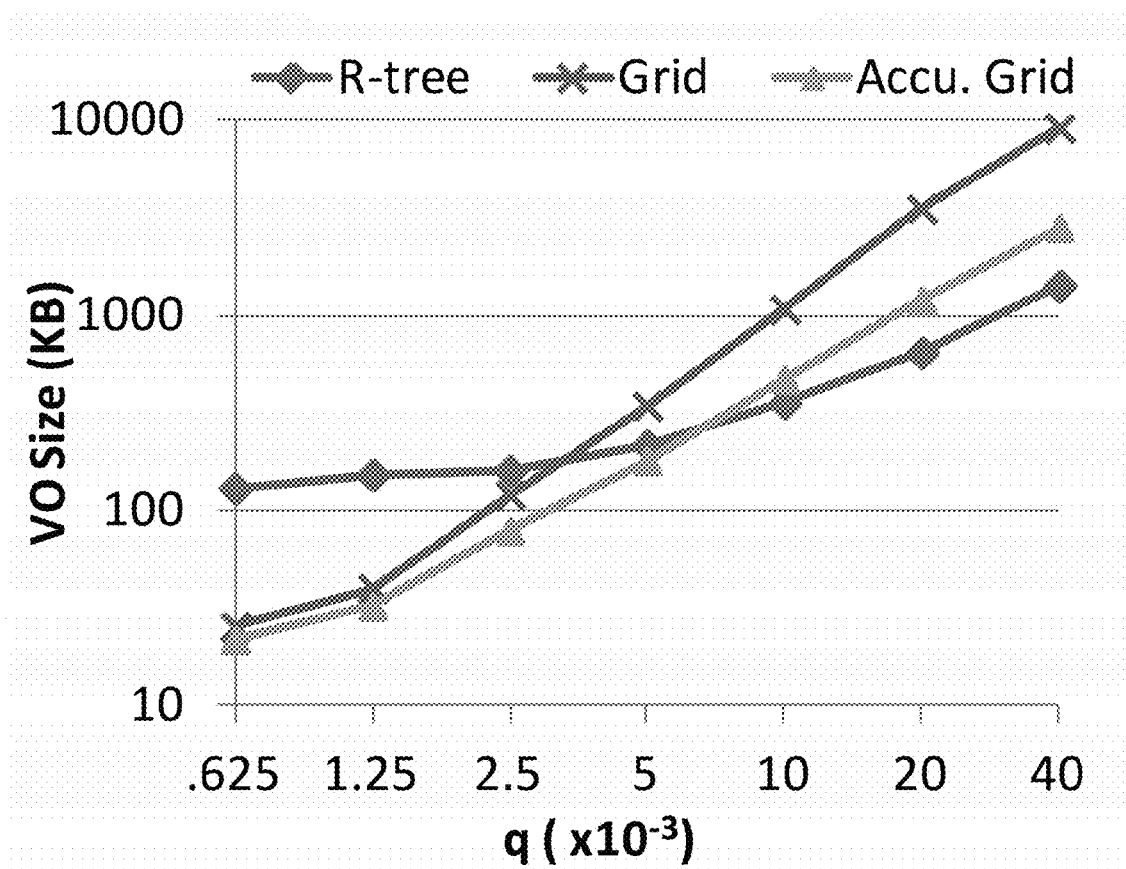
Figure 9D:
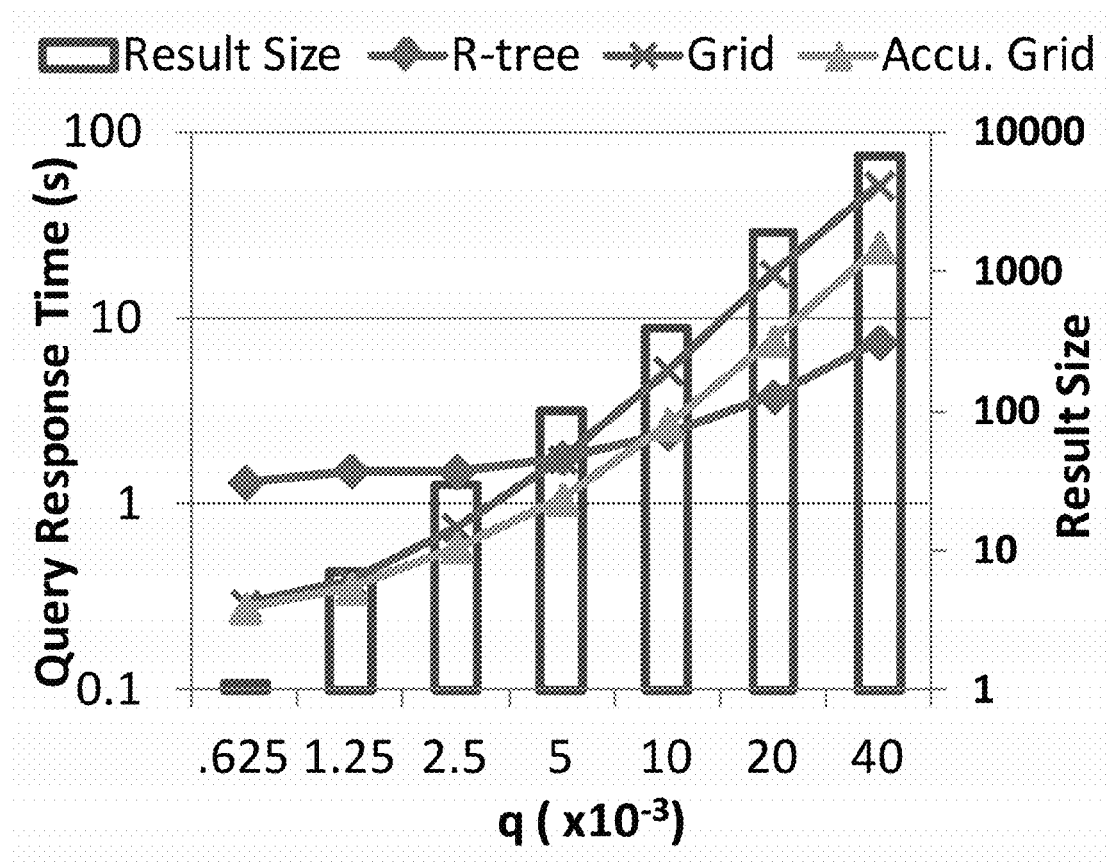
Figure 10A:
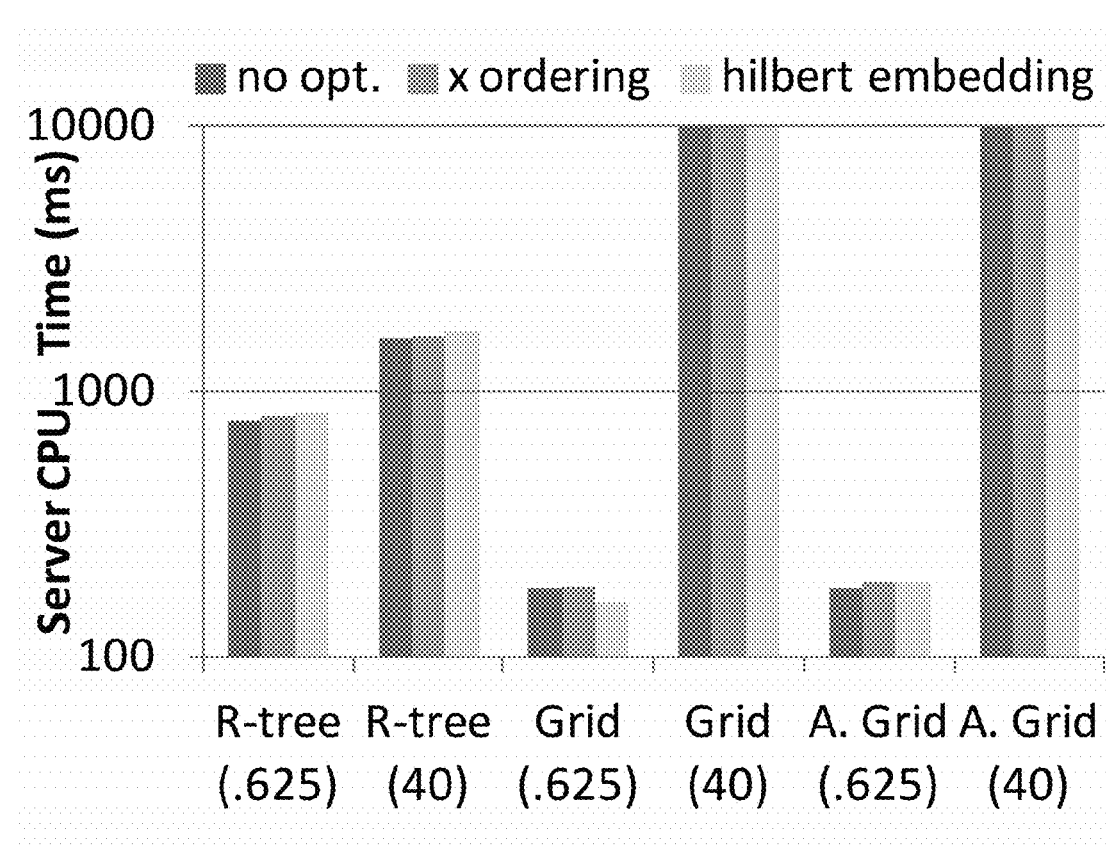
FIGS. 10A-10D show the performance (server CPU time, client CPU time, VO size, and query response time respectively) of the optimized query authentication approach.
Figure 10B:
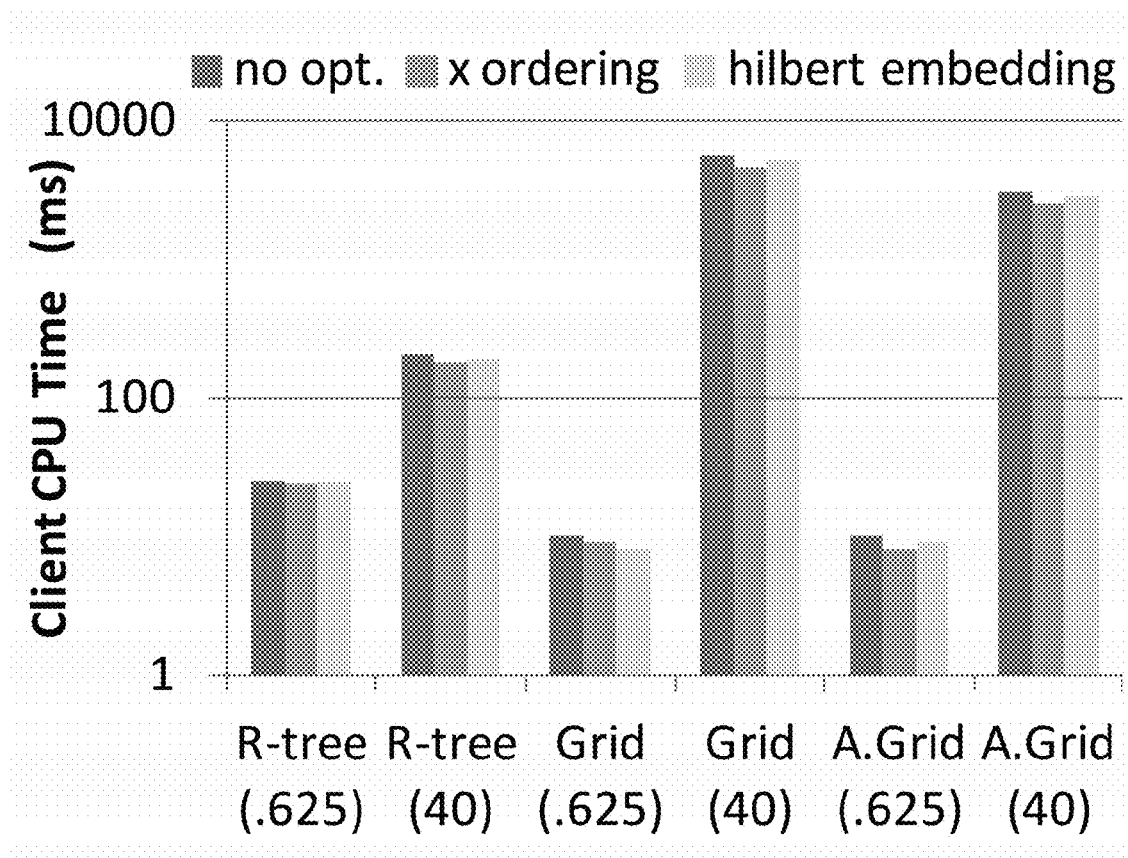
Figure 10C:
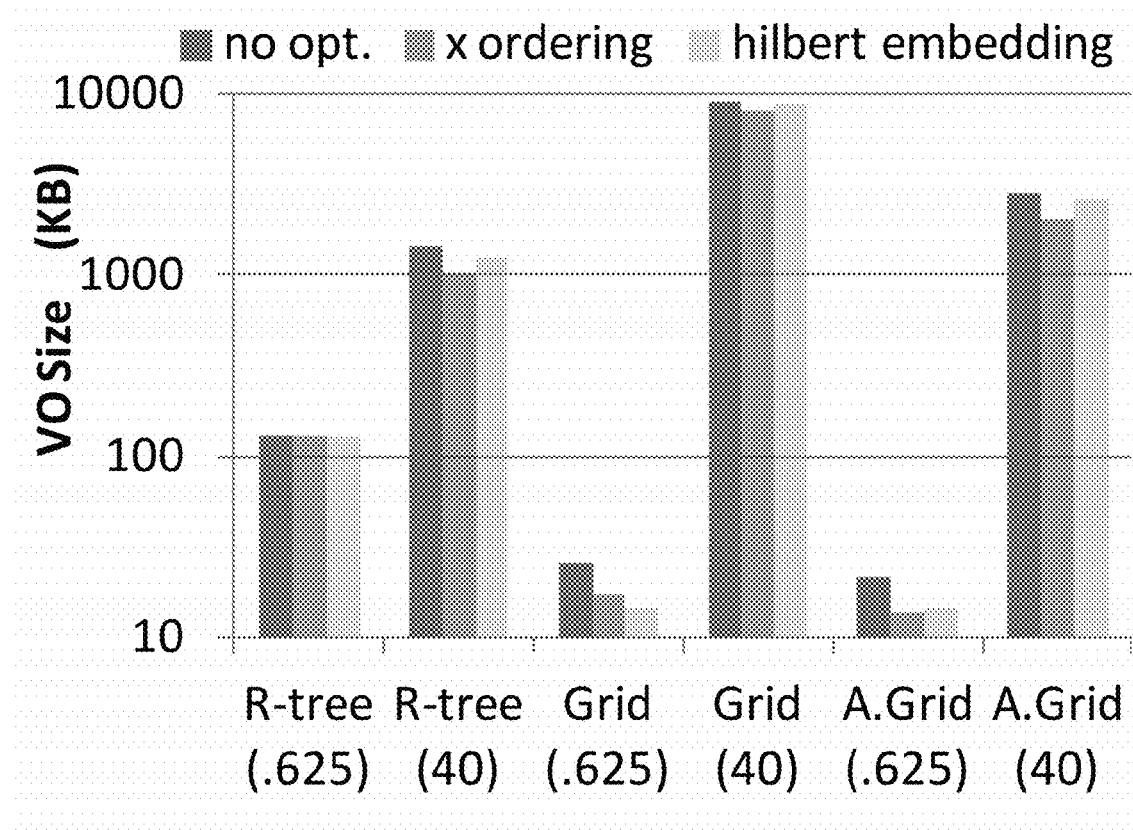
Figure 10D:
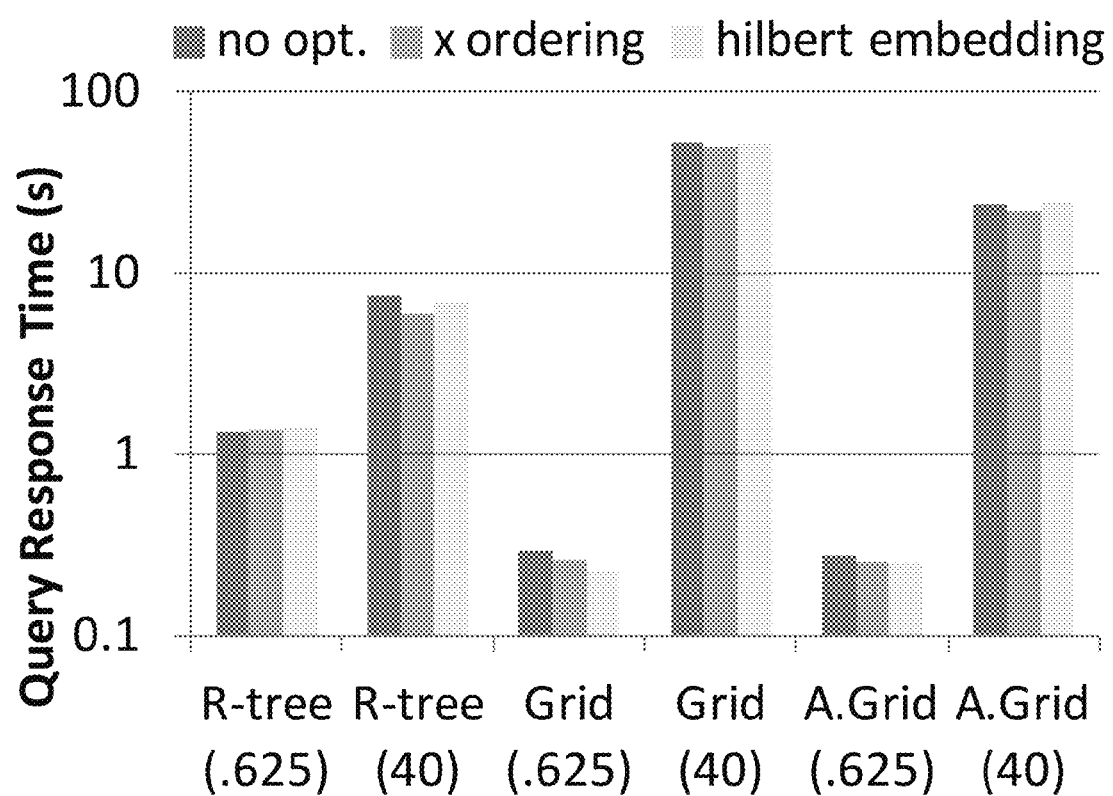

In this subsection, we evaluate the authentication performance of the three schemes without introducing any optimization. For visualization purpose, we normalize the dataset to a unit space. We repeatedly double the query length q from $6.25 \times 10^{-4}$ to $4 \times 10^{-2}$ and plot the server CPU time, client CPU time, VO size and query response time (together with the result size) in FIGS. 9A-9D. These figures show that grid and grid_accu outperform R-tree in small and medium-sized queries, until at $q=10 \times 10^{-3}$ where the query result size reaches 388. Furthermore, grid_accu consistently outperforms grid, in terms of the client CPU time and VO size. For example, at $q=5 \times 10^{-3}$, grid_accu v.s. grid is 43 ms v.s. 82 ms (client CPU time) and 180 KB v.s. 344 KB (VO size). As q increases, this performance gap becomes even larger. This coincides with our analysis that grid_accu reduces the computation of grid from quadratic to linear and halves the VO size for large q. Nonetheless, for very large queries (e.g., $q=20 \times 10^{-3}$ whose result size is 1,912), R-tree is the best in all metrics, thanks to the hierarchy imposed in space. All these metrics of R-tree also have similar trends, which can be explained by the cost model that they are all dominated by $\Sigma_{l=1}^{h-1} f N_A^{l+1} \cdot (q-s_l)^2$ when q is large. As a summary, the query response time in FIG. 9D indicates the winner is accu_grid for queries of small and medium size, and is R-tree for extremely large queries.

Performance with Optimizations

In this subsection, we evaluate the performance of the three schemes with the linear ordering and linear embedding introduced earlier. In particular, we implement the ordering by x-value (labeled by "x ordering") and the embedding by Hilbert values with curve order set to 10 (labeled by "Hilbert embedding" and imposed linear order on top of it). Table 3 shows the construction time and index size for different schemes. We observe that by introducing the accumulative digest, linear ordering or embedding does not have noticeable effect on the construction time, nor does they have any effect on the index size. The grid-based schemes take more time to construct than R-tree, simply because a grid file has more cells than R-tree nodes to compute digests or signatures. Nonetheless, the longest construction time is just about 3 hours, which is acceptable as the construction is an offline operation.

TABLE 3

Construction Cost

| | CPU Time (s) | | | Index Size (MB) | | |
| --- | --- | --- | --- | --- | --- | --- |
| | Rtree | Grid | A.Grid | Rtree | Grid | A.Grid |
| original | 2311 | 11520 | 11619 | 124 | 2441 | 2441 |
| x ordering | 2453 | 11728 | 11770 | 124 | 2441 | 2441 |
| Hilbert embed. | 2526 | 11859 | 11842 | 124 | 2441 | 2441 |

To evaluate the effects of optimizations for various queries, we plot the same metrics as above in FIGS. 10A-10D for $q=6.25 \times 10^{-4}$ and $q=40 \times 10^{-3}$, respectively. Except for the server CPU time, in all occasions the optimizations enhance the query authentication performance. This justifies our claim that the optimizations are transparent and orthogonal to the authentication schemes employed. The performance gain is particularly significant for grid and accu_grid schemes in small queries, which is up to 40% reduction. For example, in A.Grid(0.625), the performance of x-ordering v.s. no optimization is: 8 ms v.s. 10 ms (client CPU time), and 13 KB v.s. 21 KB (VO size). This corresponds to our discussion earlier that imposing a linear order can prune unnecessary boundary verifications of faraway entries, although larger queries may make this pruning less beneficial. The server CPU time of optimized schemes is worse than the basic ones because we implement the VO construction with no cache, that is, the server computes the digests of entries on-the-fly. As such, pruning unnecessary boundary verifications essentially ships some g( ) calls from the client back to the server. With the caching of digests in effect, we expect the optimized schemes will also outperform the basic ones in terms of server CPU time.

Update Costs of User Locations

Figure 11A:
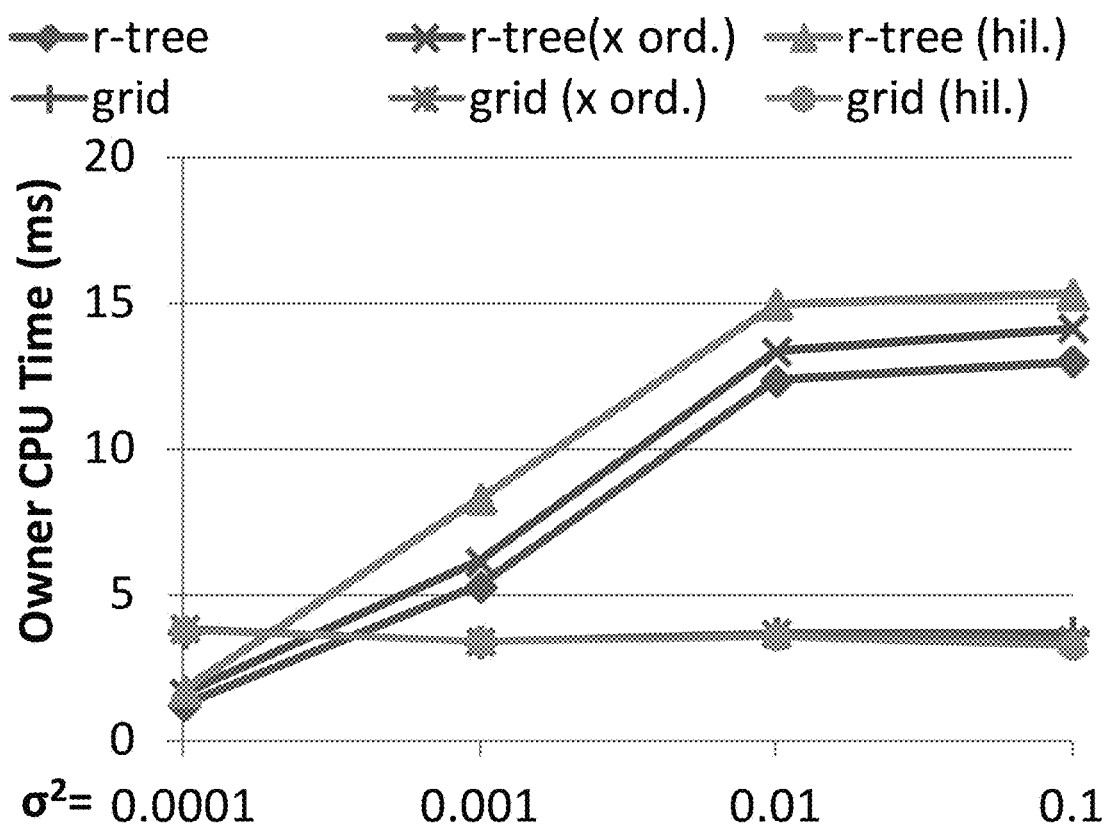
FIGS. 11A and 11B show the performance cost for data owner updates.
Figure 11B:
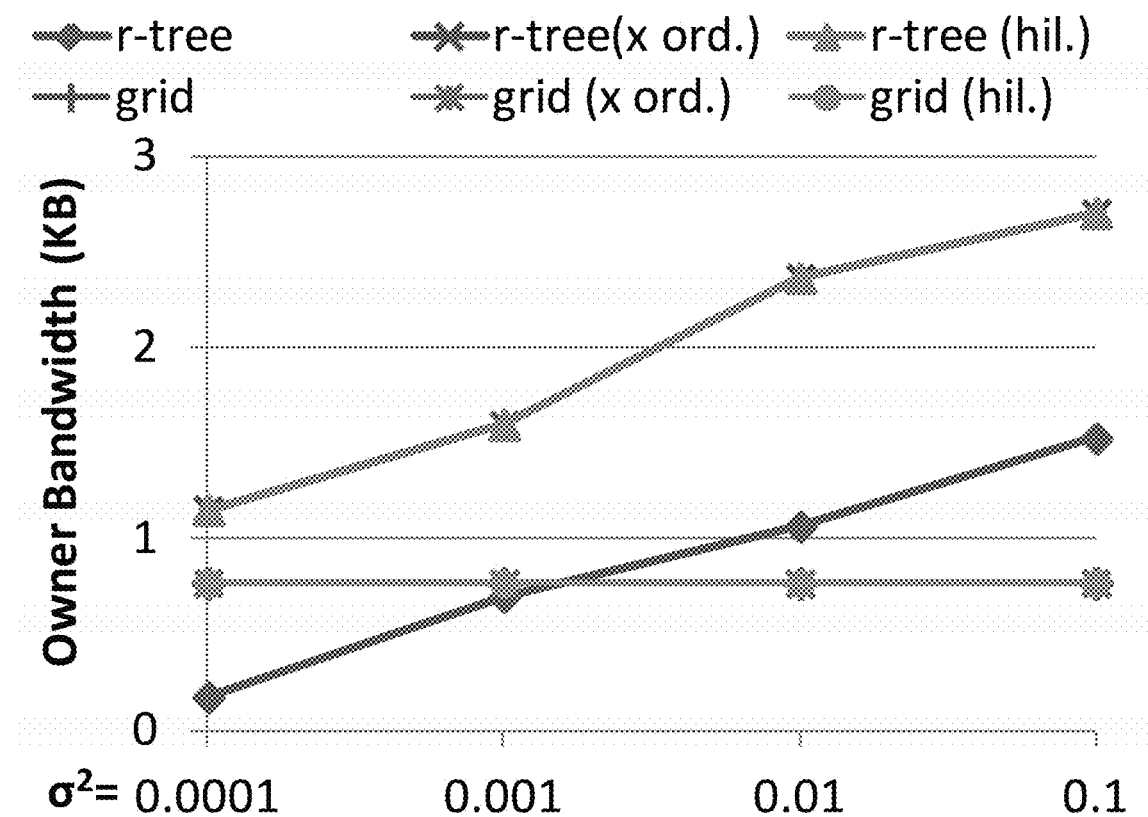

In this subsection, we evaluate the cost of dataset updates for the authentication schemes, with and without the optimizations. Since the accu_grid scheme is designed mainly for static datasets, we omit it in the comparison. We simulate a user random walk by moving dev distance away from his/her current position in each dimension, where dev follows a Gaussian distribution with $\mu=0$ and $\sigma^2$ as the scaling factor that controls how faraway the user's new location is from the old one. The larger the $\sigma$, the farther away the new location is. Each location update is a deletion immediately followed by an insertion in the dataset. We simulate 5,000 location updates and plot the average CPU time and bandwidth (to update the server's copy) of the data owner for each update in FIGS. 11A and 11B, respectively. We observe that grid is more efficient than R-tree for location updates as only the user-residing cell and other 4 adjacent cells need to be updated, as opposed to R-tree where the update needs to be propagated along the tree path all the way to the root. Furthermore, as the deviation factor $\sigma^2$ increases, the cost of R-tree increases, which can be explained as follows. As $\sigma^2$ becomes larger, the new location shares less common tree path with the old location, and is also more likely to cause an upper node overflow or underflow, both of which lead to more digests of nodes to be updated. Another observation is that the proposed optimizations do incur overhead in the R-tree scheme, when the entries are resorted or even their embedded values (and hence their digests) recomputed. In FIGS. 11A and 11B, this overhead is about $1_{-2ms}$ CPU time and 1 KB bandwidth per update.

Problem Formulation for kNN Query Authentication Scheme

In this further problem formulation we shall provide for problem formulation for the embodiment of the present invention that addresses privacy-preserving kNN query authentication for location-based services.

Without loss of generality, we model the dataset $\mathbb{D}$ in an integer-domain 2D space. For ease of presentation, we assume each point in $\mathbb{D}$ represents a user and the results of a kNN query Q are $R=\{p_1, p_2, \ldots, p_k\}$, where $p_i$ is the id (in a real location-based service, Q may return specific contents to the querying client, such as the users' names or their Facebook pages; we assume these contents can be retrieved faithfully using the returned ids) of the i-th nearest user to the query point q in $\mathbb{D}$ in terms of Euclidean distance. Formally, $Dist(p_{i+1},q) \geq Dist(p_i,q)$, $1 \leq i \leq k-1$; and $\forall p_j \in \mathbb{D} -R$, $Dist(p_j,q) \geq Dist(p_k,q)$. The query Q is executed by the service provider (SP) on the dataset $\mathbb{D}$, which is authorized and signed by the data owner (DO). The authentication problem is for the querying client to verify that the SP executes Q faithfully in terms of two common authenticity conditions: (1) soundness condition: the returned users are all genuine kNN results and no returned ids are tampered with; (2) completeness condition: no genuine kNN results are missing. It is noteworthy that due to the nature of kNN queries, the completeness is implied by the soundness. The privacy-preserving authentication problem is to authenticate the kNN query results while guarding user location information against the client. That is, when the querying client verifies the query results, it cannot infer any information about the locations of returned users, beyond what is implied from the results. If privacy were not a concern, authenticating a kNN query would follow the following procedures. The SP returns a verification object (VO) to the client, along with the query results R. Conceptually, the VO may include the location points of all users in the dataset $\mathbb{D}$ and a signature of $\mathbb{D}$. The querying client uses the VO to verify the soundness (and completeness) of the results by testing the following four conditions:

None of the locations and ids of the u, in R are tampered with;

No locations of the users in $\mathbb{D} -R$ are missing and none of them are tampered with;

$\forall p_i \in R$, $Dist(p_k,q) \geq Dist(p_i,q)$; (for ease of presentation, we relieve the client from verifying the order of kNN results, and thus use this relaxed condition instead of $Dist(p_{i+1},q) \geq Dist(p_i,q)$; nonetheless, the latter condition can be tested using the same proposed methods if the order of results needs to be verified)

$\forall P_j \in \mathbb{D} -R$, $Dist(p_j,q) \geq Dist(p_k,q)$.

Figure 12:
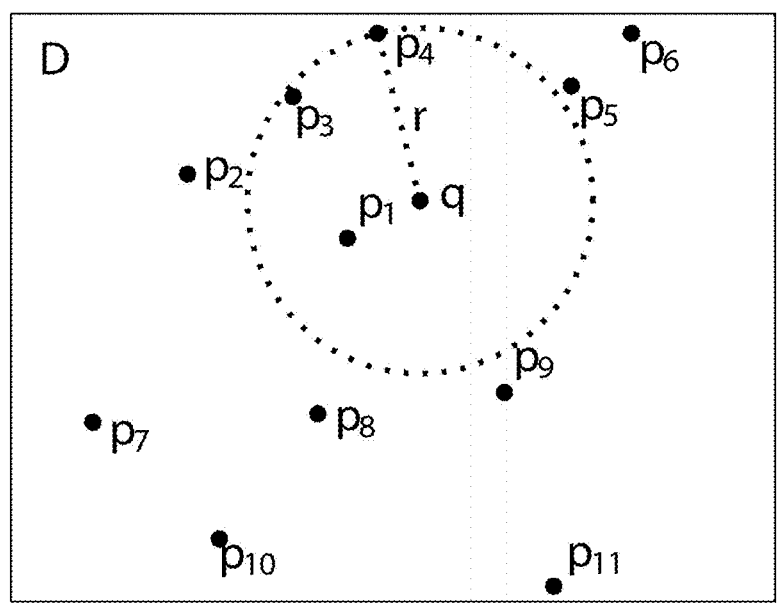
FIG. 12 shows the process of a kNN query authentication.

FIG. 12 illustrates a 3NN query, where $R=\{p_1, p_3, p_4\}$, and $\mathbb{D} -R=\{p_2, p_5, p_6, p_7, p_8, p_9, p_{10}, p_{11}\}$. Obviously, in order not to disclose user locations to the client, verifying the latter two conditions requires a private distance comparison of two points, which will be further presented herein. Furthermore, to avoid enumerating all points in $\mathbb{D} -R$ when verifying the second and fourth conditions and thus minimize the VO size, two comprehensive authentication schemes on common spatial indexes will also be further presented herein.

Security Model for kNN Query Authentication Scheme

We assume that: (1) the DO is trusted by the querying client and SP; (2) the SP has read access to the user locations and the query point; and (3) the DO will not collude with the client or SP. Therefore, the two security threats in this problem are: (1) the querying client may attempt to infer the location information of returned users from the VO; and (2) the SP may dishonestly return tampered results of a query in favor of its own benefits.

For ease of presentation, we also assume that all parties (DO, SP, and client) follow a semi-honest model. That is, they follow the designated protocol properly, but they may record intermediate results and try by all means to deduce about the private information of other parties. Finally, we follow the common assumption in cryptography that any party may know the protocol and algorithms of other parities, except for the secret keys the other parties may own or cipher-texts encrypted by other parties' secret key. Nonetheless, the capability of any adversary is bounded by its polynomial computational power and storage space.

Private Distance Comparison

In this section, we propose two primitive methods for the client to privately compare $Dist(s,q)$ and $Dist(t,q)$ without knowing the locations of users s, t or their distances. These two methods form the basic cryptographic constructs of privacy-preserving kNN query authentication schemes in the next section. Table 4 summarizes the symbols and notations used in this section.

TABLE 4

Summary of Symbols and Notations
Paillier-Points based (PPB) method

| Symbol | Description |
| --- | --- |
| Dist(s, t) | the Euclidean distance from point s to point t |
| Dist(M, t) | the minimum Euclidean distance from an MBR M to point t |
| E( ) | the homomorphic encryption function (e.g., Paillier) |
| S( ), S$^{-1}$( ) | the encryption and decryption function in a multiplicative public-key cryptography (e.g., RSA) |
| φ( ) | Euler's totient function |
| l(s, t) | the line that connects points s and t |

TABLE 4-continued

Summary of Symbols and Notations
Paillier-Points based (PPB) method

| Symbol | Description |
| --- | --- |
| $\perp(s, t)$ | the half-plane where point is closer to point s than to point t |
| $\mathcal{HL}(s, t)$ | the half-line where point has equal distance to points s and t |
| L, U | the lower bound and upper bound of a domain |

The main idea of this method is to apply encryption on points. To enable arithmetic operations on cipher-texts, as required by Euclidean distance computation, we adopt a popular homomorphic cryptosystem—Paillier as detailed in P. Paillier. *Public-key cryptosystems based on composite degree residuosity classes*. In *Proc. of EUROCRYPT'99*, pages 223-238, 1999.

Introduction to Paillier Cryptosystem

Paillier is a public-key homomorphic cryptosystem that satisfies additive homomorphism, which means that one can compute a cipher-text of $m_1+m_2$ by only having the public key and cipher-texts of $m_1$ and $m_2$. The procedure of Paillier's encryption on a plain-text message $m \in \mathbb{Z}_n$ (i.e., $0, 1, \ldots, n-1$) is as follows:

Let p, q be two extremely large prime numbers and n=pq.

Select a random value r which is multiplicative invertible (modulo n) and a fixed value g which is multiplicative invertible (modulo $n^2$). Pair (g,n) is the public key.

The cipher-text $c = g^m r^n \mod n^2$.

Here $\mathbb{Z}_n^*$ is the subset of $Z_n$ whose elements have multiplicative inverses (modulo n) and Paillier has the following properties:

$$\forall m_2, m_2 \in \mathbb{Z}_n, \forall r_1, r_2 \in \mathbb{Z}_n^*,$$

$$E(m_1, r_1) E(m_2, r_2) \equiv E(m_1+m_2, r_1 r_2) \mod n^2 \quad (21)$$

$$E(m_1, r_1)^{m_2} \equiv E(m_1 m_2, r_1^{m_2}) \mod n^2 \quad (22)$$

$$E(m_1, r_1) \equiv E(m_1 + k\phi(n^2), r_1) \mod n^2, k=1,2 \quad (23)$$

Private Distance Comparison with PPB Method

Proving $\text{Dist}(s,q) \geq \text{Dist}(t,q)$ is equivalent to proving $$\text{Dist}(s,q)^2 - \text{Dist}(t,q)^2 = \delta, \text{ where } \delta \geq 0. \quad (24)$$

Let $x_p$ and $y_p$ denote the x and y coordinate of a point p, respectively. By expanding $\text{Dist}(s,q)^2$ and $\text{Dist}(t,q)^2$, we rewrite Equation (24) as follows:

$$2x_s x_q + 2y_s y_q + x_s^2 + y_s^2 = 2x_s x_q + 2y_s y_q + x_t^2 + y_t^2 + \delta.$$

If both sides of this equation are encrypted by Paillier, according to Equations (21) and (22), it is equivalent to proving the following equation instead (by the definition of Paillier encryption, Equation (25) holds when the following two conditions are satisfied: first, the random values of r for $x_s$ and $y_s$ (resp. $x_t$ and $y_t$) are the same; second, the client knows the random value of r for 6 and can thus multiply some constants to balance Equation (25)):

$$E(2x_t)^{x_q} E(2y_t)^{y_q} E(x_s^2) E(y_s^2) = E(2x_s)^{x_q} E(2y_s)^{y_q} E(x_t^2) E(y_t^2) E(\delta) \mod n^2. \quad (25)$$

In Equation (25), except for $x_q$, $y_q$, and $E(\delta)$ (which is computed by the SP as shown below), all rest items can be precomputed and signed by the DO offline. And since only the DO possesses the private key of Paillier, these items cannot be decrypted by the client. Thus, the client can verify Equation (25) without knowing s or t.

Verifying Equation (25) holds only proves that δ is the difference of distances, and the client still needs to verify that δ>0 without knowing δ itself. Thanks to the collision-resistant property of Paillier, the SP is unable to find another δ' such that $E(\delta')=E(\delta)$, except for the trivial collisions $\delta'=\delta+k\phi(n^2)$ (according to the third property of Paillier, see Equation (23)), where $k=1, 2, \ldots$, and $\phi(n^2)$ is Euler's totient function. Since $\phi(n^2)=(p-1)(q-1)n \gg U$, verifying $\delta \geq 0$ is equivalent to verifying $\delta \in [0, U]$, where U is upper bound of a domain (e.g., 32-bit integer). To this purpose, we propose a method called seeds-representation, which is based on the canonical representation of integers. Let B be the base, then $$\delta = \sum_{i=0}^{m} \delta_i \cdot B^i, \quad (26)$$

where $\delta_i \in [0, B-1]$. To ensure $\delta \in [0, U]$, we set $m = \log_B(U)$. Applying Equation (21) on Equation (26), we get:

$$E(\delta) = \prod_{i=0}^{m} E(B^i)^{\delta_i} \mod n^2. \quad (27)$$

Applying a public-key encryption S( ) with multiplicative homomorphism (e.g., RSA) on the above equation, we can get:

$$S(E(\delta)) = \prod_{i=0}^{m} S(E(B^i))^{\delta_i} \mod n^2. \quad (28)$$

Equations (27) and (28) essentially tell us that, the SP is able to not only compute $E(\delta)$ from the set of encrypted seeds $E(B^i)$ ($i=1, 2, \ldots m$), but also "sign" it without knowing the private key of the DO, if and only if δ has a canonical representation as in Equation (26), and thus proving $\delta \in [0, U]$.

The following is the whole Paillier-Points based distance comparison procedure. During service initialization, the DO signs all encrypted seeds $E(B^i)$ into $S(E(B^i))$ ($i=1, 2, \ldots, m$) for the SP, so that the latter can "sign" any future $E(\delta)$. It also encrypts $E(2x), E(2y), E(x^2), E(y^2)$ for every data point in $\mathbb{D}$. Upon a comparison on $\text{Dist}(s,q) \geq \text{Dist}(t,q)$, besides sending $E(2x), E(2y), E(x^2), E(y^2)$ of both s and t, the SP also sends back $E(\delta)$ and its signature $S(E(\delta))$. By verifying Equation (25) holds, the client can verify that 6 is the difference of distances; and by verifying the signature $S(E(\delta))$, the client can verify $\delta > 0$.

Pre-Signed Lines Based (PLB) Method

While the PPB method can compare the distances privately for any arbitrary pair of points, the homomorphic functions on the SP and the client are costly. In this subsection, we propose an alternative method where the DO pre-computes and pre-signs the distance comparison result for a selected pair of data points.

Preliminary—1D Case

Figure 13A:
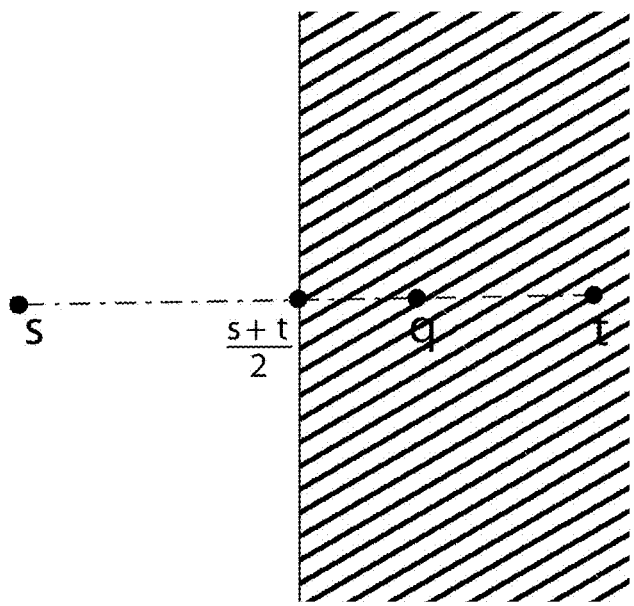
FIGS. 13A and 13B show the distance comparison in two different dimensions.

For ease of representation, we assume that s, t, and q are all even numbers throughout this subsection. As shown in FIG. 13A, $\text{Dist}(s,q) \geq \text{Dist}(t,q)$ if and only if q is to the right side of $$\frac{s+t}{2}.$$

In other words, the distance comparison is reduced to comparing q with a private value $$\frac{s+t}{2}.$$

In H. Pang, A. Jain, K. Ramamritham, and K.-L Tan. *Verifying completeness of relational query results in data publishing.* In *SIGMOD*, pages 407-418, 2005, Pang et al. proposed a method for verifying $q \geq \alpha$ without the client knowing the value of $\alpha$. The idea is to let the client and SP jointly compute the digest g of value x–L, where L is the lower bound of the domain of x. The SP first computes $g(q-\alpha)$ and sends it to the client, who then computes $g(q-L)=g(q-\alpha) \otimes g(\alpha-L)$, where $\otimes$ is a well-defined operation on the digest. Note this equation is guaranteed by the homomorphic property of the digest function g( ), and g( ) has another property that accepts only non-negative numbers. As such, by sending $g(q-\alpha)$, the server claims $q \geq n$. The client verifies $q \geq \alpha$ by comparing the jointly computed $g(q-L)$ value with the $g(q-L)$ value signed by the DO.

Private Distance Comparison with PLB Method

When s, t, and q are 2D points, we propose a geometric approach that can reduce the distance comparison to a 1D value comparison as above. First, we introduce the notion of half-plane.

Definition: Half-plane.

Given point s and t, half-plane $\perp(t,s)$ (the shaded part in FIG. 13B) is defined as the set of points that are closer to t than to s:

$$\perp(t,s)=\{p \in \mathbb{R}^2 | \text{Dist}(t,p) \leq \text{Dist}(s,p)\}$$

The set of points that have equal distances to s and t are defined as half-line, denoted as $\mathbb{R}\mathcal{L}(s,t)$.

Figure 13B:
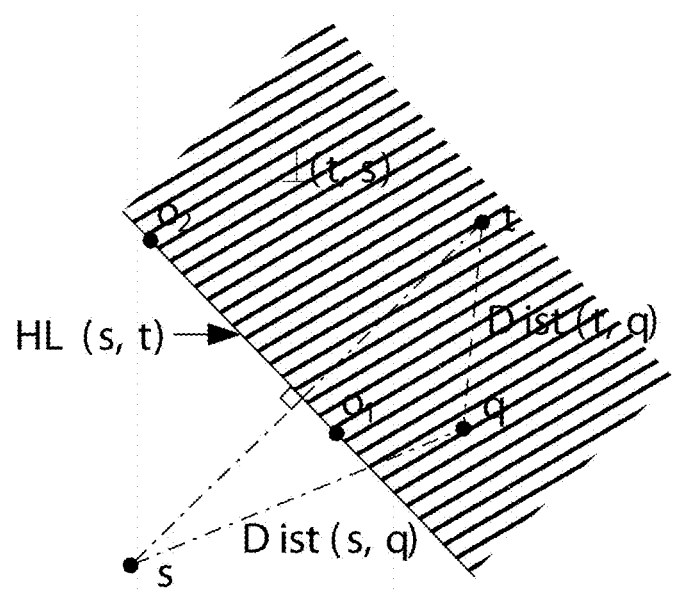
Figure 14:
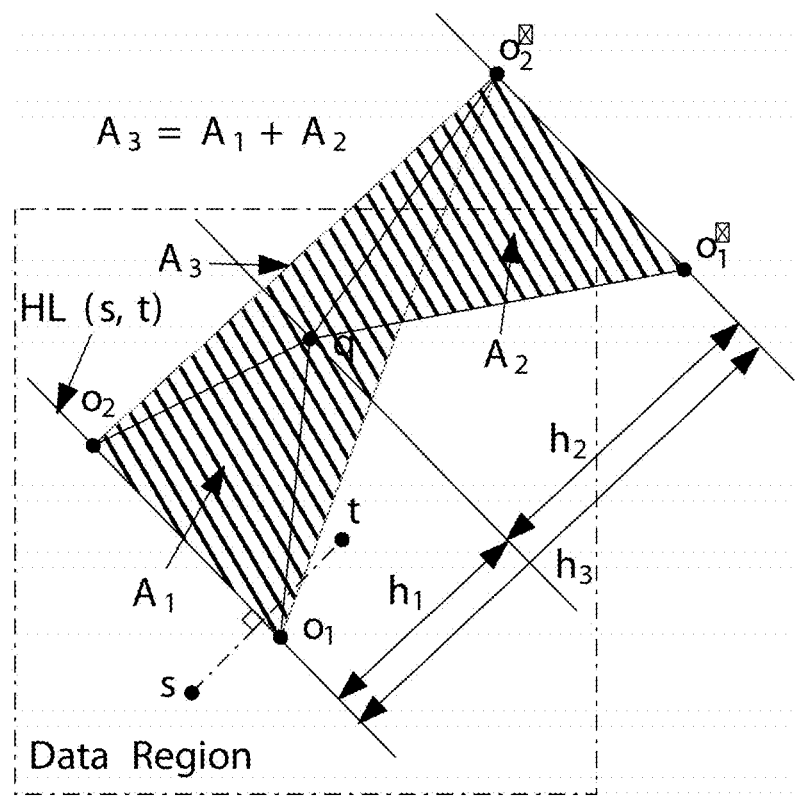
FIG. 14 shows an illustration of the pre-signed line based method.

As can be seen from FIG. 13B, verifying $\text{Dist}(s,q) \geq \text{Dist}(t,q)$ is equivalent to verifying $q \in \perp(s,t)$. As in FIG. 14, let points $o_1, o_2$ denote two arbitrary points on half-line $\mathbb{R}\mathcal{L}(s,t)$, verifying $q \in \perp(s,t)$ is equivalent to verifying the area of $\Delta qo_2o_1$ is non-negative. However, disclosing $o_1$ and $o_2$ to the client will disclose $\mathbb{R}\mathcal{L}(s,t)$ and thus the locations of s and t. To avoid this, the SP takes the following approach. First, it finds another line $l(o'_1, o'_2)$ parallel to $l(o_1, o_2)$ and far away from the data region. Further, $\text{Dist}(o'_1, o'_2) = \text{Dist}(o_1, o_2)$. Let $A_1$ denote the area of $\Delta qo_2o_1$, $A_2$ the area of $\Delta qo'_1o'_2$, and $A_3$ the area of $\Delta o'_2o_2o_1$, we have $$A_3 = \frac{1}{2}|o_1o_2| \cdot h_3$$
$$= \frac{1}{2}|o_1o_2| \cdot (h_1 + h_2)$$
$$= \frac{1}{2}|o_1o_2| \cdot h_1 + \frac{1}{2}|o'_1o'_2| \cdot h_2$$
$$= A_1 + A_2$$

The above equation resembles the 1D case where the digest value $g(q-L)$ is jointly computed by the SP (for digest $g(q-\alpha)$) and the client (for digest $g(\alpha-L)$). Here by analogy, $g(A_1)$ is computed by the SP (because it involves private points $o_1$ and $o_2$), $g(A_2)$ is computed by the client based on $o'_1, o'_2$ and q (in order not to disclose $o'_1$ and $o'_2$ to the client, $A_2$ is further encrypted), and $g(A_3)$ does not involve q and can thus be pre-computed and signed by the DO. The client verifies $A_1 \geq 0$ (and thus $\text{Dist}(s,q) \geq \text{Dist}(t,q)$) by comparing the jointly computed $g(A_3)$ value with the $g(A_3)$ value signed by the DO. If they are the same, the client can verify $A_1 \geq 0$.

We are yet to show how integer points $(o_1, o_2)$ and $(o'_1, o'_2)$ can be found given data points s and t. Assuming the coordinates of s and t are even numbers, a valid setting can be $o_1=((x_s+x_t)/2, (y_s+y_t)/2)$, and $o_2=((x_s+x_t)/2+k(y_s-y_t), (y_s+y_t)/2+k(x_t-x_s))$, $k=1, 2, \ldots$. Similarly, $o'_1$ and $o'_2$ can be derived by some translation of $o_1$ and $o_2$, respectively.

Authenticating kNN Queries without Compromising Privacy

Equipped with the PPB and PLB methods on private distance comparison, in this section we study privacy-preserving authentication of kNN queries on a 2D dataset $\mathbb{D}$. Recall that $R=\{p_1, p_2, \ldots, p_k\}$ are the results, and the authentication verifies the following conditions: (1) $\forall p_i \in R, \text{Dist}(p_k, q) \geq \text{Dist}(p_i, q)$, and (2) $\forall p_i \in \mathbb{D} - R, \text{Dist}(p_i, q) \geq \text{Dist}(p_k, q)$. As with all existing authentication techniques, we assume that the authentication is carried out on a spatial index. In this invention, we focus on R-tree and Voronoi Diagram and propose the corresponding authentication schemes. Each scheme consists of the offline construction of the authentication data structure (ADS), the online construction of the VO for a query, and the client verification procedure.

Authentication on MR-Tree

In this subsection, we firstly introduce the general framework on Merkle R-tree based kNN authentication without privacy-preserving requirement, and then present our privacy-preserving scheme.

Preliminary—Merkle R-Tree and kNN Query Authentication

Merkle R-tree (MR-tree) is an integration of R*-tree and Merkle Hash tree (MHT). FIG. 15B shows an MR-tree for the data points in FIG. 15A. Every entry $N_i$ in a non-leaf node has a minimum bounding rectangle (MBR) (denoted by $N_i$.mbr) and a digest for its child entries (denoted by $H_i$), while every leaf entry $p_i$ has a corresponding data point (denoted by $p_i$.p) and a digest of its id (denoted by $h_i$). Inspired by MHT, the digest of a non-leaf entry is the hash value of the concatenation of all its child entries' MBRs (or points) and their digests, and the digest of a leaf entry is simply the hash value of its point id. For example, in FIG. 15C, for non-leaf entry $N_1$, its digest $H_1=h(p_1.p|h_1|p_2.p|h_2|p_3.p|h_3)$; for leaf entry $p_1$, its digest $h_i=h(p_1.id)$. The digests of all entries in the MR-tree are recursively computed in a bottom-up fashion, and the digest of the root entry is signed by the DO using its private key.

The kNN query processing can be conducted by any existing technique, e.g., the best-first search algorithm. This algorithm maintains a priority queue H of to-be-explored nodes, sorted by their minimum distance (mindist) to the query point q, and repeatedly pops up the top entry e in H, accesses e for its child entries, and enqueues them into H. This procedure terminates when k leaf entries (i.e., result data points $p_1, p_2, \ldots, p_k$) have been popped up from H. We denote the remaining entries in the heap H as $H_{rm}$.

To authenticate the query results, the client needs to verify: (1) $\forall p_i \in R, \text{Dist}(p_k, q) \geq \text{Dist}(p_i, q)$; (2) $\forall e_i \in H_{rm}, \text{Dist}(e_i, q) \geq \text{Dist}(p_k, q)$; and (3) no $p_i$ or $e_i$ is omitted or tampered with. (1) can be verified directly from the result points, and (2) can be verified if $H_{rm}$ is included in the VO. (3) can be verified by restoring the root digest of the MR-tree, because the missing or misrepresentation of any $p_i$ or $e_i$ will result in an incorrect restoration of the root digest. Therefore, the VO includes: (1) the result points in R and the MBRs (or points) of the entries in $H_{rm}$; (2) the signed root digest; and (3) the digest components necessary for the client to restore the root digest.

Figure 15A:
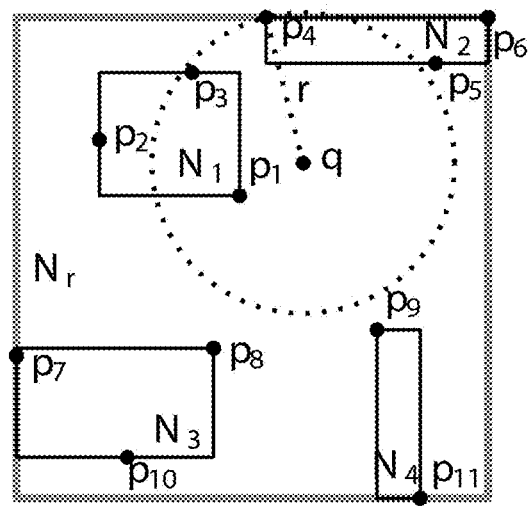
Figure 15B:
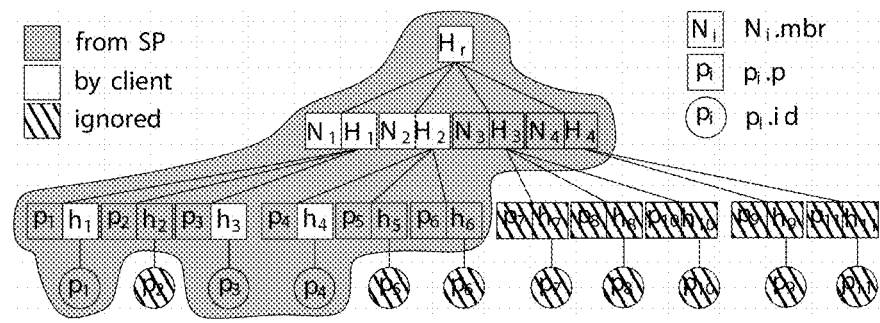

Consider a 3NN query example in FIG. 15A, where $N_1$, $N_2$, ... are non-leaf entries and $p_1$, $p_2$, ... are leaf entries. The query results are $R = \{(p_1, p_3, p_4)\}$ and $H_{rm} = \{p_5, p_2, p_6, N_3, N_4\}$. FIG. 15B shows the VO for this example, which includes:

the points and MBRs in $R \cup H_{rm}$, including: (1) the points of $p_1, p_2, p_3, p_4, p_5, p_6$ and (2) the MBRs of $N_3$ and $N_4$;
the signed digest of the root node;
all the digest components, necessary for the client to compute the root digest, including (1) the digests $h_2, h_5, h_6$ for leaf entries $p_2, p_5, p_6$; and (2) the digests $H_3, H_4$ for non-leaf entries $N_3, N_4$.

In FIG. 15B, all items returned by the SP are shown in light-grey color (e.g., $h_2, H_3$), and all the digests, computed by the client itself after receiving the VO (e.g., $h_1, H_1$), are shown in white color.

Private Distance Comparison Between an MBR and a Point

As can be seen in the last subsection, the authentication of kNN queries involves distance comparison not only between points but also between an MBR and a point. Specifically, if the minimum distance from an MBR to q is farther than the distance from the $k^{th}$ NN to q, the corresponding MR-tree node can be verified as a whole, without accessing to its child entries. However, the PPB or PLB method only works for distance comparison between points. As such, before presenting the authentication data structure and VO construction procedures, we first present a method for distance comparison between an MBR and a point.

Figure 16A:
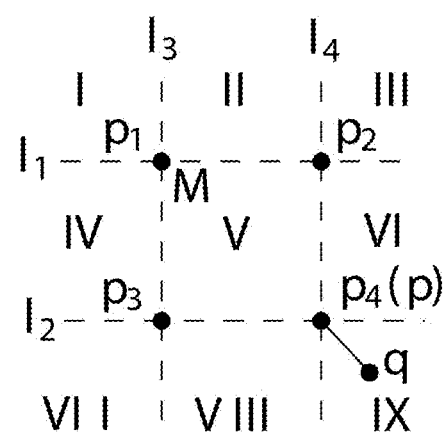
FIGS. 16A and 16B show a distance comparison between an MBR and a point.

Let $p_1, p_2, p_3, p_4$ denote the four corner points, and $l_1, l_2, l_3, l_4$ the four boundary lines of an MBR MA. Obviously, if q is located inside M, the minimum distance is 0, which is always closer than the $k^{th}$ NN to q. If q is located outside of M, there will be two cases. The first case is when q is located in Partitions I, III, VII, and IX (see FIG. 16A), and the minimum distance to q occurs on one of the corner points p. In this figure, $p = p_4$. So the proof of $Dist(M,q) \geq Dist(p_k,q)$ can be reduced to proofs of: (1) $x_q \geq x_{p_4}$ and $y_q \leq y_{p_4}$ using the 1D comparison method in H. Pang, A. Jain, K. Ramamritham, and K.-L Tan. *Verifying completeness of relational query results in data publishing*. In *SIGMOD*, pages 407-418, 2005, and (2) $Dist(p,q) \geq Dist(p_k,q)$ using the PPB method proposed in an earlier section.

Figure 16B:
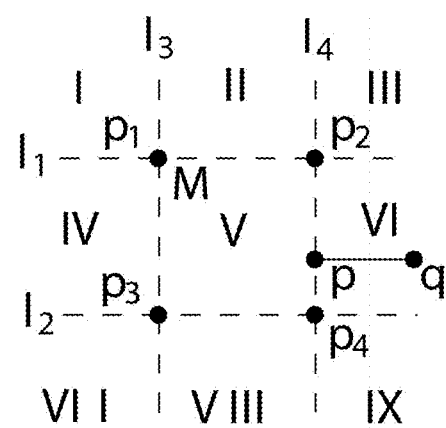

The second case is when q is located in Partitions II, IX, XI, and XIII (see FIG. 16B), and the minimum distance to q occurs on one of the boundary lines. In FIG. 16B, the minimum distance to q occurs on line $l_4$ (in between lines $l_1$ and $l_2$). Let p denote this closest point, then the proof of $Dist(M,q) \geq Dist(p_k,q)$ can be reduced to proofs of: (1) $x_q \geq x_{p_4}$ and $y_{p_4} \leq y_q \leq y_{p_2}$ using the 1D comparison method in H. Pang, A. Jain, K. Ramamritham, and K.-L Tan. *Verifying completeness of relational query results in data publishing*. In *SIGMOD*, pages 407-418, 2005, and (2) $Dist(p,q) \geq Dist(p_k,q)$ using the proposed PPB method. In this case, the digest for either x or y coordinate of p depends on q, which can be calculated by the client itself.

Authentication Data Structure

First, we define the digest for a leaf entry $p_i$, as $h_i = h(p_i.id)$. Since we cannot disclose any location point $p_i.p$ to the client, we define its digest $dig(p_i.p)$ based on the PPB method as follows:

$$dig(p_i.p) = h(E(2x_{p_i.p})|E(2y_{p_i.p})|E(x_{p_i.p}^2)|E(y_{p_i.p}^2)). \quad (29)$$

The digest of a non-leaf entry $N_i$ is defined as:

$$H_i = h^2(dig(N_{c1}.mbr)) \cdot h^2(dig(N_{c1})) \cdots h^2(dig(N_{cm}.mbr)) \cdot h^2(dig(N_{cm})) \mod n, \quad (30)$$

where $N_{cj}$ is $N_i$'s i-th child entry, $n = pq$ and p, q are two large primes. The digest of an MBR is defined as:

$$dig(mbr) = h^2(dig(mbr.l)) \cdot h^2(dig_g(mbr.l)) \cdot h^2(dig(mbr.u)) \cdot h^2(dig_g(mbr.u)) \mod n, \quad (31)$$

where mbr.l and mbr.r are bottom-left and top-right corner points and $dig_g()$ is the digest of a corner point's g() values, defined as:

$$dig_g(p) = h(g(x_p - L)|g(U - x_p)|g(y_p - L)|g(U - y_p)), \quad (32)$$

which is used for boundary verification during distance comparison between an MBR and a point.

VO Construction and Verification

Recall that R denotes the set of query results and $H_{rm}$ denotes the remaining entries in the priority queue H. Similar to an earlier section, to authenticate the results, the client needs to verify: (1) $\forall p_i \in R$, $Dist(p_k,q) \geq Dist(p_i,q)$; (2) $\forall e_i \in H_{rm}$, $Dist(e_i,q) \geq Dist(p_k,q)$; and (3) no $p_i \in R$ or $e_i \in H_{rm}$ is omitted or tampered with. While (3) can still be verified by restoring the root digest of the MR-tree as in the earlier section, since neither the points nor their distances can be disclosed to the client, verifying (1) and (2) is no longer trivial and requires the PPB distance comparison on two points or an MBR and a point. Therefore, the VO includes: (1) the digest or digest components of each $p_i \in R$ to privately compare with $Dist(p_k,q)$; (2) the digest or digest components of each $e_i \in H_{rm}$ to privately compare with $Dist(p_k,q)$; (3) the signed root digest; and (4) all the digest components necessary for the client to restore the root digest.

Figure 15C:
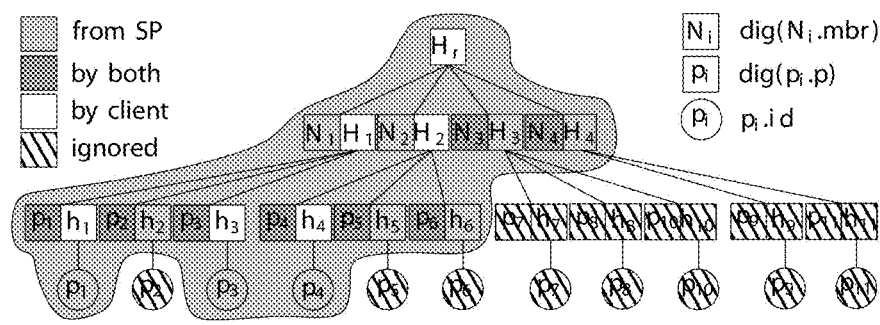

FIG. 15C shows the VO of the same 3NN query in FIG. 15A, which includes:

the digest components for each $p_i \in R$ to compare with $Dist(p_k,q)$, including: E() values for points $p_1, p_3, p_4$;[2]

[2] E() values consist of E(2x), E(2y), E($x^2$), E($y^2$), E($\delta$), and S(E($\delta$)).

the digest components for each $e_i \in H_{rm}$ to compare with $Dist(p_k,q)$, including: (1) E() values for points $p_2, p_5, p_6$; (2) E() values, g() values and components for the corner points of MBRs $N_3, N_4$;
the signed digest of the root node;
the digest components, necessary for the client to compute the root digest, including: (1) the digests $h_2, h_5, h_6$ for leaf entries $p_2, p_5, p_6$; (2) the digests $H_3, H_4$ for non-leaf entries $N_3, N_4$; and (3) the digests $dig(N_1.mbr)$, $dig(N_2.mbr)$.

In FIG. 15C, the light-grey and white colors represent the same meanings as in FIG. 15B, and the dark-grey color represents those digest components that are jointly computed by the SP and the client. For example, $dig(p_1.p)$ is computed by the client based on the E() values of $p_1.p$ returned from the SP.

Acceleration Using PLB Method

Figure 15D:
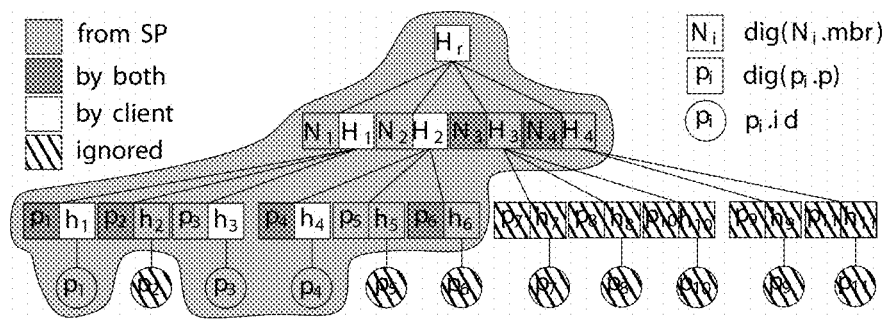

If the DO pre-signs some pairs of points in advance, the SP can replace some calls of the PPB method with the PLB method to accelerate the authentication. In the example of FIG. 15A, we assume that $\mathbb{R} \mathcal{L} (p_3,p_4)$ and $\mathbb{R} \mathcal{L} (p_4,p_5)$ are pre-signed by the DO, comparisons of $Dist(p_4,q) \geq Dist(p_3,q)$ and $Dist(p_5,q) \geq Dist(p_4,q)$ can be verified using the PLB method. Specifically, the SP no longer returns E() values for $p_3$ and $p_5$. Instead, it returns digest components of $o'_1, o'_2$, $g(A_1)$ and signatures of those pre-signed lines. FIG. 15D shows the updated VO with this PLB acceleration, where the digests of entries $p_3$ and $p_5$, jointly computed by the SP and the client in FIG. 15C, are now returned directly.

Authentication on Voronoi Diagram

In the MR-tree based scheme, since only the root digest is signed, the verification of any query must go all the way up to the root, which requires a significant number of necessary digests or digest components in the VO and high computational overhead. This situation is particularly unfavorable to queries of small k. As an extreme example, when k=1, even though the result comprises only one data point, the VO still includes the digests of all other points in the same leaf node, the digests of all other entries in the same intermediate node, and so on. In this subsection, we propose an alternative scheme that is based on Voronoi Diagram.

Properties of Voronoi Diagram

As shown in FIGS. 17A-17D, given the set of points $\{(p_1, p_2, \ldots, p_w\}$ in $\mathbb{D}$ the Voronoi Diagram of $\mathbb{D}$, donated by $VD(\mathbb{D})$, partitions the Euclidean space $\mathbb{R}^2$ into w disjoint Voronoi Cells. Each cell corresponds to one point $p_i$, and any point in this cell has $p_i$ as its nearest neighbor among $\mathbb{D}$. In what follows, this cell is denoted by $VC(p_i)$. If $VC(p_i)$ and $VC(p_j)$ share a common edge, we say $p_i$ is a Voronoi Neighbor of $p_j$, denoted as $VN(p_j)$.

Voronoi Diagram has the following properties:

Property 5.1: The average edge number of a Voronoi Cell is six.

Property 5.2: If $P=\{p_1, p_2, \ldots, p_{k-}\} \subset \mathbb{D}$ are the k-1 nearest neighbors of a query point q the $k^{th}$ NN (i.e. $p_k$) must be in the set $NN(p_i \in P)$ Authentication Data Structure In the Voronoi Diagram based scheme, the DO signs the digest of each Voronoi Cell. The digest of a cell $VC(p_i)$ is defined as:

$$dig(VC(p_4))=dig(p_i,p) \cdot h^2(p_i.id) \cdot h^2(p_i.neigh_1) h^2(p_i.neigh_2) \ldots ) \bmod n, \quad (33)$$

where $p_i.neigh_j$ is the id of $p_i$'s $j^{th}$ neighbor, and $dig(p_i.p)$ is the digest of $p_i$'s location point, which shares the same definition as in Equation (29) in the MR-tree based scheme.

kNN Query Processing, VO Construction, and Verification

We assume that the Voronoi Diagram, together with its authentication data structure, has been materialized on external storage. Any voronoi cell, including its digest and signature, can be efficiently accessed using the corresponding point $p_i$ or its id. As such, a kNN query can be incrementally processed according to Properties 5.1 and 5.2 as follows. First, the SP finds $p_1$ as the point whose corresponding cell contains the query point q. This can be completed with or without the Voronoi Diagram. Next, the SP finds the second NN from the Voronoi neighbors of $p_1$ (i.e., $VN(p_1)$). In general, the SP finds the $k^{th}$ NN from the Voronoi neighbors of all k-1 NNs found so far.

Let $P_{neigh}=\{p'_1, p'_2, \ldots\}$ denote the set of points in $\cup VN(p_i \in R)-R$. To authenticate the query results, the client needs to verify: (1) $q \in VC(p_1)$; (2) $\forall p_i \in R$, $Dist(p_k,q) \geq Dist(p_i,q)$; (3) $\forall p'_i \in P_{neigh}$, $Dist(p'_i,q) \geq Dist(p_k,q)$; and (4) no $p_i \in R$ or $p'_i \in \cup P_{neigh}$ is omitted or tampered with. While (4) can be verified by restoring the digests of all VCs in $R \cup P_{neigh}$, (1) (2) (3) can be verified in the same manner by the PPB method or PLB method (if the DO has pre-signed the lines to be compared). In particular, (1) is equivalent to verifying $\forall p_i \in VN(p_1)$, $Dist(p_i,q) \geq Dist(p_1,q)$. Therefore, the VO includes: (1) the digest or digest components of each $p_i \in VN(p_1)$ to privately compare with $Dist(p_1,q)$; (2) the digest or digest components of each $p_i \in R$ to privately compare with $Dist(p_k,q)$; (3) the digest or digest components of each $p'_i \in P_{neigh}$ to privately compare with $Dist(p_k,q)$; (4) the signed digests for all VCs in $R \cup P_{neigh}$; and (5) the digest components necessary for the client to compute the digests of VCs in $R \cup P_{neigh}$.

Figure 17A:
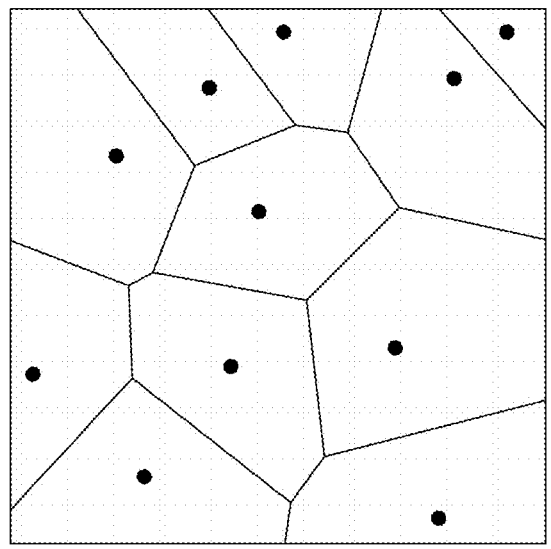
Figure 17B:
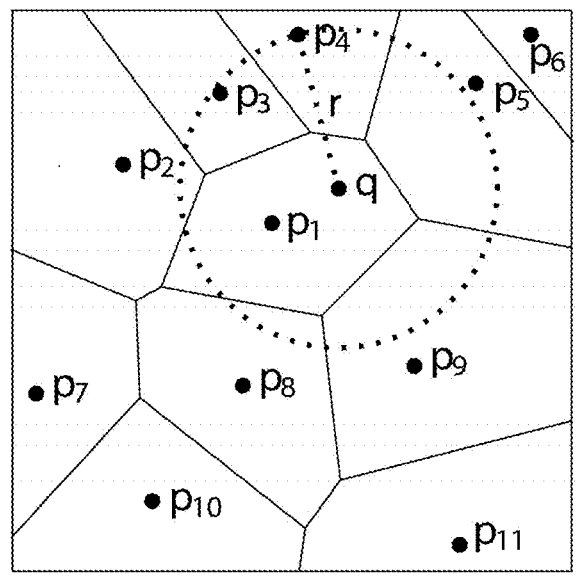
Figure 17C:
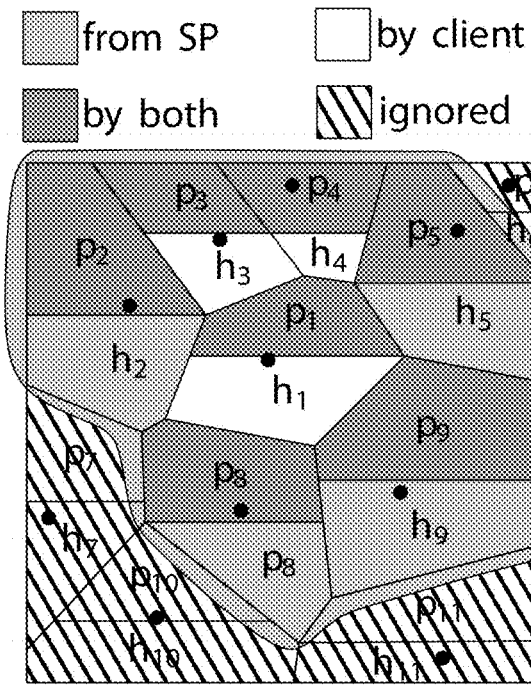

FIG. 17B illustrates the same 3NN example as in the MR-tree based scheme. In this figure, $p_1, p_2, \ldots$ are data points, the 3NN result $R=\{p_1, p_3, p_4\}$ and $P_{neigh}=\{p_2, p_5, p_8, p_9\}$. FIG. 17C shows the VO, which includes:

the digest components of each $p_i \in VN(p_1)$ to compare with $Dist(p_1,q)$, including: $E()$ values for points $p_2, p_3, p_4, p_5, p_8, p_9$;

the digest components of each $p_i \in R$ to compare with $Dist(p_k,q)$, including: $E()$ values of points $p_1, p_3, p_4$ (although $E()$ values for $p_3, p_4$ have been listed above, we still include them here for conceptual completeness);

the digest components of each $p'_i \in P_{neigh}$ to compare with $Dist(p_k,q)$, including: $E()$ values for points $p_2, p_5, p_8, p_9$;

the signed digests of all VCs in $R \cup P_{neigh}$, including: $VC(p_1), VC(p_2), VC(p_3), VC(p_4), VC(p_5), VC(p_8), VC(p_9)$;

the digest components necessary for the client to compute the digests of VCs in $R \cup P_{neigh}$, including: the digests $h_2, h_5, h_9, h_8, h_6, h_7, h_{10}, h_{11}$.

In FIG. 17C, the colors share the same meanings of the figures in MR-tree based scheme.

Figure 17D:
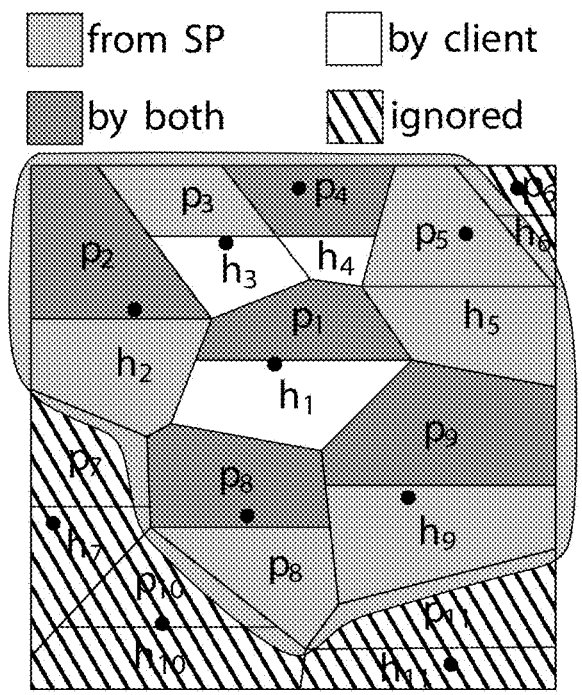

As with the MR-tree based scheme, the Voronoi Diagram based scheme can be accelerated using the PLB method. FIG. 17D illustrates the VO when $\mathbb{R}\,\mathcal{L}\,(p_3, p_4)$ and $\mathbb{R}\,\mathcal{L}\,(p_4, p_5)$ are pre-signed. Since these pairs of points are pre-compared, distance comparison on them no longer goes through the PPB method. As such, in the figure the SP returns light-grey parts instead of dark-grey parts for $VC(p_3)$ and $VC(p_5)$. That is, instead of $E()$ values of $p_3$ and $p_5$, the SP only returns digest components $o'_1, o'_2, g(A_1)$ and the corresponding signatures.

Security Analysis for kNN Query Authentication Scheme

In this section, we analyze the security of the proposed authentication schemes. Since the threat from the SP who dishonestly returns incorrect results has been solved by the authentication data structures, the only remaining threat is from the client who infers the locations of returned users from the VO.

To demonstrate that the VO discloses no location information of any returned user to the client, we adopt security proof by simulation originated from zero-knowledge proof. This is achieved by "simulating the view" of the client, i.e., while the client has a-priori knowledge of any user u being at position a with $P(u=a)$ probability, after receiving the VO, its posterior probability $P(u=a|VO)$ is the same as $P(u=a)$. For ease of presentation, we assume that the PPB method is used for private distance comparison in the analysis.

MR-Tree Based Authentication Scheme

According to an earlier section, depending on whether u is a result, the information disclosed by the VO to the client is in three cases: (1) if $u=p_k$, i.e., u is the $k^{th}$ NN, then the client knows $Dist(u,q) \leq Dist(A,q)$, where A is any MBR in the heap $H_{rm}$; (2) if $u \in R$ and $u \neq p_k$, then the client knows $Dist(u,q) \leq Dist(p_k,q)$; (3) if $u \notin R$, then the client knows $Dist(u,q) \geq Dist(p_k,q)$. In the following lemmas, we show all these cases have the posterior probability equal to the a-priori probability.

LEMMA 6.1: Let $u = p_k, \forall A \in H_{rm}, P(u = a) = P(u = a\ |$ $Dist(u, q) \leq Dist\ |\ (A, q))$.

PROOF.

-continued $$P(u = a \mid Dist(u, q) \leq Dist(A, q))$$
$$= \frac{P(Dist(u, q) \leq Dist(A, q) \mid u = a) \cdot P(u = a)}{P(Dist(u, q) \leq Dist(A, q))}$$
$$= \frac{P(Dist(u, q) \leq Dist(A, q) \wedge u = a)}{P(Dist(u, q) \leq Dist(A, q))}$$
$$= P(u = a)$$

The first equality is due to Bayes' Theorem and the third equality is due to the fact that $Dist(u,q) \leq Dist(A,q)$ is independent of $u=a$ as the location of A is unknown to the client. In fact, knowing $Dist(u,q) \leq Dist(A,q)$ does not limit the placement of u.

Similarly, we can obtain the following lemmas:

Lemma 6.2: Let $u \in R$ and $u \neq p_k$, $P(u=a) = P(u=a \mid Dist(u,q) \leq Dist(p_k,q))$.

Lemma 6.3: Let $u \notin R$, $P(u=a) = P(u=a \mid Dist(u,q) \geq Dist(p_k,q))$.

Based on these lemmas, we present the following theorem on the security of the scheme.

Theorem 6.4:

The MR-tree based scheme does not leak the location of any user u to the client, given any VO.

PROOF.

Equivalently, we show there is a polynomial-time simulator SIM that can simulate the view of the client without knowing the data of SP. Specifically, it reproduces the VO of the client with the same probability distribution as if it were sent from the real SP.

According to Lemmas 6.1, 6.2 and 6.3, without changing the distribution $P(u=a)$, SIM is allowed to know (1) if $A \subseteq Q$ and (2) if $A \cap Q \neq \emptyset$ for any MBR A. As such, SIM can reproduce the VO from the heap Hrm according to Section 5.1.4 as follows. For leaf entry u (whether $u \in R$ or $\emptyset R$), SIM adds to the VO u's digest components for private distance comparison on points; if $u \in R$, SIM further adds its digest component for id authentication; else for MBR A, SIM adds to the VO the digest components for private distance comparison on an MBR and a point. This VO has the same probability distribution as generated by the real SP. Also SIM runs in polynomial time. Also SIM runs in polynomial time.

Voronoi Diagram Based Scheme

According to an earlier section, the information disclosed by the VO to the client is in three cases: (1) if $u=p_k$, then the client knows $\forall p'_i \in P_{neigh}$, $Dist(p_k,q) \leq Dist(p'_i,q)$; (2) if $u \in R$ and $u \neq p_k$, then the client knows $Dist(u,q) \leq Dist(p_k,q)$; (3) if $u \notin R$, then the client knows $Dist(u,q) \geq Dist(p_k,q)$ and $u \in P_{neigh}$, that is, u is a Voronoi neighbor of some $p_i$. While the first two cases are the same as in the MR-tree based scheme, we show in the following lemma that the third case also has the posterior probability equal to the a-priori probability.

LEMMA 6.5: Let $u \notin R$, $P(u = a) = P(u = a \mid Dist(u, q) \geq Dist(p_k, q) \wedge u \in VN(p_i))$.

PROOF.

$$P(u = a \mid Dist(u, q) \geq Dist(p_k \cdot q) \wedge u \in VN(p_i))$$
$$= \frac{P(Dist(u, q) \geq Dist(p_k \cdot q) \wedge u \in VN(p_i) \mid u = a) \cdot P(u = a)}{P(Dist(u, q) \geq Dist(p_k, q) \wedge u \in VN(p_i))}$$
$$= \frac{P(Dist(u, q) \geq Dist(p_k, q) \wedge u \in VN(p_i) \wedge u = a)}{P(Dist(u, q) \geq Dist(p_k, q) \wedge u \in VN(p_i))}$$
$$= P(u = a)$$

Here the third equality is due to the fact that both $u \in VN(p_k)$ and $Dist(u,q) \geq Dist(p_k,q)$ are independent of $u=a$ as the locations of $p_i$ and $p_k$ are unknown to the client.

Now we reach the following theorem on the security of Voronoi Diagram based scheme.

Theorem 6.6:

The Voronoi Diagram based scheme does not leak the location of any user u to the client, given any VO.

PROOF.

Proof follows that of Theorem 6.4.

Offline and Online Strategy on Pre-Signed Lines

As shown in earlier sections, pre-signed lines can accelerate the authentication on both MR-tree and Voronoi Diagram based schemes. Ideally the authentication cost is minimum if all pairs of MBR corner points (for the MR-tree) or data points (for the Voronoi Diagram) are pre-signed and thus the PLB method can replace the PPB method in all comparisons. However, this requires a prohibitively huge amount of DO computation time and storage cost at the SP. In this section, we assume that the DO has a limited budget of pre-signing some pairs of points. The problem is two-fold: (1) to decide offline which points to be pre-signed by the DO; and (2) to decide online for the SP which pre-signed lines to choose for the VO, while the objective is to minimize the number of distance comparisons using the PPB method.

DO Offline Strategy on Pre-Signed Lines

Figure 18A:
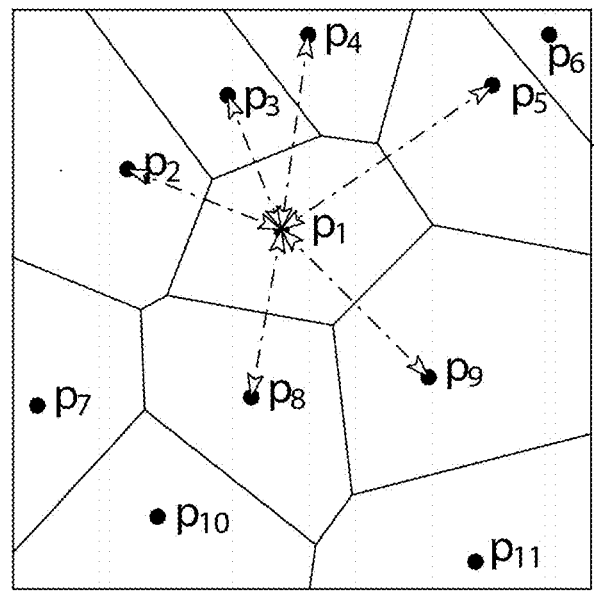
FIGS. 18A and 18B show the offline strategy on pre-signed lines for FIG. 18A Voronoi-Diagram-based scheme, and FIG. 18B MR-tree-based scheme.
Figure 18B:
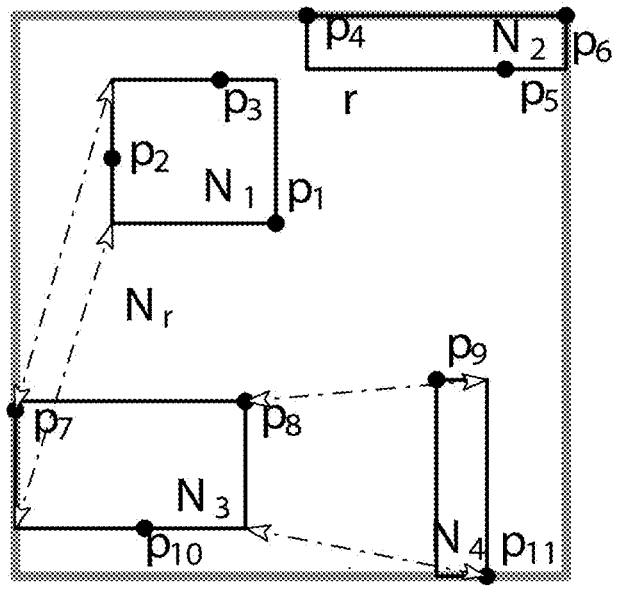

Without the a-priori knowledge of the queries, the DO should pre-sign those pairs with the highest probabilities of distance comparison. In the Voronoi Diagram based scheme, distance comparison is conducted between two points which are close in the Voronoi Diagram. As such, the DO's strategy can be designed as follows. For every data point $p_i$, the DO first signs it with all its Voronoi neighbors. For example, in FIG. 18B, the DO signs $p_1$ with $\{p_2, p_3, p_4, p_5, p_9, p_8\}$, as shown by dashed lines. If budget allowed, the DO can continue to sign all 2-hop, 3-hop, . . . neighbors in the Voronoi Diagram.

In the MR-tree based scheme, distance comparison is conducted between the $k^{th}$ NN $p_k$ and an MBR M. Since both have large cardinalities, signing all pairs of them is infeasible. On the other hand, if $p_k$ is far away from M, distance comparison on this pair is unlikely to occur and thus signing this pair becomes useless. To improve the utility, we introduce distance comparison on two MBRs $M_1$ and $M_2$. If $Dist(M_2,q) \geq Dist(M_1,q)$, proving $Dist(M_1,q) \geq Dist(p_k,q)$ can also prove $Dist(M_2,q) \geq Dist(p_k,q)$. To choose close-by MBR pairs to pre-sign, the DO can exploit the topology in the R-tree by only signing sibling MBRs in the same tree node. Specifically, each MBR chooses the four sibling MBRs that are closest to each of its corner points and sign these corner pairs. For example, in FIG. 18B, the DO signs the four corner points of $N_3$ with the four closest corner points that are connected by dashed lines. If budget allowed, the DO can continue to sign every corner point with the second, third, . . . closest corner points. We call these points 2-hop, 3-hop, . . . points for consistency with the Voronoi Diagram-based scheme.

SP Online Strategy on Pre-Signed Lines

Figure 19A:
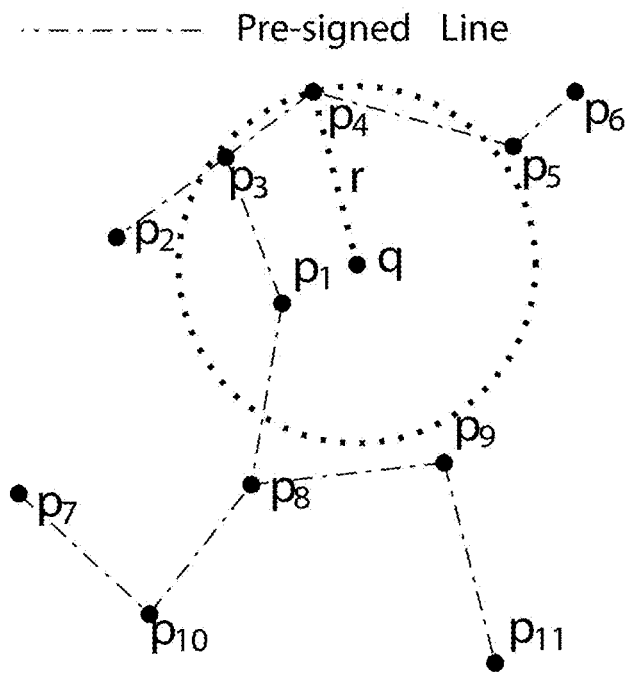
Figure 19B:
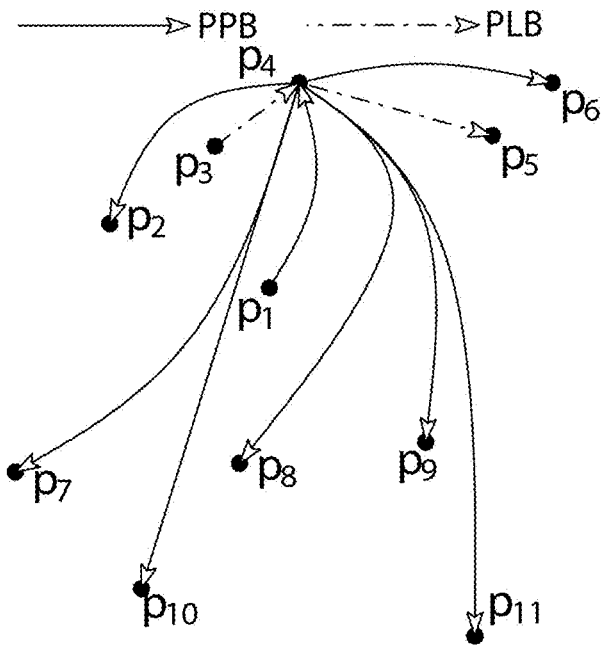

Even when the pre-signed lines are decided by the DO, when constructing the VO for a specific query, the SP still has the flexibility of forming the distance comparison chain. FIG. 19A illustrates the 3NN query running example, $R=\{p_1, p_3, p_4\}$ and $\mathbb{D} - R = \{p_2, p_5, p_6, p_7, p_8, p_9, p_{10}, p_{11}\}$. In this figure, dashed lines denote pre-signed lines by the DO. The basic VO strategy for the SP is illustrated in FIG. 19B, which applies the PLB method (shown in dashed arrowed lines) only if a pre-signed line with the $k^{th}$ NN (i.e., $p_4$) is available, and otherwise applies the PPB method (shown in solid arrowed lines). Using this strategy, only 2 PLB method calls can be made.

Figure 19C:
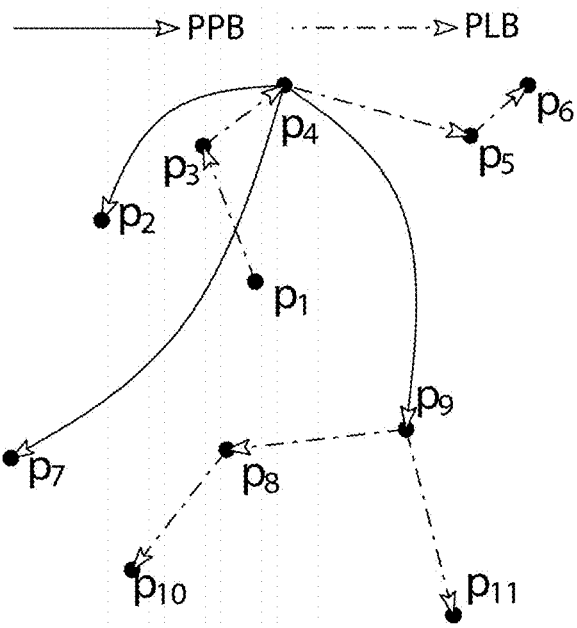
Figure 19D:
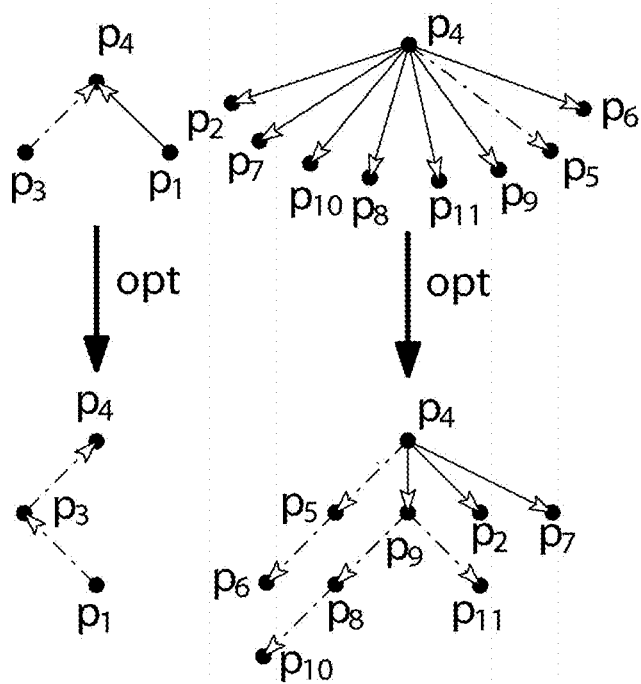
Figure 20A:
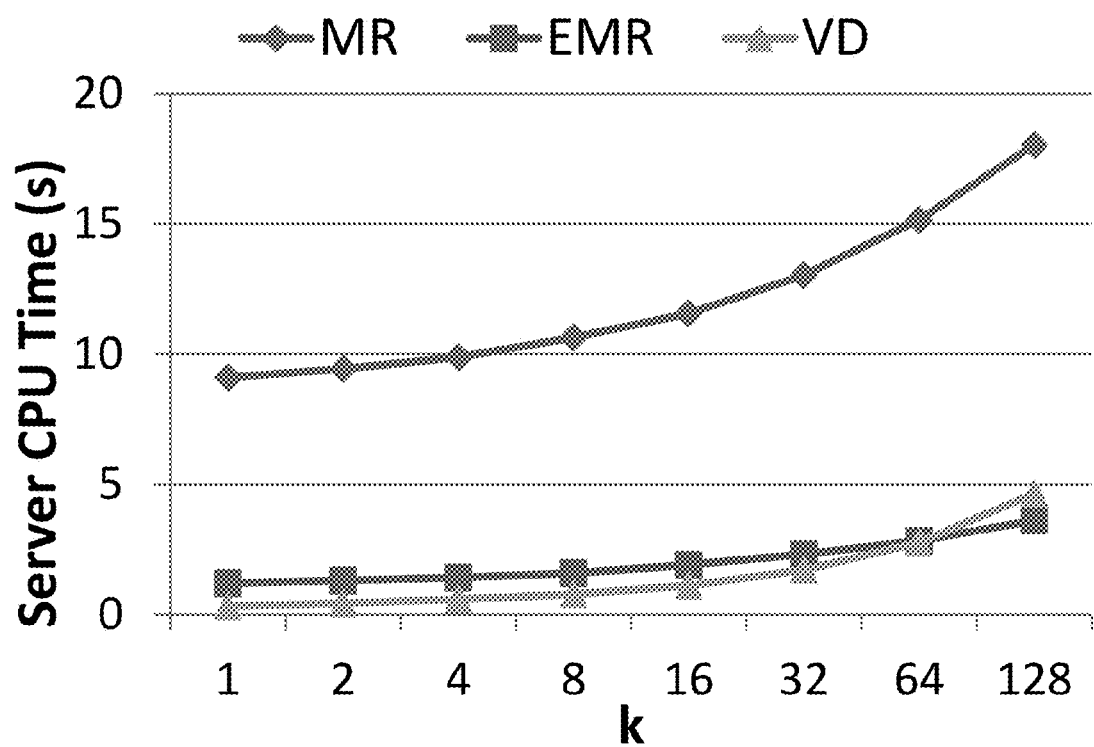
FIGS. 20A-20D show the performance (server CPU time, client CPU time, VO size, and query response time respectively) of basic query authentication across MR, EMR and VD.
Figure 20B:
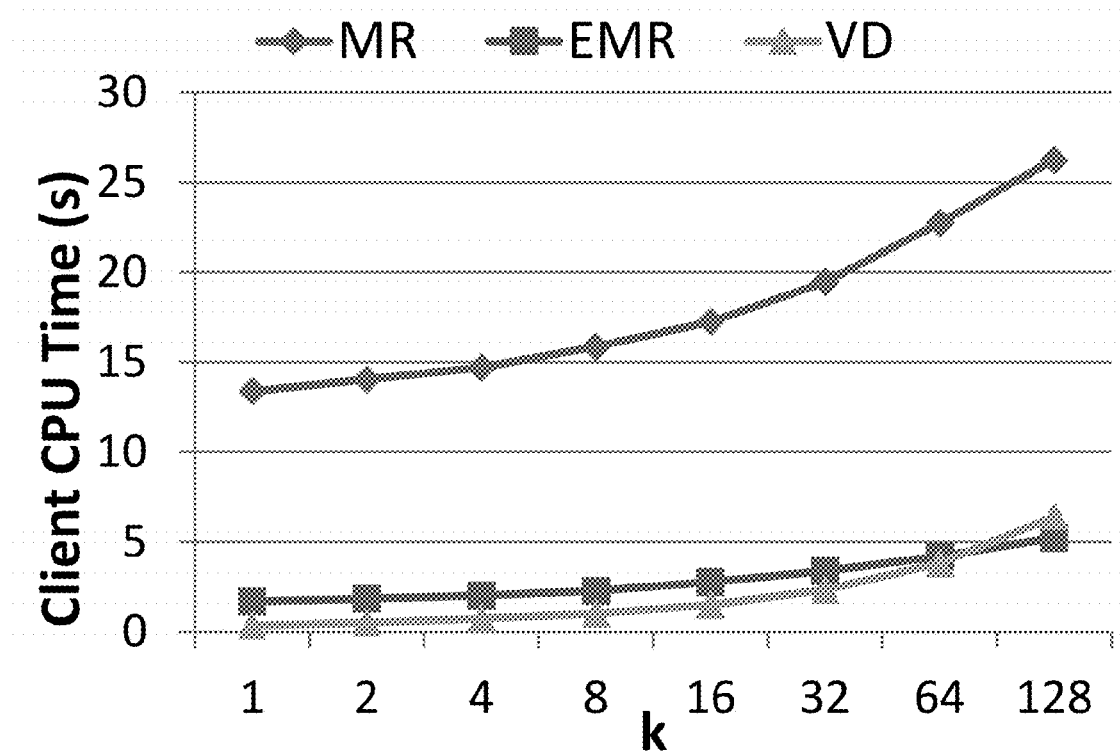
Figure 20C:
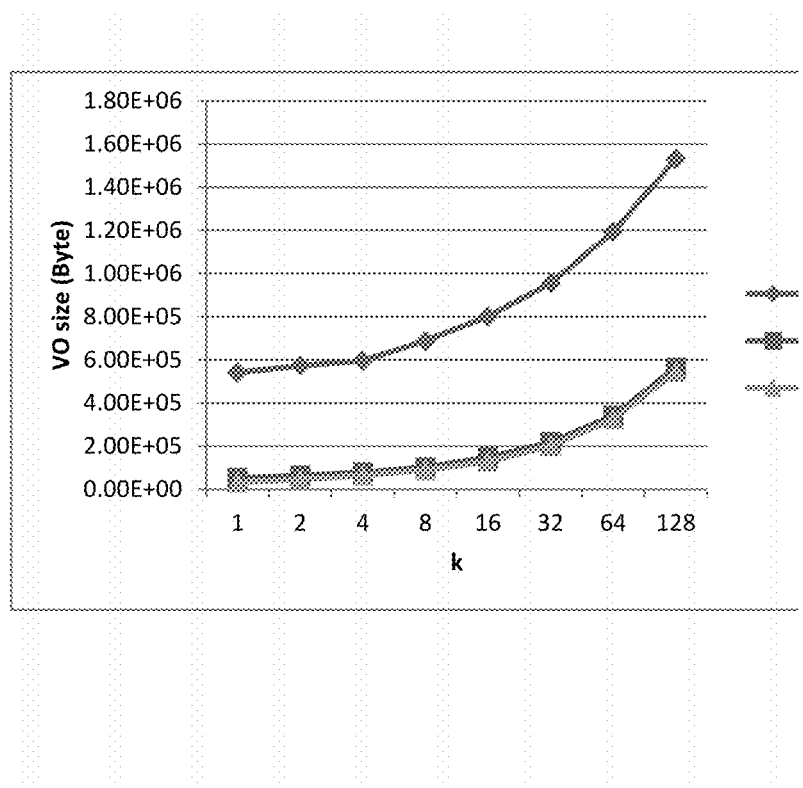
Figure 20D:
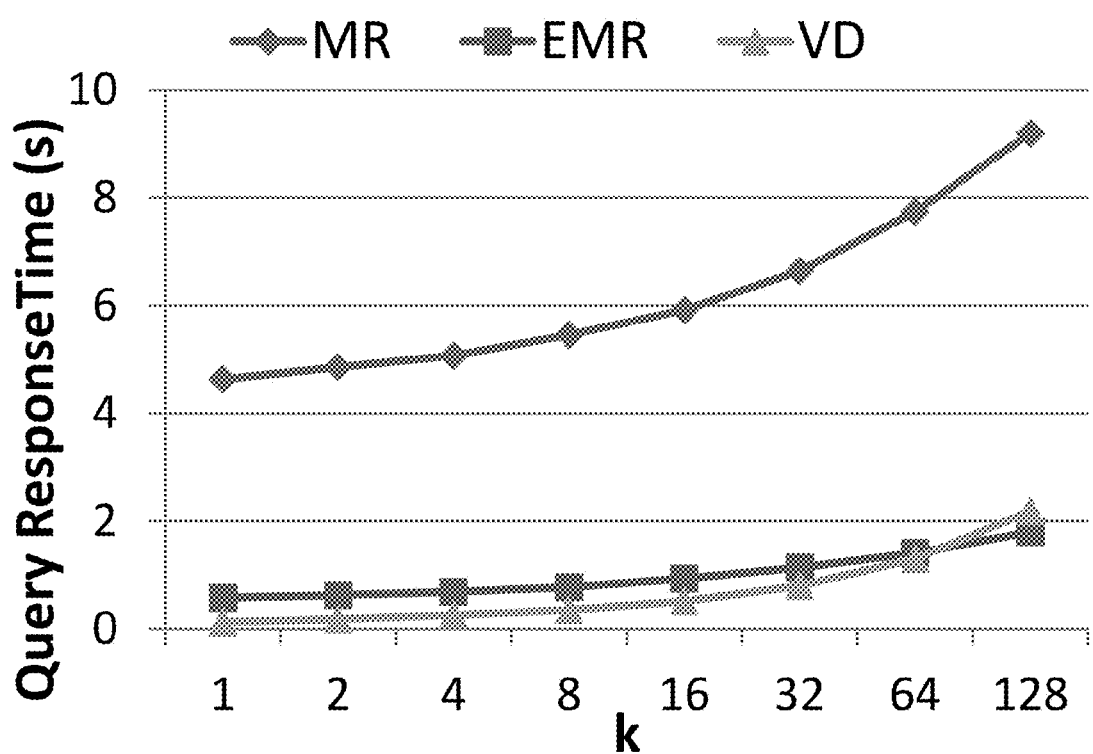
Figure 21A:
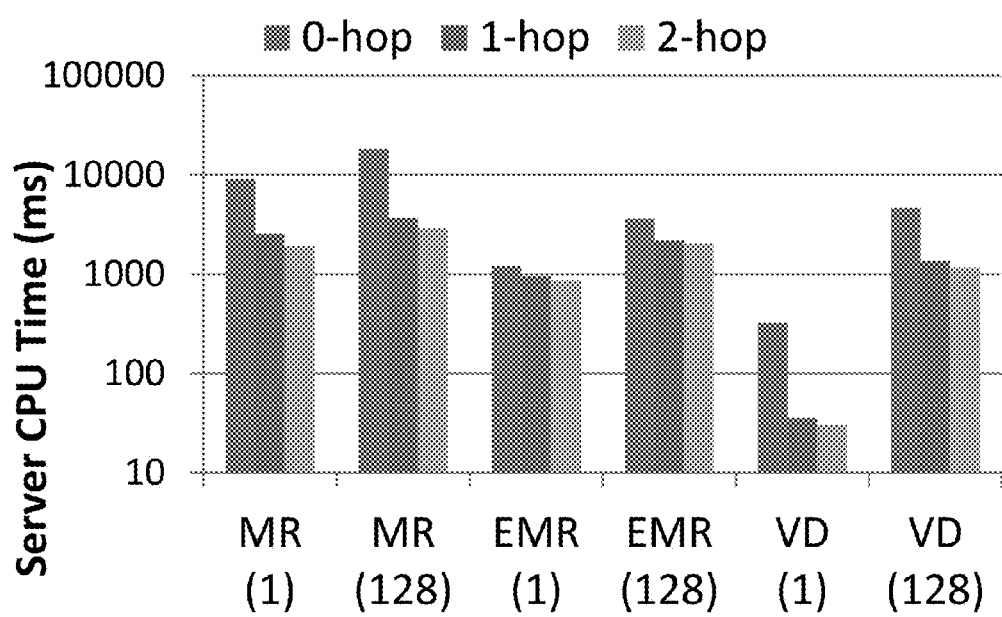
FIGS. 21A-21D show the performance (server CPU time, client CPU time, VO size, and query response time respectively) of query authentication with pre-signed lines (k=1 or 128)
Figure 21B:
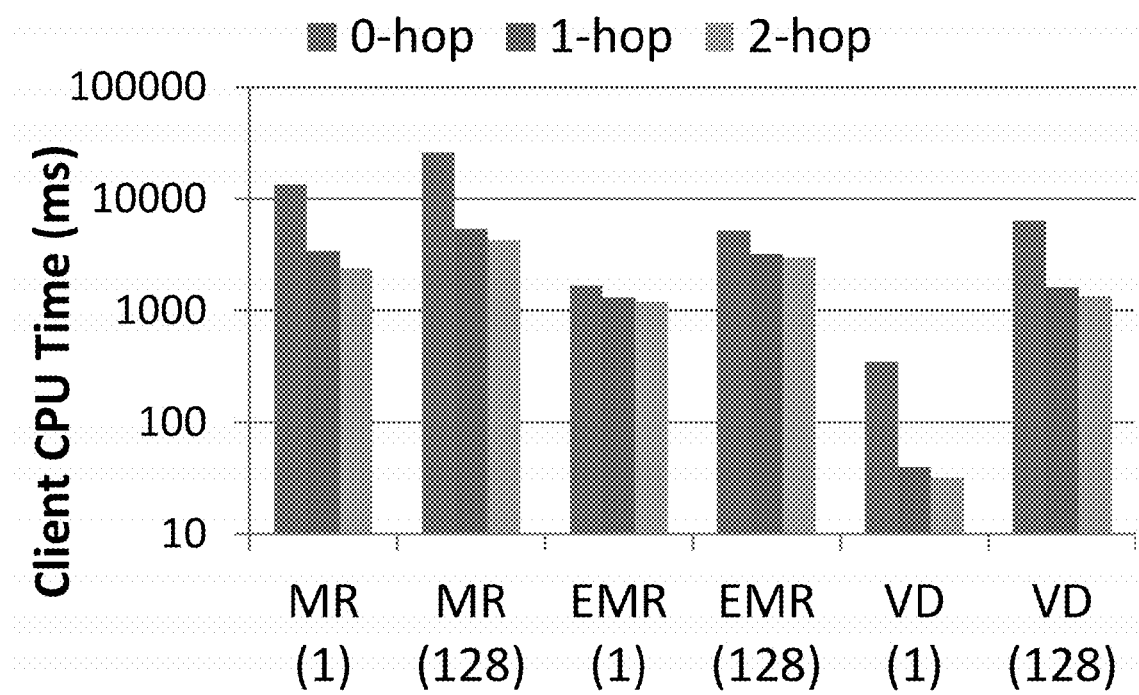
Figure 21C:
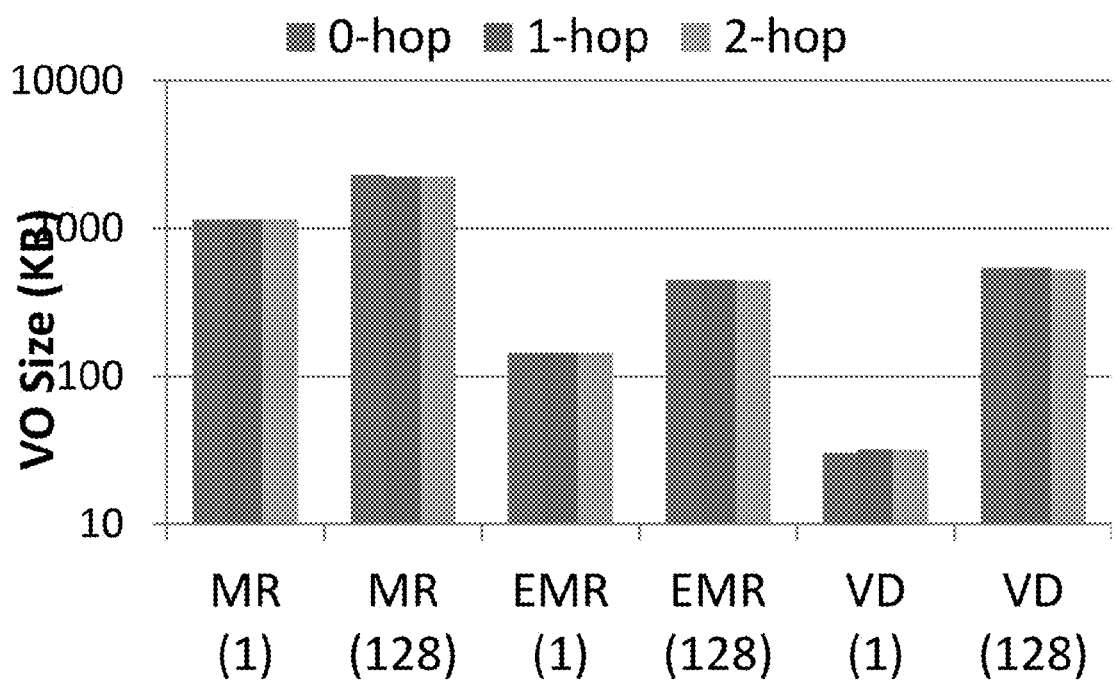
Figure 21D:
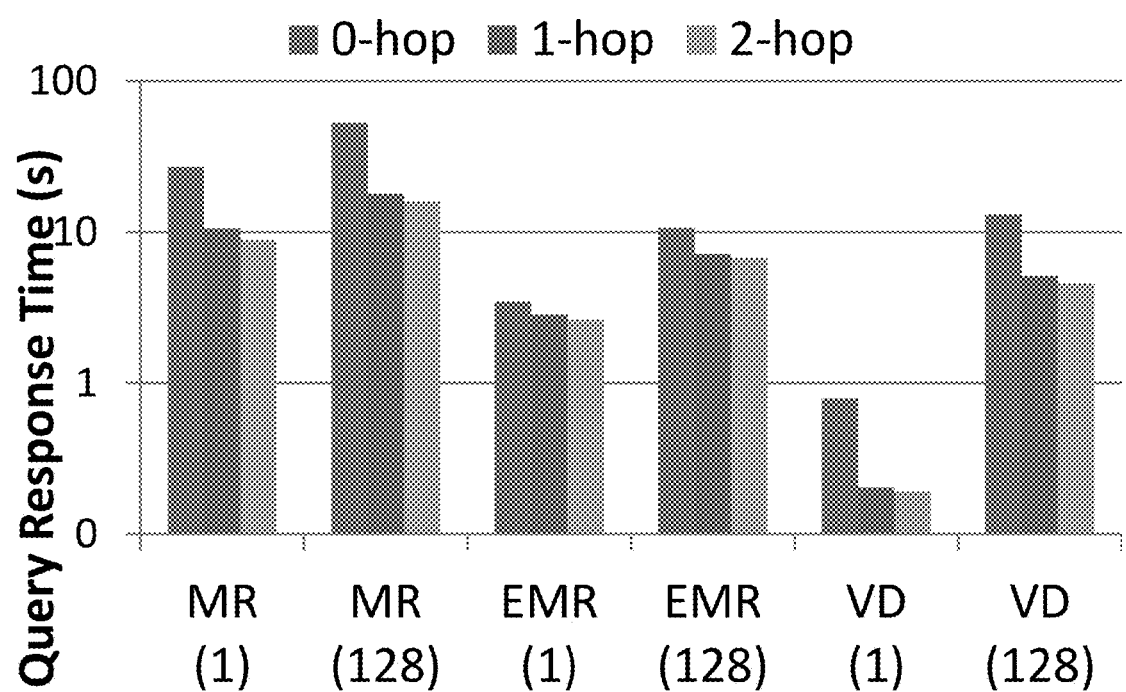

FIG. 19C shows an optimized strategy for the SP, which makes 7 PLB method calls. The key idea is to replace distance comparison on the $k^{th}$ NN with some other pivot points that are pre-signed by the DO. FIG. 19D illustrates how these pivots are chosen for points in R and $\mathbb{D}$ -R, respectively. The algorithm resembles the construction process of a spanning tree. Starting from the $k^{th}$ NN (i.e., $p_4$) as the root, the SP visits points in R (resp. $\mathbb{D}$ -R) in descending (resp. ascending) order of distance to q. When $p_j$ is visited, the SP checks whether some $p_i$ in the existing tree has a pre-signed line with $p_j$, denoted by $\mathbb{R}\,\mathcal{L}\,(p_i.p_j)$. If such $p_i$ exists, the SP spans $p_j$ from $p_i$ and uses this pre-signed line to construct the VO; otherwise, the SP spans $p_j$ from the root $p_k$ and uses the PPB method to construct the VO.

In FIG. 19D, the tree on the left shows how the VO is constructed for the points in R. When $p_3$ is visited, since $\mathbb{R}\,\mathcal{L}\,(p_3, p_4)$ exists, the SP spans $p_3$ from $p_4$ using this pre-signed line. Then $p_1$ is visit, and since $\mathbb{R}\,\mathcal{L}\,(p_1.p_3)$ also exists, the SP spans $p_1$ from $p_3$ using this pre-signed line. As such, all distance comparisons in R use the PLB method only. Similarly, the tree on the right shows the VO construction for points in $\mathbb{D}$ -R, with the visiting order as $p_5, p_9, p_2, p_8, p_6, p_{10}, p_7, p_{11}$.

Experimental Evaluation for kNN Query Authentication Scheme

In this section, we evaluate the performance of the proposed schemes for privacy-preserving authentication on kNN queries. Besides the MR-tree (MR for short) based and Voronoi Diagram (VD for short) based schemes, we also enhance the former with an embedded kd-tree in each internal MR-tree node. Let EMR denote this Embedded MR-tree based scheme. To simulate a real-life and large enough location dataset, we assume that the users are distributed on a road network and thus use the California Roads dataset from Census Bureau's MAF/TIGER database. The dataset contains 2,249,727 streets of California, from which all user location coordinates in our experiment are extracted and rounded to their closest integers.

The client side is set up on a desktop computer, with Intel Core 2 Quad processor and 4 GB RAM, running Windows XP Sp3. The SP is set up on a HP Proliant DL360 G7, with Dual 6-cores Intel Xeon X5650 2.66 GHz CPU and 32 GB RAM, running GNU/Linux. The code of our experiments is implemented and executed in 64-bit OpenJDK 1.6. The hash function used in digest computation is 160-bit SHA-1. The homomorphic function is 1024-bit Pailler Cryptosystem. The signature function (with multiplicative homomorphism) is 2048-bit RSA. We use the same optimized digest function g( ) as in H. Pang, A. Jain, K. Ramamritham, and K.-L Tan. *Verifying completeness of relational query results in data publishing*. In *SIGMOD*, pages 407-418, 2005 with the base of canonical representation set to 16.

For performance evaluation, we measure the SP CPU time (for query processing and VO construction), the client CPU time (for verification), the communication overhead (in terms of the size of VO), and the overall query response time (as the total CPU time plus the communication time over a typical 3G network at 2 Mbps download rate). The query parameter k, the number of nearest neighbors, varies from 1 to 128. The query parameter q, the location of querying point, is randomly generated from the whole map of California. To be fair, for each measurement on each scheme, the same 1,000 queries are executed and their average value is reported.

Basic Query Authentication Performance for kNN Query Authentication Scheme

In this subsection, we evaluate the authentication performance of the three schemes without DO pre-signing any lines. In other words, the results shown here apply the PPB method only. We vary k from 1 to 128 and plot the server CPU time, client CPU time, VO size, and query response time in FIGS. 20A-20D. We observe that EMR consistently outperforms MR, thanks to its small fanout during VO construction and verification. The performance gap further enlarges as k increases. On the other hand, although EMR is comparable to VD, the latter outperforms EMR in small and medium-sized queries (k<32). This can be explained by the fact that MR-tree has a clustering effect and thus its efficiency is better exploited when requesting a large number of nearest neighbors.

Performance with Pre-Signed Line Optimization for kNN Query Authentication Scheme In this subsection, we evaluate the performance of the three schemes with pre-signed lines, which have been offline and online optimized by the proposed DO and SP's strategies. In the experiment, we vary the number of pre-signed lines, by letting the DO sign 0-hop (i.e., the basic PPB method), 1-hop, and 2-hop, respectively. The results are shown in FIGS. 21A-21D. We observe that by introducing the PLB method, all the three schemes have their server and client CPU costs reduced, while the VO size remains. It is also noteworthy that, VD is the most sensitive to pre-signed lines, which gains significant performance boost by introducing 1-hop PLB. Even k is as large as 128, VD with 1-hop or 2-hop PLB outperforms EMR or MR in terms of all metrics.

Figure 22A:
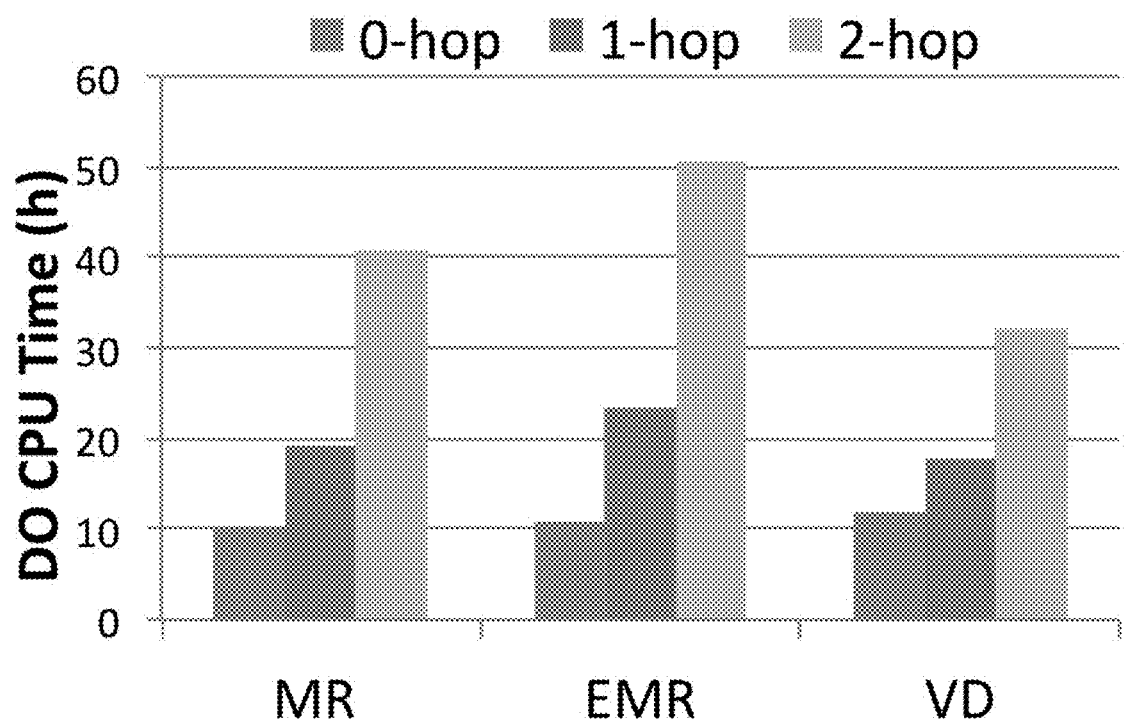
FIGS. 22A and 22B show the construction costs (DO CPU time and storage respectively) of MR, EMR and VD.
Figure 22B:
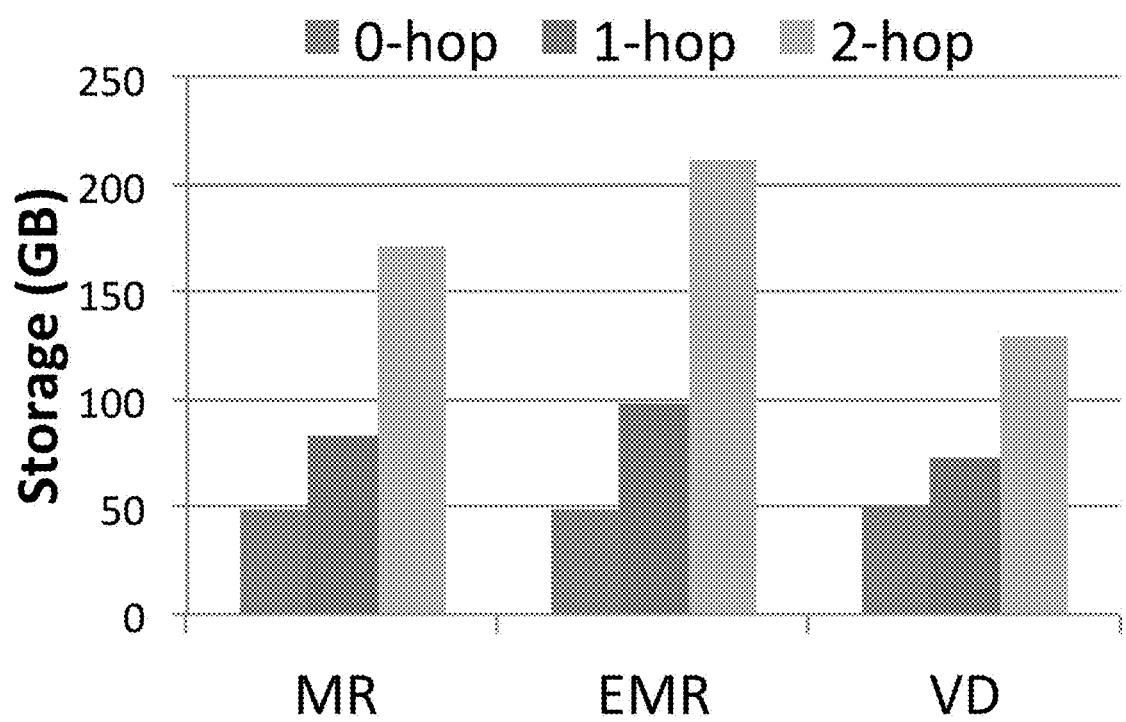

While it is clear that the more lines the DO pre-signs, the more efficient the authentication will be. However, the pre-signing cost can be prohibitively high. For example, pre-signing 2-hop for EMR takes more than 50 hours and requires more than 200 GB storage at the SP. FIGS. 22A and 22B summarize the construction time and storage cost for different schemes and pre-sign settings. Based on FIGS. 21A-21D and FIGS. 22A and 22B, we can find a balanced scheme between the pre-sign cost and query response time for different k settings as follows. When k is as large as 128 or even larger, if the DO cannot afford any pre-signing lines, EMR with 0-hop is the best scheme; otherwise, VD with 1-hop pre-signed lines is more efficient. When k is small or medium sized, VD with 0-hop and 1-hop are the best schemes for no pre-signing and with pre-signing budget, respectively.

INDUSTRIAL APPLICABILITY

The present invention discloses a method and an apparatus for authenticating location-based services without compromising location privacy, which comprises a comprehensive solution that preserves unconditional location privacy when authenticating range queries using three authentication schemes, together with two optimization techniques and two cryptographic constructs, and when authenticating k-nearest neighbor queries using two authentication schemes, together with two cryptographic constructs. This invention addresses privacy-preserving query authentication for location-based services. The present invention addresses a critical problem for both mobile value-added service market and database research community.

If desired, the different functions discussed herein may be performed in a different order and/or concurrently with each other. Furthermore, if desired, one or more of the above-described functions may be optional or may be combined.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

What is claimed is:

1. A computer processor implemented method for a privacy-preserving query authentication comprising:
   a comprehensive solution executed by one or more processors;
   wherein the comprehensive solution preserves unconditional location privacy when authenticating queries by a client by including in a verification object one or more digests computed collaboratively by the client and a server such that the client cannot infer any information about locations of returned users beyond what is implied from results of the queries;
   wherein the privacy-preserving query authentication comprising a complete set of authentication schemes for a tree based index, a grid-file based index, and a Voronoi Diagram based index;
   wherein the privacy-preserving query authentication comprising authentication schemes including one or more of an Algorithm 1-based scheme, a tree based scheme, a grid-file based scheme, and an accumulative digest for grid-file based scheme; and
   wherein the authentication schemes are for large queries, small queries, and queries on static datasets.

2. The method according to claim 1 wherein the queries comprising range queries and k-nearest neighbor queries; and wherein the unconditional location privacy is preserved for range queries and k-nearest neighbor queries without a predetermined limit of the range queries or k-nearest neighbor queries.

3. The method according to claim 1 wherein the privacy-preserving query authentication is for location-based services.

4. The method according to claim 3 wherein the location-based services comprising mobile value-added services and spatial database services.

5. The method according to claim 1 wherein the privacy-preserving query authentication comprising a privacy-preserving kNN query authentication for location-based services.

6. The method according to claim 1 wherein the privacy-preserving query authentication comprising optimization techniques.

7. The method according to claim 6 wherein the optimization techniques are orthogonal to the privacy-preserving query authentication.

8. The method according to claim 6 wherein the optimization techniques comprising an x-ordering technique, and a Hilbert embedding technique.

9. The method according to claim 1 wherein the privacy-preserving query authentication comprising cryptographic constructs that can prove to the client a distance relation from at least two private location points to at least one public point.

10. The method according to claim 9 wherein the cryptographic constructs comprising a Paillier-Points based method and a pre-signed line based method.

11. The method according to claim 10 wherein the privacy-preserving query authentication comprising strategies for both a data owner; and a service provider to optimize the pre-signed line based method.

12. The method according to claim 1 wherein the comprehensive solution is implemented in at least one computer processor based system.

13. The method according to claim 1 wherein the comprehensive solution is implemented across a network of computer processor based system.

14. A computer processor based apparatus for a privacy-preserving query authentication comprising:
   a comprehensive solution executed by a computing device having one or more computer processor;
   wherein the comprehensive solution preserves unconditional location privacy when authenticating queries by a client by including in a verification object one or more digests computed collaboratively by the client and a server such that the client cannot infer any information about locations of returned users beyond what is implied from results of the queries; and
   wherein the queries comprising range queries and k-nearest neighbor queries
   wherein the privacy-preserving query authentication comprising a complete set of authentication schemes for a tree based index, a grid-file based index, and a Voronoi Diagram based index;
   wherein the privacy-preserving query authentication comprising authentication schemes including one or more of an Algorithm 1-based scheme, a tree based scheme, a grid-file based scheme, and an accumulative digest for grid-file based scheme; and
   wherein the authentication schemes are for lame queries, small queries, and queries on static datasets.

15. The apparatus according to claim 14 wherein the privacy-preserving query authentication is for location-based services; and wherein the location-based services further comprising mobile value-added services and spatial database services.

16. The apparatus according to claim 14 wherein the privacy-preserving query authentication comprising a privacy-preserving kNN query authentication for location-based service.

17. The apparatus according to claim 14 wherein the privacy-preserving query authentication comprising optimization techniques that are orthogonal to the privacy-preserving query authentication; and cryptographic constructs that can prove to the client a distance relation from at least two private location points to at least one public point.

* * * * *